(12) United States Patent
O'Shea et al.

(10) Patent No.: US 12,514,887 B2
(45) Date of Patent: *Jan. 6, 2026

(54) ONCOLYTIC TUMOR VIRUSES AND METHODS OF USE

(71) Applicant: Salk Institute for Biological Studies, La Jolla, CA (US)

(72) Inventors: Clodagh O'Shea, La Jolla, CA (US); Shigeki Miyake-Stoner, La Jolla, CA (US)

(73) Assignee: Salk Institute for Biological Studies, La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/468,565

(22) Filed: Mar. 24, 2017

(65) Prior Publication Data

US 2017/0202893 A1 Jul. 20, 2017

Related U.S. Application Data

(63) Continuation of application No. PCT/US2015/051745, filed on Sep. 23, 2015.

(60) Provisional application No. 62/054,724, filed on Sep. 24, 2014.

(51) Int. Cl.
| | |
|---|---|
| A61K 35/761 | (2015.01) |
| A61K 31/436 | (2006.01) |
| C07K 14/005 | (2006.01) |
| C12N 15/86 | (2006.01) |
| A61K 35/00 | (2006.01) |
| A61K 38/00 | (2006.01) |

(52) U.S. Cl.
CPC .......... *A61K 35/761* (2013.01); *A61K 31/436* (2013.01); *C07K 14/005* (2013.01); *C12N 15/86* (2013.01); *A61K 35/00* (2013.01); *A61K 38/00* (2013.01); *C12N 2710/10322* (2013.01); *C12N 2710/10332* (2013.01); *C12N 2710/10343* (2013.01); *C12N 2810/6018* (2013.01); *C12N 2810/855* (2013.01)

(58) Field of Classification Search
None
See application file for complete search history.

(56) References Cited

U.S. PATENT DOCUMENTS

| | | | |
|---|---|---|---|
| 5,543,328 A | 8/1996 | McClelland et al. | |
| 5,559,099 A | 9/1996 | Wickham et al. | |
| 5,670,488 A * | 9/1997 | Gregory | A61K 48/00 424/93.2 |
| 5,677,178 A | 10/1997 | McCormick | |
| 5,731,190 A | 3/1998 | Wickham et al. | |
| 5,801,029 A | 9/1998 | McCormick | |
| 5,846,782 A | 12/1998 | Wickham et al. | |
| 5,846,945 A | 12/1998 | McCormick | |
| 5,856,181 A | 1/1999 | McCormick | |
| 5,922,315 A | 7/1999 | Roy | |
| 5,945,335 A | 8/1999 | Colosi | |
| 5,962,311 A | 10/1999 | Wickham et al. | |
| 5,965,541 A | 10/1999 | Wickham et al. | |
| 5,972,706 A | 10/1999 | McCormick | |
| 6,020,172 A | 2/2000 | Both | |
| 6,069,134 A | 5/2000 | Roth et al. | |
| 6,127,525 A | 10/2000 | Crystal et al. | |
| 6,133,243 A | 10/2000 | Kirn | |
| 6,153,435 A | 11/2000 | Crystal et al. | |
| 6,296,845 B1 | 10/2001 | Sampson et al. | |
| 6,329,190 B1 | 12/2001 | Wickham et al. | |
| 6,410,010 B1 | 6/2002 | Zhang et al. | |
| 6,455,314 B1 | 9/2002 | Wickham et al. | |
| 6,465,253 B1 | 10/2002 | Wickham et al. | |
| 6,475,480 B1 | 11/2002 | Mehtali et al. | |
| 6,506,379 B1 | 1/2003 | Clackson et al. | |
| 6,506,602 B1 | 1/2003 | Stemmer | |
| 6,569,677 B1 | 5/2003 | Legrand et al. | |
| 6,596,268 B1 | 7/2003 | Coffey et al. | |
| 6,635,466 B2 | 10/2003 | Davidson et al. | |
| 6,635,476 B1 | 10/2003 | Murphy | |
| 6,649,157 B2 | 11/2003 | Coffey et al. | |
| 6,737,234 B1 | 5/2004 | Freimuth | |
| 6,740,525 B2 | 5/2004 | Roelvink et al. | |
| 6,797,702 B1 | 9/2004 | Roth et al. | |

(Continued)

FOREIGN PATENT DOCUMENTS

| | | |
|---|---|---|
| CN | 1330715 A | 1/2002 |
| CN | 1380420 A | 11/2002 |

(Continued)

OTHER PUBLICATIONS

Bradshaw et al., J. Control. Rel., 2012, 164: 394-402.*

(Continued)

*Primary Examiner* — Ileana Popa

(74) *Attorney, Agent, or Firm* — Klarquist Sparkman, LLP

(57) ABSTRACT

Recombinant adenoviruses that selectively replicate in E2F deregulated tumor cells are described. The recombinant adenoviruses have a genome encoding a modified E1A protein, a modified or deleted E4orf1 protein, a modified or deleted E4orf6/7 protein, or any combination thereof, such that the recombinant adenoviruses exhibit replication defects in normal cells compared to tumor cells. In some instances, the recombinant adenovirus genomes encode additional modifications that target the recombinant adenoviruses to specific cell types, detarget the viruses from the liver, inhibit viral replication in the liver, and/or evade pre-existing neutralizing antibodies.

26 Claims, 44 Drawing Sheets

Specification includes a Sequence Listing.

(56) References Cited

U.S. PATENT DOCUMENTS

| | | |
|---|---|---|
| 6,811,774 B2 | 11/2004 | Haddada et al. |
| 6,824,771 B1 | 11/2004 | Curiel et al. |
| 6,838,285 B2 | 1/2005 | Farmer et al. |
| 6,841,540 B1 | 1/2005 | Curiel et al. |
| 6,849,446 B2 | 2/2005 | Tikoo et al. |
| 6,867,022 B1 | 3/2005 | Imperiale |
| 6,869,936 B1 | 3/2005 | Vogels et al. |
| 6,878,549 B1 | 4/2005 | Vogels et al. |
| 6,905,678 B2 | 6/2005 | Havenga et al. |
| 6,911,199 B2 | 6/2005 | Vigne et al. |
| 6,911,200 B2 | 6/2005 | Yu et al. |
| 6,913,922 B1 | 7/2005 | Bout et al. |
| 6,929,946 B1 | 8/2005 | Vogels et al. |
| 6,951,755 B2 | 10/2005 | Wickham et al. |
| 6,984,635 B1 | 1/2006 | Schreiber et al. |
| 7,001,596 B1 | 2/2006 | Johnson et al. |
| 7,045,347 B2 | 5/2006 | Graham et al. |
| 7,094,398 B1 | 8/2006 | Lieber et al. |
| 7,094,399 B2 | 8/2006 | Otto |
| 7,109,179 B2 | 9/2006 | Roth et al. |
| 7,157,266 B2 | 1/2007 | Freimuth et al. |
| 7,232,899 B2 | 6/2007 | Von Seggern et al. |
| 7,235,233 B2 | 6/2007 | Havenga et al. |
| 7,247,472 B2 | 7/2007 | Wilson et al. |
| 7,252,817 B2 | 8/2007 | Coffey et al. |
| 7,252,989 B1 | 8/2007 | Zhang et al. |
| 7,256,036 B2 | 8/2007 | Legrand et al. |
| 7,291,498 B2 | 11/2007 | Roy et al. |
| 7,297,542 B2 | 11/2007 | Curiel et al. |
| 7,306,793 B2 | 12/2007 | Haddada et al. |
| 7,332,337 B2 | 2/2008 | van Es et al. |
| 7,344,711 B2 | 3/2008 | Bonastre et al. |
| 7,344,872 B2 | 3/2008 | Gao et al. |
| 7,364,727 B2 | 4/2008 | Li et al. |
| 7,410,954 B2 | 8/2008 | Davidson et al. |
| 7,456,008 B2 | 11/2008 | Lindholm et al. |
| 7,473,418 B2 | 1/2009 | Yu et al. |
| 7,482,156 B2 | 1/2009 | Arroyo et al. |
| 7,491,508 B2 | 2/2009 | Roy et al. |
| 7,510,868 B2 | 3/2009 | Harden et al. |
| 7,589,069 B1 | 9/2009 | Wold et al. |
| 7,611,868 B2 | 11/2009 | Monaci et al. |
| 7,741,099 B2 | 6/2010 | Havenga et al. |
| 7,749,493 B2 | 7/2010 | Havenga et al. |
| 7,754,201 B2 | 7/2010 | Wang et al. |
| 7,906,113 B2 | 3/2011 | Bout et al. |
| 7,943,373 B2 | 5/2011 | Fujiwara et al. |
| 7,951,585 B2 | 5/2011 | Ke |
| 7,968,333 B2 | 6/2011 | Yu et al. |
| 8,105,574 B2 | 1/2012 | Wilson et al. |
| 8,168,168 B2 | 5/2012 | Fueyo et al. |
| 8,231,880 B2 | 7/2012 | Roy et al. |
| 8,470,310 B2 | 6/2013 | Roy et al. |
| 8,524,219 B2 | 9/2013 | Roy et al. |
| 8,603,459 B2 | 12/2013 | Wilson et al. |
| 8,685,387 B2 | 4/2014 | Roy et al. |
| 8,715,642 B2 | 5/2014 | Kochanek et al. |
| 8,765,146 B2 | 7/2014 | Bruder et al. |
| 8,765,463 B2 | 7/2014 | Harden et al. |
| 8,808,986 B2 | 8/2014 | Jacobson et al. |
| 8,815,563 B2 | 8/2014 | Davis et al. |
| 8,834,863 B2 | 9/2014 | Roy et al. |
| 8,846,031 B2 | 9/2014 | Roy et al. |
| 8,865,182 B2 | 10/2014 | Mayall et al. |
| 8,920,813 B2 | 12/2014 | Bruder et al. |
| 8,940,290 B2 | 1/2015 | Roy et al. |
| 8,974,777 B2 | 3/2015 | Cascallo et al. |
| 9,017,672 B2 | 4/2015 | Yu et al. |
| 9,018,182 B2 | 4/2015 | Koh et al. |
| 9,056,090 B2 | 6/2015 | Colloca et al. |
| 9,061,055 B2 | 6/2015 | Fueyo et al. |
| 9,133,483 B2 | 9/2015 | Wilson et al. |
| 9,163,261 B2 | 10/2015 | Kollipara et al. |
| 9,187,733 B2 | 11/2015 | O'Shea et al. |
| 9,200,041 B2 | 12/2015 | Lieber et al. |
| 9,206,238 B2 | 12/2015 | Roy et al. |
| 9,217,159 B2 | 12/2015 | Roy et al. |
| 9,217,160 B2 | 12/2015 | O'Shea et al. |
| 9,267,153 B2 | 2/2016 | Curiel |
| 9,315,827 B2 | 4/2016 | Wang et al. |
| 9,359,618 B2 | 6/2016 | Roy et al. |
| 9,382,551 B2 | 7/2016 | Roy et al. |
| 9,410,129 B2 | 8/2016 | Ranki et al. |
| 9,476,061 B2 | 10/2016 | Baker et al. |
| 9,493,745 B2 | 11/2016 | Lee et al. |
| 9,555,089 B2 | 1/2017 | Shiratsuchi et al. |
| 9,593,346 B2 | 3/2017 | Roy et al. |
| 9,597,363 B2 | 3/2017 | Roy et al. |
| 9,682,133 B2 | 6/2017 | Crystal et al. |
| 9,688,727 B2 | 6/2017 | Lieber et al. |
| 9,714,435 B2 | 7/2017 | Dicks et al. |
| 9,718,863 B2 | 8/2017 | Colloca et al. |
| 9,790,519 B2 | 10/2017 | Wei et al. |
| 9,885,090 B2 | 2/2018 | O'Shea et al. |
| 9,913,866 B2 | 3/2018 | O'Shea et al. |
| 10,016,470 B2 | 7/2018 | Bonastre et al. |
| 10,034,905 B2 | 7/2018 | Seymour et al. |
| 10,046,067 B2 | 8/2018 | Yun et al. |
| 10,066,215 B2 | 9/2018 | Lee et al. |
| 10,071,126 B2 | 9/2018 | Kumon et al. |
| 10,077,430 B2 | 9/2018 | Lee et al. |
| 10,080,774 B2 | 9/2018 | Fueyo et al. |
| 10,113,182 B2 | 10/2018 | Roy et al. |
| 10,149,873 B2 | 12/2018 | Roy et al. |
| 10,150,798 B2 | 12/2018 | Lieber et al. |
| 10,155,930 B2 | 12/2018 | Holm |
| 10,232,053 B2 | 3/2019 | Hicklin et al. |
| 10,272,162 B2 | 4/2019 | McVey et al. |
| 10,294,493 B2 | 5/2019 | Wang et al. |
| 10,316,065 B2 | 6/2019 | Carrió et al. |
| 10,376,549 B2 | 8/2019 | Shayakhmetov et al. |
| 10,391,183 B2 | 8/2019 | Fueyo-Margareto et al. |
| 10,501,757 B2 | 12/2019 | Roy et al. |
| 10,538,744 B2 | 1/2020 | Holm |
| 10,544,192 B2 | 1/2020 | Colloca et al. |
| 10,577,589 B2 | 3/2020 | O'Shea et al. |
| 10,604,549 B2 | 3/2020 | Alemany Bonastre et al. |
| 10,611,803 B2 | 4/2020 | Lieber et al. |
| 10,617,729 B2 | 4/2020 | Dobbins |
| 10,738,325 B2 | 8/2020 | O'Shea et al. |
| 11,077,156 B2 | 8/2021 | O'Shea et al. |
| 11,130,968 B2 | 9/2021 | O'Shea et al. |
| 11,401,529 B2 | 8/2022 | O'Shea et al. |
| 12,281,324 B2 | 4/2025 | O'Shea et al. |
| 2001/0039046 A1 | 11/2001 | Yeh et al. |
| 2002/0037274 A1 | 3/2002 | Williams et al. |
| 2002/0086411 A1 | 7/2002 | Holm et al. |
| 2002/0106382 A1 | 8/2002 | Young et al. |
| 2002/0142989 A1 | 10/2002 | Alemany et al. |
| 2002/0151069 A1 | 10/2002 | Korokhov |
| 2002/0168343 A1 | 11/2002 | Curiel et al. |
| 2002/0187128 A1 | 12/2002 | Imperiale |
| 2002/0193327 A1 | 12/2002 | Nemerow |
| 2002/0193328 A1 | 12/2002 | Ketner |
| 2003/0017138 A1 | 1/2003 | Havenga et al. |
| 2003/0021768 A1 | 1/2003 | Shen |
| 2003/0027338 A1 | 2/2003 | Freimuth |
| 2003/0073072 A1 | 4/2003 | Havenga et al. |
| 2003/0082146 A1 | 5/2003 | van Es |
| 2003/0082150 A1 | 5/2003 | Boon Falleur et al. |
| 2003/0082811 A1 | 5/2003 | Orlando et al. |
| 2003/0092162 A1 | 5/2003 | Shankara et al. |
| 2003/0095989 A1 | 5/2003 | Irving et al. |
| 2003/0099615 A1 | 5/2003 | Tikoo |
| 2003/0099619 A1 | 5/2003 | Wickham et al. |
| 2003/0104625 A1 | 6/2003 | Cheng et al. |
| 2003/0138405 A1* | 7/2003 | Fueyo ............... C07K 14/005 424/93.2 |
| 2003/0143730 A1 | 7/2003 | Blanche et al. |
| 2003/0166286 A1 | 9/2003 | Wickham et al. |
| 2003/0170899 A1 | 9/2003 | McVey et al. |
| 2003/0175244 A1 | 9/2003 | Curiel et al. |
| 2003/0175245 A1 | 9/2003 | Brough et al. |
| 2003/0215948 A1 | 11/2003 | Kaleko et al. |

(56) References Cited

U.S. PATENT DOCUMENTS

| | | |
|---|---|---|
| 2003/0219899 A1 | 11/2003 | Korokhov |
| 2003/0220284 A1 | 11/2003 | Yotnda et al. |
| 2004/0002060 A1 | 1/2004 | Kaleko et al. |
| 2004/0038205 A1 | 2/2004 | Van Raaij et al. |
| 2004/0091456 A1 | 5/2004 | Nakai et al. |
| 2004/0102382 A1 | 5/2004 | Schughart et al. |
| 2004/0146489 A1 | 7/2004 | Yu et al. |
| 2004/0175362 A1 | 9/2004 | Curiel et al. |
| 2004/0185555 A1 | 9/2004 | Emini et al. |
| 2004/0191222 A1 | 9/2004 | Emini et al. |
| 2004/0191761 A1 | 9/2004 | Routes |
| 2004/0213764 A1 | 10/2004 | Wold et al. |
| 2004/0219516 A1 | 11/2004 | Bennett et al. |
| 2004/0219543 A1 | 11/2004 | Wirtz |
| 2004/0265277 A1 | 12/2004 | Holm |
| 2005/0032045 A1 | 2/2005 | Tikoo et al. |
| 2005/0036989 A1 | 2/2005 | Shen et al. |
| 2005/0079158 A1 | 4/2005 | Zhou et al. |
| 2005/0095231 A1 | 5/2005 | Curiel et al. |
| 2005/0095705 A1 | 5/2005 | Kadan et al. |
| 2005/0169891 A1 | 8/2005 | Vogels et al. |
| 2005/0181507 A1 | 8/2005 | Havenga et al. |
| 2005/0186178 A1 | 8/2005 | Ennist |
| 2005/0201936 A1 | 9/2005 | Wold et al. |
| 2005/0201978 A1 | 9/2005 | Lipton |
| 2005/0232900 A1 | 10/2005 | Vogels et al. |
| 2005/0238622 A1 | 10/2005 | Axelrod et al. |
| 2005/0260162 A1 | 11/2005 | Fueyo et al. |
| 2005/0271622 A1 | 12/2005 | Zhou et al. |
| 2005/0277193 A1 | 12/2005 | Wickham et al. |
| 2005/0287120 A1 | 12/2005 | Fisher et al. |
| 2006/0002893 A1 | 1/2006 | Vigne et al. |
| 2006/0034804 A1 | 2/2006 | Gregory et al. |
| 2006/0099178 A1 | 5/2006 | Holm |
| 2006/0104953 A1 | 5/2006 | Havenga et al. |
| 2006/0140910 A1 | 6/2006 | Gregory et al. |
| 2006/0147420 A1 | 7/2006 | Fueyo et al. |
| 2006/0182718 A1 | 8/2006 | Roth et al. |
| 2006/0211115 A1 | 9/2006 | Roy et al. |
| 2006/0228334 A1 | 10/2006 | Rosa Calatrava et al. |
| 2006/0257370 A1 | 11/2006 | Hermiston et al. |
| 2006/0281090 A1 | 12/2006 | Lieber et al. |
| 2006/0286121 A1 | 12/2006 | Gall et al. |
| 2006/0292122 A1 | 12/2006 | Hermiston et al. |
| 2006/0292682 A1 | 12/2006 | Hawkins et al. |
| 2007/0003923 A1 | 1/2007 | Nemerow |
| 2007/0110719 A1 | 5/2007 | Holm |
| 2007/0122817 A1 | 5/2007 | Church et al. |
| 2007/0202080 A1 | 8/2007 | Yun et al. |
| 2007/0202524 A1 | 8/2007 | Murphy |
| 2007/0253932 A1 | 11/2007 | Gregory et al. |
| 2007/0254357 A1 | 11/2007 | Gregory et al. |
| 2007/0292396 A1 | 12/2007 | Fueyo et al. |
| 2007/0292954 A1 | 12/2007 | Elledge |
| 2008/0069836 A1 | 3/2008 | Nabel et al. |
| 2008/0089864 A1 | 4/2008 | Bonastre et al. |
| 2008/0108129 A1 | 5/2008 | Pitcovski et al. |
| 2008/0112929 A1 | 5/2008 | Kovesdi et al. |
| 2008/0118470 A1 | 5/2008 | Ennist et al. |
| 2008/0124360 A1 | 5/2008 | Seggern |
| 2008/0213220 A1 | 9/2008 | Fisher et al. |
| 2008/0242608 A1 | 10/2008 | Bonni et al. |
| 2008/0247996 A1 | 10/2008 | Yu et al. |
| 2008/0254059 A1 | 10/2008 | Bett et al. |
| 2009/0074810 A1 | 3/2009 | Roy et al. |
| 2009/0111144 A1 | 4/2009 | Bebbington |
| 2009/0202565 A1 | 8/2009 | Labow et al. |
| 2009/0232800 A1 | 9/2009 | Holm |
| 2009/0280089 A1 | 11/2009 | Benihoud et al. |
| 2009/0311219 A1 | 12/2009 | Bonastre et al. |
| 2010/0008977 A1 | 1/2010 | Boulikas et al. |
| 2010/0034774 A1 | 2/2010 | Vogels et al. |
| 2010/0047208 A1 | 2/2010 | Ke |
| 2010/0075951 A1 | 3/2010 | Cardin et al. |
| 2010/0075998 A1 | 3/2010 | Vanotti et al. |
| 2010/0098668 A1 | 4/2010 | Seth |
| 2010/0151576 A1 | 6/2010 | Li et al. |
| 2010/0233125 A1 | 9/2010 | Tagawa |
| 2010/0272753 A1 | 10/2010 | Ketner et al. |
| 2010/0292166 A1 | 11/2010 | Lee et al. |
| 2010/0310554 A1 | 12/2010 | Holm |
| 2010/0311145 A1 | 12/2010 | Holm |
| 2011/0053249 A1 | 3/2011 | Bonastre et al. |
| 2011/0059135 A1 | 3/2011 | Kovesdi et al. |
| 2011/0086063 A1 | 4/2011 | Crystal et al. |
| 2011/0104788 A1 | 5/2011 | Baker et al. |
| 2011/0189234 A1 | 8/2011 | Van Beusechem et al. |
| 2011/0256524 A1 | 10/2011 | Lee et al. |
| 2011/0275093 A1 | 11/2011 | Holm |
| 2011/0286999 A1 | 11/2011 | Holm |
| 2012/0020924 A1 | 1/2012 | Nakai et al. |
| 2012/0039877 A1 | 2/2012 | Holm |
| 2012/0207711 A1 | 8/2012 | Fueyo et al. |
| 2013/0058897 A1 | 3/2013 | Lee et al. |
| 2013/0101557 A1 | 4/2013 | Yun et al. |
| 2013/0130292 A1 | 5/2013 | Szalay et al. |
| 2013/0231267 A1 | 9/2013 | O'Shea et al. |
| 2013/0243729 A1 | 9/2013 | O'Shea et al. |
| 2013/0243731 A1 | 9/2013 | Dias et al. |
| 2013/0323205 A1 | 12/2013 | Diaconu et al. |
| 2013/0345295 A1 | 12/2013 | Wang et al. |
| 2014/0023619 A1 | 1/2014 | Kosai et al. |
| 2014/0199688 A1 | 7/2014 | Mizuguchi et al. |
| 2014/0294890 A1 | 10/2014 | Ketner et al. |
| 2014/0341857 A1 | 11/2014 | Bressy et al. |
| 2014/0348791 A1 | 11/2014 | Barouch et al. |
| 2014/0377294 A1 | 12/2014 | Fueyo-Margareto et al. |
| 2014/0377295 A1 | 12/2014 | Ertl et al. |
| 2015/0005397 A1 | 1/2015 | O'Shea et al. |
| 2015/0017127 A1 | 1/2015 | O'Shea et al. |
| 2015/0071881 A1 | 3/2015 | Bonastre et al. |
| 2015/0086579 A1 | 3/2015 | Mayall et al. |
| 2015/0202324 A1 | 7/2015 | Hemminki et al. |
| 2015/0232880 A1 | 8/2015 | Hemminki et al. |
| 2015/0246949 A1 | 9/2015 | Lieber et al. |
| 2015/0306160 A1 | 10/2015 | Fueyo et al. |
| 2015/0352203 A1 | 12/2015 | Wilson et al. |
| 2015/0374766 A1 | 12/2015 | O'Shea et al. |
| 2016/0017294 A1 | 1/2016 | Reid et al. |
| 2016/0051603 A1 | 2/2016 | Roy et al. |
| 2016/0053235 A1 | 2/2016 | O'Shea et al. |
| 2016/0082100 A1 | 3/2016 | Ranki et al. |
| 2016/0090574 A1 | 3/2016 | Fisher et al. |
| 2016/0102295 A1 | 4/2016 | Roy et al. |
| 2016/0143967 A1 | 5/2016 | Fueyo-Margareto et al. |
| 2016/0208287 A1 | 7/2016 | Hemminki et al. |
| 2016/0244783 A1 | 8/2016 | Roy et al. |
| 2016/0289645 A1 | 10/2016 | Tufaro et al. |
| 2017/0035818 A1 | 2/2017 | Seymour et al. |
| 2017/0073647 A1 | 3/2017 | Fisher et al. |
| 2017/0080069 A1 | 3/2017 | Cerullo et al. |
| 2017/0096646 A1 | 4/2017 | Roy et al. |
| 2017/0137786 A1 | 5/2017 | Hemminki et al. |
| 2017/0183636 A1 | 6/2017 | Roy et al. |
| 2017/0190752 A1 | 7/2017 | Holm |
| 2017/0202893 A1 | 7/2017 | O'Shea et al. |
| 2017/0252443 A1 | 9/2017 | Holm |
| 2017/0314044 A1 | 11/2017 | Davydova et al. |
| 2017/0348405 A1 | 12/2017 | Shiratsuchi et al. |
| 2018/0000966 A1 | 1/2018 | Dicks et al. |
| 2018/0051301 A1 | 2/2018 | Rentschler et al. |
| 2018/0072809 A1 | 3/2018 | Hemminki et al. |
| 2018/0100164 A1 | 4/2018 | Wei et al. |
| 2018/0100204 A1 | 4/2018 | O'Shea et al. |
| 2018/0104288 A1 | 4/2018 | Galili et al. |
| 2018/0147245 A1 | 5/2018 | O'Shea et al. |
| 2018/0163190 A1 | 6/2018 | Gerardy-Schahn et al. |
| 2018/0216081 A1 | 8/2018 | Colloca et al. |
| 2018/0221423 A1 | 8/2018 | O'Shea et al. |
| 2018/0318365 A1 | 11/2018 | Yeung et al. |
| 2018/0346929 A1 | 12/2018 | Kosai et al. |
| 2018/0355374 A1 | 12/2018 | O'Shea et al. |
| 2018/0355379 A1 | 12/2018 | O'Shea et al. |
| 2018/0369417 A1 | 12/2018 | Yun et al. |

(56) References Cited

U.S. PATENT DOCUMENTS

| | | |
|---|---|---|
| 2019/0055522 A1 | 2/2019 | Holm |
| 2019/0062395 A1 | 2/2019 | Merchant et al. |
| 2019/0070233 A1 | 3/2019 | Yeung et al. |
| 2019/0093085 A1 | 3/2019 | Tufaro et al. |
| 2019/0136204 A1 | 5/2019 | Reid et al. |
| 2019/0142967 A1 | 5/2019 | Hicklin et al. |
| 2019/0175716 A1 | 6/2019 | Gilbert et al. |
| 2019/0183946 A1 | 6/2019 | Bonastre et al. |
| 2019/0201462 A1 | 7/2019 | Tufaro et al. |
| 2019/0201551 A1 | 7/2019 | Curiel |
| 2019/0233845 A1 | 8/2019 | Maloveste et al. |
| 2019/0247452 A1 | 8/2019 | Lan et al. |
| 2019/0269794 A1 | 9/2019 | McVey et al. |
| 2019/0275092 A1 | 9/2019 | Tufaro et al. |
| 2019/0275093 A1 | 9/2019 | Aboody et al. |
| 2019/0300905 A1 | 10/2019 | Ammendola et al. |
| 2019/0314523 A1 | 10/2019 | O'Shea et al. |
| 2019/0314525 A1 | 10/2019 | O'Shea et al. |
| 2019/0345204 A1 | 11/2019 | Carrió et al. |
| 2019/0350992 A1 | 11/2019 | Cascallo Piqueras et al. |
| 2019/0352616 A1 | 11/2019 | Reid et al. |
| 2019/0352669 A1 | 11/2019 | Reid et al. |
| 2019/0374589 A1 | 12/2019 | Suzuki et al. |
| 2019/0388487 A1 | 12/2019 | Shayakhmetov et al. |
| 2020/0014798 A1 | 1/2020 | Hicklin et al. |
| 2020/0032223 A1 | 1/2020 | Reid et al. |
| 2020/0078415 A1 | 3/2020 | Reid et al. |
| 2020/0095560 A1 | 3/2020 | Holm |
| 2020/0102352 A1 | 4/2020 | Colloca et al. |
| 2020/0149014 A1 | 5/2020 | O'Shea et al. |
| 2020/0325492 A1 | 10/2020 | O'Shea et al. |
| 2021/0024587 A1 | 1/2021 | O'Shea et al. |
| 2022/0090123 A1 | 3/2022 | O'Shea et al. |
| 2022/0096577 A1 | 3/2022 | O'Shea et al. |

FOREIGN PATENT DOCUMENTS

| | | |
|---|---|---|
| CN | 102191245 A | 9/2011 |
| EP | 0689447 | 4/1999 |
| EP | 0931830 | 3/2001 |
| EP | 0760675 | 8/2001 |
| EP | 1167533 | 1/2002 |
| EP | 1284294 | 2/2003 |
| EP | 1413586 | 4/2004 |
| EP | 1196616 | 12/2004 |
| EP | 1185279 | 1/2005 |
| EP | 0851769 | 2/2005 |
| EP | 0861329 | 3/2005 |
| EP | 1181382 | 3/2005 |
| EP | 1121137 | 7/2005 |
| EP | 0991763 | 9/2005 |
| EP | 1294918 | 10/2005 |
| EP | 0889969 | 11/2005 |
| EP | 1498129 | 11/2005 |
| EP | 1593742 | 11/2005 |
| EP | 0920524 | 12/2005 |
| EP | 1307573 | 1/2006 |
| EP | 0978566 | 5/2006 |
| EP | 0778889 | 7/2006 |
| EP | 1070118 | 10/2006 |
| EP | 1214098 | 11/2006 |
| EP | 1230378 | 6/2007 |
| EP | 1550722 | 6/2007 |
| EP | 1187919 | 11/2007 |
| EP | 0863987 | 1/2008 |
| EP | 0920514 | 1/2008 |
| EP | 1159438 | 7/2008 |
| EP | 1266022 | 10/2008 |
| EP | 1678193 | 12/2008 |
| EP | 1054064 | 12/2009 |
| EP | 2012822 | 1/2010 |
| EP | 1816204 | 10/2010 |
| EP | 1749098 | 12/2010 |
| EP | 1799836 | 12/2010 |
| EP | 1816205 | 8/2011 |
| EP | 1818408 | 8/2011 |
| EP | 1409748 | 10/2011 |
| EP | 1180932 | 1/2012 |
| EP | 1466001 | 4/2012 |
| EP | 1743041 | 6/2012 |
| EP | 1446479 | 8/2012 |
| EP | 1649028 | 8/2012 |
| EP | 1990418 | 8/2012 |
| EP | 2311499 | 8/2012 |
| EP | 1636370 | 4/2014 |
| EP | 1767642 | 4/2014 |
| EP | 1689445 | 2/2015 |
| EP | 2350269 | 9/2015 |
| EP | 2403951 | 9/2015 |
| EP | 2643465 | 5/2016 |
| EP | 2428229 | 8/2016 |
| EP | 2459716 | 8/2016 |
| EP | 2220241 | 9/2016 |
| EP | 2325298 | 10/2016 |
| EP | 2379586 | 11/2016 |
| EP | 2220242 | 12/2016 |
| EP | 2774985 | 12/2016 |
| EP | 2163260 | 3/2017 |
| EP | 2580234 | 3/2017 |
| EP | 2798069 | 3/2017 |
| EP | 2855685 | 3/2017 |
| EP | 2900818 | 6/2017 |
| EP | 2301582 | 7/2017 |
| EP | 3049520 | 7/2017 |
| EP | 1453543 | 8/2017 |
| EP | 2463362 | 11/2017 |
| EP | 2558481 | 12/2017 |
| EP | 2682459 | 12/2017 |
| EP | 2714916 | 1/2018 |
| EP | 2391638 | 6/2018 |
| EP | 2563919 | 6/2018 |
| EP | 2971008 | 7/2018 |
| EP | 2606137 | 8/2018 |
| EP | 2855669 | 10/2018 |
| EP | 2986311 | 11/2018 |
| EP | 3145537 | 12/2018 |
| EP | 2654786 | 2/2019 |
| EP | 3280798 | 6/2019 |
| EP | 3029144 | 7/2019 |
| EP | 3150706 | 7/2019 |
| EP | 2809788 | 9/2019 |
| EP | 3071697 | 10/2019 |
| EP | 3274363 | 10/2019 |
| EP | 3460052 | 10/2019 |
| JP | 2005-525779 | 9/2005 |
| JP | 2007-530004 | 11/2007 |
| JP | 2008-517627 | 5/2008 |
| JP | 2010-527324 | 8/2010 |
| JP | 2011-524904 | 9/2011 |
| WO | WO 96/18418 | 6/1996 |
| WO | WO 98/54346 | 12/1998 |
| WO | WO 98/55641 | 12/1998 |
| WO | WO 99/44423 | 9/1999 |
| WO | WO 00/03029 | 1/2000 |
| WO | WO 00/22137 | 4/2000 |
| WO | WO 00/42208 | 7/2000 |
| WO | WO 01/02431 | 1/2001 |
| WO | WO 01/004282 | 1/2001 |
| WO | WO 01/21217 | 3/2001 |
| WO | WO 01/23004 | 4/2001 |
| WO | WO 01/90392 | 11/2001 |
| WO | WO 01/98513 | 12/2001 |
| WO | WO 02/46372 | 6/2002 |
| WO | WO 03/064666 | 8/2003 |
| WO | WO 03/076605 | 9/2003 |
| WO | WO 2003/092579 | 11/2003 |
| WO | WO 03/104467 | 12/2003 |
| WO | WO 2004/018627 | 3/2004 |
| WO | WO 2004/031357 | 4/2004 |
| WO | WO 2005/001103 | 1/2005 |
| WO | WO 2005/010149 | 2/2005 |
| WO | WO 2005/023848 | 3/2005 |
| WO | WO 2005/030261 | 4/2005 |
| WO | WO 2005/065348 | 7/2005 |

(56) References Cited

FOREIGN PATENT DOCUMENTS

| WO | WO 2005/075506 | 8/2005 |
|---|---|---|
| WO | WO 2005/107474 | 11/2005 |
| WO | WO 2005/113781 | 12/2005 |
| WO | WO 2005/117993 | 12/2005 |
| WO | WO 2006/086357 | 8/2006 |
| WO | WO 2006/119449 | 11/2006 |
| WO | WO 2007/124065 | 11/2007 |
| WO | WO 2008/095168 | 8/2008 |
| WO | WO 2008/150496 | 12/2008 |
| WO | WO 2009/065800 | 5/2009 |
| WO | WO 2010/024483 | 3/2010 |
| WO | WO 2010/037027 | 4/2010 |
| WO | WO 2011/133040 | 10/2011 |
| WO | WO 2012/003287 | 1/2012 |
| WO | WO 2012/022496 | 2/2012 |
| WO | WO2012/024350 | 2/2012 |
| WO | WO 2012/024351 | 2/2012 |
| WO | WO 2012/038606 | 3/2012 |
| WO | WO 2012/083297 | 6/2012 |
| WO | WO 2013/036791 | 3/2013 |
| WO | WO 2013/135615 | 9/2013 |
| WO | WO 2013/138505 | 9/2013 |
| WO | WO 2014/000026 | 1/2014 |
| WO | WO 2014/153204 | 9/2014 |
| WO | WO 2014/170389 | 10/2014 |
| WO | WO 2015/155370 | 10/2015 |
| WO | WO 2016/049201 | 3/2016 |
| WO | WO 2017/062511 | 4/2017 |
| WO | WO 2017/147265 | 8/2017 |
| WO | WO 2017/147269 | 8/2017 |
| WO | WO 2018/078220 | 5/2018 |
| WO | WO 2018/083257 | 5/2018 |
| WO | WO 2018/083258 | 5/2018 |
| WO | WO 2018/083259 | 5/2018 |
| WO | WO 2018/104919 | 6/2018 |
| WO | WO 2018/201017 | 11/2018 |
| WO | WO 2018/204677 | 11/2018 |
| WO | WO 2018/218083 | 11/2018 |
| WO | WO 2019/016756 | 1/2019 |
| WO | WO 2019/057745 | 3/2019 |
| WO | WO 2019/073059 | 4/2019 |
| WO | WO 2019/086450 | 5/2019 |
| WO | WO 2019/086456 | 5/2019 |
| WO | WO 2019/086461 | 5/2019 |
| WO | WO 2019/086466 | 5/2019 |
| WO | WO 2019/158914 | 8/2019 |
| WO | WO 2019/179977 | 9/2019 |
| WO | WO 2019/179979 | 9/2019 |
| WO | WO 2019/191494 | 10/2019 |
| WO | WO 2019/199859 | 10/2019 |
| WO | WO 2019/202118 | 10/2019 |
| WO | WO 2019/239311 | 12/2019 |
| WO | WO 2020/014539 | 1/2020 |
| WO | WO 2020/046130 | 3/2020 |
| WO | WO 2020/076820 | 4/2020 |

OTHER PUBLICATIONS

Card et al., Cancer Gene Therapy, 2012, 1: 451-459.*
Bett et al., Virus Research, 1995, 39: 75-82.*
Doronin et al., Virology, 2003, 305: 378-387.*
O'Shea, Oncogene, 2005, 24: 7640-7655.*
Alba et al., Blood, 2009, 114: 965-971.*
Fueyo, Oncogene, 2000, 19: 2-12.*
Medina-Kauwe, Adv. Drug. Del. Rev., 2003, 55: 1485-1496.*
Alonso et al., "Combination of the Oncolytic Adenovirus ICOVIR-5 with Chemotherapy Provides Enhanced Anti-Glioma Effect in vivo," Cancer Gene Ther., vol. 14:756-761, 2007.
Bauerschmitz et al., "Tissue-Specific Promoters Active in CD44+ CD24-/low Breast Cancer Cells," Cancer Res., vol. 68:5533-5539, 2008.
Fuerer et al., "Adenoviruses with Tcf Binding Sites in Multiple Early Promoters Show Enhanced Selectivity for Tumour Cells with Constitutive Activation of the wnt Signalling Pathway," Gene Ther., vol. 9:270-281, 2002.
Holm et al., "Multidrug-resistant Cancer Cells Facilitate E1-independent Adenoviral Replication: Impact for Cancer Gene Therapy," Cancer Res., vol. 64:322-328, 2004.
Javier, "Cell Polarity Proteins: Common Targets for Tumorigenic Human Viruses," Oncogene, vol. 27:7031-7046, 2008.
Johnson, et al., "Selectively Replicating Adenoviruses Targeting Deregulated E2F Activity are Potent, Systemic Antitumor Agents," Cancer Cell, vol. 1:325-337, 2002.
Lopez et al., "A Tumor-stroma Targeted Oncolytic Adenovirus Replicated in Human Ovary Cancer Samples and Inhibited Growth of Disseminated Solid Tumors in Mice," Mol. Ther., vol. 20:2222-2233, 2012.
Nevels et al., "The Adenovirus E4orf6 can Promote E1A/E1B-induced Focus Formation by Interfering with p53 Tumor Suppressor Function," Proc. Natl. Acad. Sci. USA, vol. 94:1206-1211, 1997.
O'Shea et al., "Adenovirus Overrides Cellular Checkpoints for Protein Translation," Cell Cycle, vol. 4:883-888, 2005.
Alonso et al., "Combination of the oncolytic adenovirus ICOVIR-5 with chemotherapy provides enhanced anti-glioma effect in vivo," Cancer Gene Ther., 14:756-761, 2007.
Bauerschmitz et al., "Tissue-Specific Promoters Active in CD44+ CD24-/low Breast Cancer Cells," Cancer Res., 68(14):5533-5539, 2008.
Fuerer and Iggo, "Adenoviruses with Tcf binding sites in multiple early promoters show enhanced selectivity for tumour cells with constitutive activation of the wnt signalling pathway," Gene Ther., 9:270-281, 2002.
Havenga et al., "Novel Replication-Incompetent Adenoviral B-group Vectors: High Vector Stability and Yield in PER.C6 Cells," J. Gen. Virol., vol. 87:2135-2143, 2006.
Heise et al., "An Adenovirus E1A Mutant that Demonstrates Potent and Selective Systemic Anti-Tumoral Efficacy," Nat. Med., vol. 6:1134-1139, 2000.
Helin et al., "Heterodimerization of the Transcription Factors E2F-1 and DP-1 is required for Binding to the Adenovirus E4 (ORF6/7) Protein," J. Virol., vol. 68:5027-5035, 1994.
Holm et al., "Multidrug-resistance Cancer Cells Facilitate E1-independent Adenovirus Replication: Impact for Cancer Gene Therapy," Cancer Res., 64:322-328, 2004.
Javier, "Cell polarity proteins: common targets for tumorigenic human viruses," Oncogene, 27:7031-7046, 2008.
Johnson et al., "Selectively replicating adenoviruses targeting deregulated E2F activity are potent, systemic antitumor agents," Cancer Cell, 1:325-337, 2012.
Kovesdi et al., "Role of an Adenovirus E2 Promoter Binding Factor in E1A Mediated Coordinate Gene Control," Proc. Nat. Acad. Sci. U.S.A., vol. 84:2180-2184, 1987.
Lopez et al., "A Tumor-stroma Targeted Oncolytic Adenovirus Replicated in Human Ovary Cancer Samples and Inhibited Growth of Disseminated Solid Tumors in Mice," Mol. Ther., 20(12):2222-2233, 2012.
McCormick, "Cancer Gene Therapy: Fringe or Cutting Edge?," Nature Rev. Cancer, vol. 1:130-141, 2001.
Nevels et al., "The adenovirus E4orf6 protein can promote E1A/E1B-induced focus formation by interfering with p53 tumor suppressor function," Proc. Natl. Acad. Sci. USA, 94:1206-1211, 1997.
O'Shea et al., "Adenovirus Overrides Cellular Checkpoints for Protein Translation," Cell Cycle, 4(7):883-888, 2005.
O'Shea et al., "DNA Tumor Viruses—the Spies who Lyse US," Curr. Opin. Genet. Dev., vol. 15:18-26, 2005.
Wang et al., "Identification of Specific Adenovirus E1A-N-Terminal Residues Critical to the Binding of Cellular Proteins and to the Control of Cell Growth," J. Virol., vol. 67:476-488, 1993.
Whyte et al., "Association between an Oncogene and an Anti-Oncogene: the Adenovirus E1A Proteins Bind to the Retinoblastoma Gene Product," Nature, vol. 334:124-129, 1988.
O'Shea et al., "Adenoviral proteins mimic nutrient/growth signals to activate the mTOR pathway for viral replication," EMBO J 24:1211-1221, 2005.
Pelka et al., "Adenovirus E1A Directly Targets the E2F/DP-1 Complex," J Virol 85(17):8841-8851, 2011.

(56) References Cited

OTHER PUBLICATIONS

Shapiro et al., "Recombinant Adenoviral Vectors Can Induce Expression of p73 via the E4-orf6/7 Protein," J Virol 80(11):5349-5360, 2006.
Alba et al., "Gutless adenovirus: last-generation adenovirus for gene therapy," Gene Ther 12:S18-S27, 2005.
Alba et al., "Identification of coagulation factor (F)X binding sites on the adenovirus serotype 5 hexon: effect of mutagenesis on FX interactions and gene transfer," Blood 114(5): 965-971, 2009.
Barton, et al., "Second-Generation Replication-Competent Oncolytic Adenovirus Armed with Improved Suicide Genes and ADP Gene Demonstrates Greater Efficacy without Increased Toxicity", Molecular Therapy, 2006, 13(2):347-356.
Batzer et al., "Enhanced evolutionary PCR using oligonucleotides with inosine at the 3'-terminus", Nucleic Acid Research, 1991, 19(18):5081.
Bayle et al., "Rapamycin Analogs with Differential Binding Specificity Permit Orthogonal Control of Protein Activity," Chem Biol 13:99-107, 2006.
Behar et al., "Llama Single-Domain Antibodies Directed against Nonconventional Epitopes of Tumor-Associated Carcinoembryonic Antigen Absent from Nonspecific Cross-Reacting Antigen," FEBS J., vol. 276:3881-3893, 2009.
Belousova et al., "Modulation of Adenovirus Vector Tropism via Incorporation of Polypeptide Ligands into the Fiber Protein," J Virol 76(17):8621-8631, 2002.
Berge et al., "Pharmaceutical Salts", Journal of Pharmaceutical Science, 1977, 66: 1-19.
Bett et al., "DNA sequence of the deletion/insertion in early region 3 of Ad5 dl309," Virus Res 39: 75-82, 1995.
Binkowski et al., "Ligand-Regulated Peptides: A General Approach for Modulating Protein-Peptide Interactions with Small Molecules," Chem. Biol., vol. 12: 847-855, 2005.
Bradshaw et al., "Biodistribution and inflammatory profiles of novel pen ton and hexon double-mutant serotype 5 adenoviruses," J Control Release 164(3): 394-402, 2012.
Bremnes et al., "The Role of Tumor Stroma in Cancer Progression and Prognosis," J. Thorac. Oneal., vol. 6:209-217, 2011.
Card et al., "MicroRNA silencing improves the tumor specificity of adenoviral transgene expression," Cancer Gene Ther 19: 451-459, 2012.
Chen et al., "Identification of an 11-kDa FKBP12-rapamycin-binding domain within the 289-kDa FKBP12-rapamycin-associated protein and characterization of a critical serine residue," Proc Natl Acad Sci USA 92:4947-4951, 1995.
Cheo et al., "Concerted Assembly and Cloning of Multiple DNA Segments Using In Vitro Site-Specific Recombination: Functional Analysis of Multi-Segment Expression Clones," Genome Res 14:2111-2120, 2004.
Chong et al., "A System for Small-Molecule Control of Conditionally Replication—Competent Adenoviral Vectors," Mal Ther 5(2):195-203, 2002.
Chopra, "Recombinant Adenovirus with Enhanced Green Fluorescent Protein," Molecular Imaging and Contrast Agent Database (MICAD), Bethesda, MD: National Center for Biotechnology Information (US) (2004-2013): (Dec. 9, 2007, updated Jan. 2, 2008), 5 pp.
Doronin et al., "Overexpression of Adp (E3-11.6K) Protein Increases Cell Lysis and Spread of Adenovirus," Virology 305: 378-387, 2003.
Doronin et al., "Tumor-Specific, Replication-Competent Adenovirus Vectors Overexpressing the Adenovirus Death Protein," J. Viral., vol. 74:6147-6155, 2000.
Evans et al., "Relocalization of the Mre11-Rad50-Nbs1 Complex by the Adenovirus E4 ORF3 Protein is Required for Viral Replication", Journal of Virology, 2005, 79(10):6207-6215.
Extended European Search Report dated Dec. 11, 2013 for European Application No. 11818698.0, 10 pages.
Extended European Search Report for European Application No. 13760821.2, dated Sep. 30, 2015.
Fang et al., "An Antibody Delivery System for Regulated Expression of Therapeutic Levels of Monoclonal Antibodies In Vivo," Mal. Ther., vol. 15:1153-1159, 2007.
Finke et al., "Tracking Fluorescence-Labeled Rabies Virus: Enhanced Green Fluorescent Protein-Tagged Phosphoprotein P Supports Virus Gene Expression and Formation of Infectious Particles," J. Viral., vol. 78(22): 12333-12343, 2004.
Frese et al., "Selective PDZ protein-dependent stimulation of phosphatidylinositol 3-kinase by the adenovirus E4-ORF1 oncoprotein," Oncogene 22: 710-721, 2003.
Funston et al., "Expression of heterologous genes in oncolytic adenoviruses using picornaviral 2A sequences that trigger ribosome skipping," J Gen Viral 89:389-396, 2008.
Gall et al., "Construction and Characterization of Hexon-Chimeric Adenoviruses: Specification of Adenovirus Serotype," J Virol 72(12): 10260-10264, 1998.
Gibson et al., "Enzymatic Assembly of DNA Molecules up to Several Hundred Kilobases," Nature Meth., vol. 6:343-360, 2009.
Glasgow et al., "A Strategy for Adenovirus Vector Targeting with a Secreted Single Chain Antibody," PLoS One, vol. 4:e8355, 2009.
Hawkins et al., "Gene delivery from the E3 region of replicating human adenovirus: evaluation of the E3B region," Gene Therapy 8, 1142-1148, 2001.
Henikoff et al., "Amino acid substitution matrices from protein blocks", Proc. Natl. Acad. Sci. USA , 1992, 89:10915-10919.
Hernandez-Aya et al. "Targeting the Phosphatidylinositol 3-Kinase Signaling Pathway in Breast Cancer", The Oncologist, 16, pp. 404-414, 2011.
International Preliminary Report on Patentability and Written Opinion dated Feb. 19, 2013 for International Application No. PCT/US2011/048005, 5 pages.
International Search Report dated Mar. 23, 2012 for International Application No. PCT/US2011/048005, 6 pages.
International Search Report and Written Opinion for PCT/US2019/026626, dated Jun. 24, 2019 (12 pages).
Ketzer et al., "Synthetic riboswitches for external regulation of genes transferred by replication-deficient and oncolytic adenoviruses," Nucleic Acids Res 40(21):e167 (10 pages), 2012.
Kim et al., "High Cleavage Efficiency of a 2A Peptide Derived from Porcine Teschovirus-1 in Human Cell Lines, Zebrafish and Mice," PLoS One, vol. 64:e18556, 2011.
Kirn, "Clinical research results with dl1520 (Onyx-015, a replication-selective adenovirus for the treatment of cancer: what have we learned?", Gene Therapy, 2001, 8(2):89-98.
Leicher et al., "Coexpression of the KCNA3B Gene Product with Kv1.5 Leads to a Novel A-type Potassium Channel*", The Journal of Biological Chemistry, 1998, 273(52):35095-35101.
Leppard et al., "Adenovirus type 5 E4 Orf3 protein targets promyelocytic leukaemia (PML) protein nuclear domains for disruption via a sequence in PML isoform II that is predicted as protein as a protein interaction site of bioinformatics anaylsis", Journal of General Virology 2009, 90(1):95-104.
Li et al., "Harnessing homologous recombination in vitro to generate recombinant DNA via SLIC," Nat Methods 4(3):251-256, 2007.
Liu et al., "Oncolytic Adenoviral Vector Carrying the Cytosine Deaminase Gene for Melanoma Gene Therapy," Cancer Gene Ther., vol. 13:845-855, 2006.
Minskaia et al., "Protein Coexpression Using FMDV 2A: Effect of "Linker" Residues," BioMed Research International, vol. 2013, 12 pp.
Mohr, "To replicate or not to replicate: achieving selective oncolytic virus replication in cancer cells through translational control," Oncogene, vol. 24:7697-7709, 2005.
Murakami et al., "Chimeric Adenoviral Vectors Incorporating a Fiber of Human Adenovirus 3 Efficiently Mediate Gene Transfer into Prostate Cancer Cells," The Prostate, vol. 70:362-376, 2009.
NCBI Accession No. CVI 10986, Jan. 11, 2011, 3 pages.
Office Action and Search Report from China Application No. 201380014047.7, dated Aug. 5, 2015 (English translation).
Ono et al., "Noninvasive Visualization of Adenovirus Replication with a Fluorescent Reporter in the E3 Region," Cancer Res., vol. 65: 10154-10158, 2005.

(56) References Cited

OTHER PUBLICATIONS

O'Shea et al., "Viruses—seeking and destroying the tumor program," Oncogene 24: 7640-7655, 2005.
Pearson et al., "Improved tools for biological sequence comparison", Proc. Nat'/. Acad. Sci. USA , 1988, 85:2444-2448.
Rossolini et al., "Use of deoxyinosine-containing primers vs degenerate primers for polymerase chain reaction based on ambiguous sequence information", Mo/. Cell. Probes, 1994, 8:91-98.
Roy et al., "Rescue of chimeric adenoviral vectors to expand the serotype repertoire," J Viral Methods 14:41-21, 2007.
Shepard et al., "E4orf13 is Necessary for Enhanced S-Phase Replication of Cell Cycle-Restricted Subgroup C Adenoviruses," J Virol 77(15):8593-8595, 2003.
Smith et al., "Comparison of Biosequences", Advances in Applied Mathematics, 1981, 2:482-489.
Soria et al., "Heterochromatin silencing of p53 target genes by a small viral protein", Nature, 2010, 466(7310):1076-1083.
Stanton et al. "Re-engineering adenovirus vector systems to enable high-throughput analyses of gene function" Bio Techniques 45: 659-668 (Dec. 2008).
Tan et al., "Coexpression of double or triple copies of the rabies virus glycoprotein gene using a 'self-cleaving' 2A peptide-based replication-defective human adenovirus serotype 5 vector," Biologicals, vol. 38:586-593, 2010.
Ullman et al., "Adenovirus E4 ORF3 Protein Inhibits the Interferon-Mediated Antiviral Response", Journal of Virology, 2007, 81(9):4744-4752.
Verheije et al., "Retargeting of Viruses to Generate Oncolytic Agents," Adv. Viral., vol. 2012:1-15, 2012.
Volk et al., "Enhanced Adenovirus Infection of Melanoma Cells by Fiber-Modification," Cancer Biol Ther 2(5): 511-515, 2003.
Waehler et al., "Engineering targeted viral vectors for gene therapy," Nat Rev Genet 8(8):573-587, 2007.
Warram et al., "A Genetic Strategy for Combined Screening and Localized Imaging of Breast Cancer," Mal Imaging Biol 13:452-461, 2011.
Yaghoubi et al., "Positron Emission Tomography Reporter Genes and Reporter Probes: Gene and Cell Therapy Applications," Theranostics, vol. 2:374-391, 2012.
Yount et al., "Strategy for Systematic Assembly of Large RNA and DNA Genomes: Transmissible Gastroenteritis Virus Model," J. Viral., vol. 74: 10600-10611, 2000.
Shimizu et al., "Development of a Novel Adenovirus Vector Exhibiting MicroRNA-mediated Suppression of the Leaky Expression of Adenovirus Genes," Yakugaku Zasshi, vol. 132:1407-1412, 2012 (in Japanese) (English abstract).
Suzuki et al., "miR-122A-Regulated Expression of a Suicide Gene Prevents Hepatotoxicity Without Altering Antitumor Effects in Suicide Gene Therapy," Mol. Ther., vol. 16:1719-1726, 2008.
Ji et al., "Oncolytic Adenoviruses Delivering Herpes Simplex Virus Thymidine Kinase Suicide Gene Reduces the Growth of Human Retinoblastoma in an in vivo Mouse Model," Experimental Eye Res., vol. 89:193-199, 2009.
Kubo et al., "Complete Regression of Human Malignant Mesothelioma Xenografts Following Local Injection of Midkine Promoter-Driven Oncolytic Adenovirus," J. Gene Med., vol. 12:681-692, 2010.
Li, "Self-Cleaving Fusion Tags for Recombinant Protein Production," Biotechnol. Lett., vol. 33:869-881, 2011.
Loskog, "Immunostimulatory Gene Therapy Using Oncolytic Viruses as Vehicles," Viruses, vol. 7:5780-5791, 2015.
Wu et al., "The Application of Intein in the Research of Membrane Protein," Chemistry of Life, vol. 35:200-205, 2015 (with English abstract).
Hibma et al., "Increased apoptosis and reduced replication efficiency of the E3 region-modified dl309 adenovirus in cancer cells," Virus Res 145:112-120, 2009.
Dias et al., "Targeted cancer immunotherapy with oncolytic adenovirus coding for a fully human monoclonal antibody specific for CTLA-4," Gene Ther 19:988-998, 2012.
Kurihara et al., "Selectivity of a replication-competent adenovirus for human breast carcinoma cells using the MUC1 antigen," J Clin Invest 106:763-771, 2000.
Cho et al., "Efficacy of CD46-targeting chimeric Ad5/35 adenoviral gene therapy for colorectal cancers," Oncotarget 7(25):38210-38223, 2016.
Fukazawa et al., "Adenovirus-mediated cancer gene therapy and virotherapy (review)," Int J Mol Med 25:3-10, 2010.
Hoffman and Wildner, "Comparison on herpes simplex virus- and conditionally replicative adenovirus-based vectors for glioblastoma treatment," Cancer Gene Ther 14:627-639, 2007.
Ishii and Ochiai, "The origin of fibroblast recruited into cancer-induced stromal tissue," KENBIKYO 43(2):104-108, 2008 (in Japanese with English abstract).
Raki et al., "Utility of TK/GCV in the context of highly effective oncolysis mediated by a serotype 3 receptor targeted oncolytic adenovirus," Gene Ther 14:1380-1388, 2007.
Chen et al., "Oncolytic virotherapy in cancer treatment: challenges and optimization prospects," Front. Immunol., vol. 14: 1308890, 14 pages, 2023.
Danthinne et al., "Production of first generation adenovirus vectors: a review," Gene Ther., vol. 7:1707-1714, 2000.
Gao et al., "High throughput creation of recombinant adenovirus vectors by direct cloning, green-white selection and I-Sce I-mediated rescue of circular adenovirus plasmids in 293 cells," Gene Ther., vol. 10:1926-1930, 2003.
Goodrich, "The retinoblastoma tumor suppressor gene, the exception that proves the rule," Oncogene, vol. 25(38):5233-5243, 2006.
Wang et al., "Adenovirus vector-attributed hepatotoxicity blocks clinical application in gene therapy," Cytotherapy, vol. 23:1045-1052, 2021.
Zhang et al., "In vitro and in vivo experimental models for cancer immunotherapy study," Curr. Res. Biotechnol., vol. 7:100210, 11 pages, 2024.
Zheng et al., "Oncolytic Viruses for Cancer Therapy: Barriers and Recent Advances," Mol. Ther. Oncolytics, vol. 15:234-247, 2019.

* cited by examiner

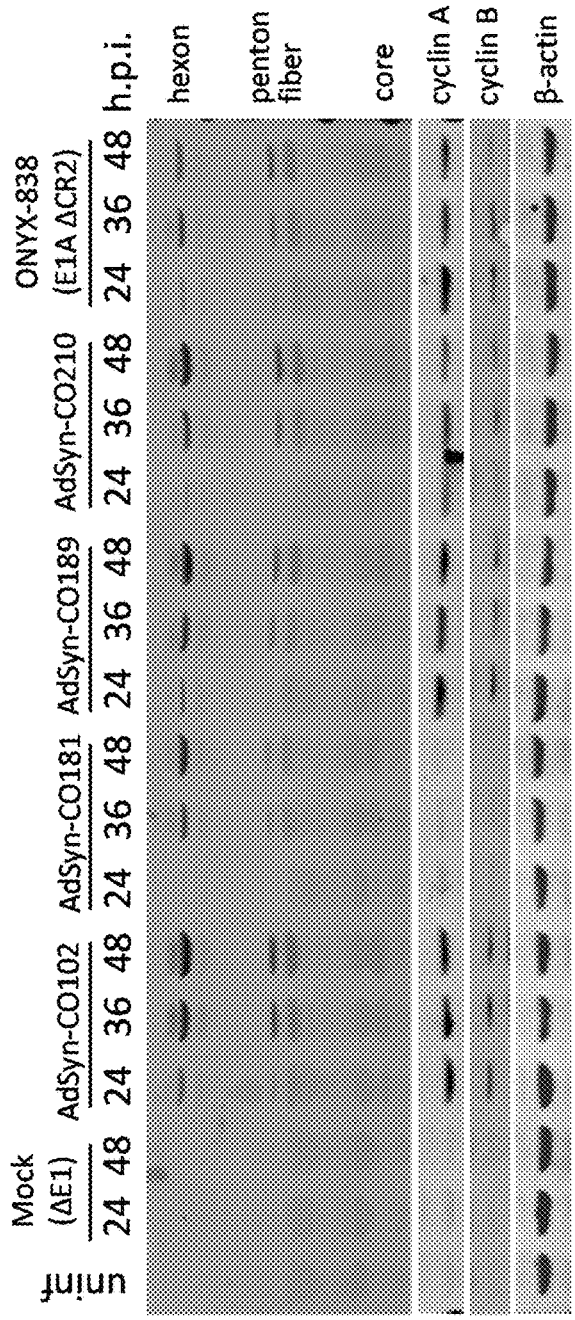
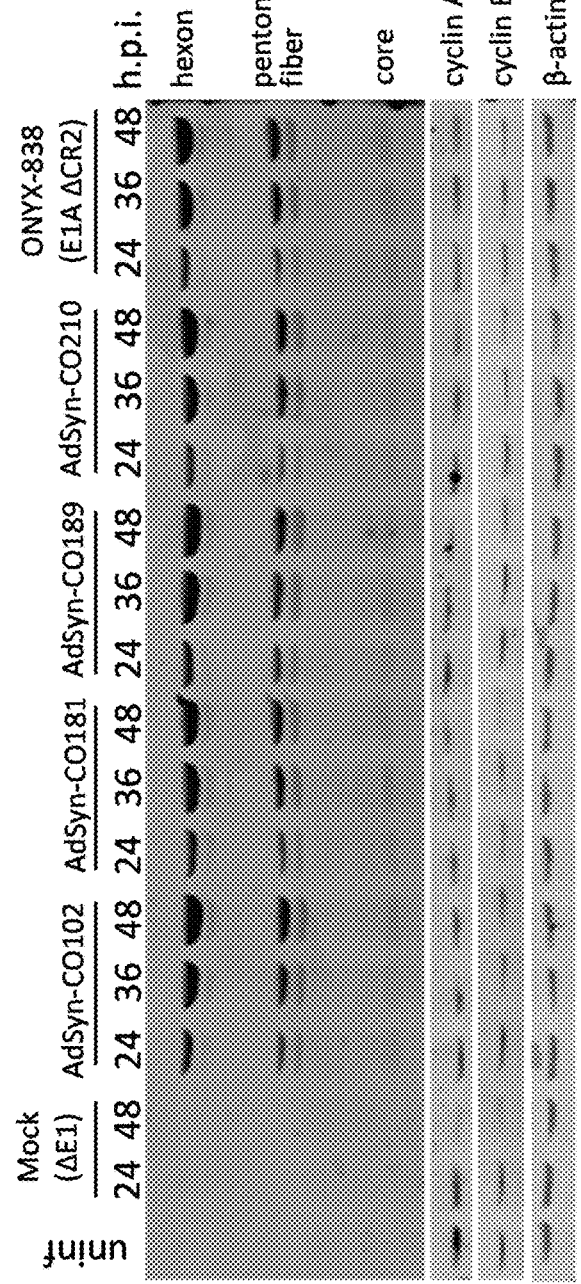
FIG. 2A
FIG. 2B

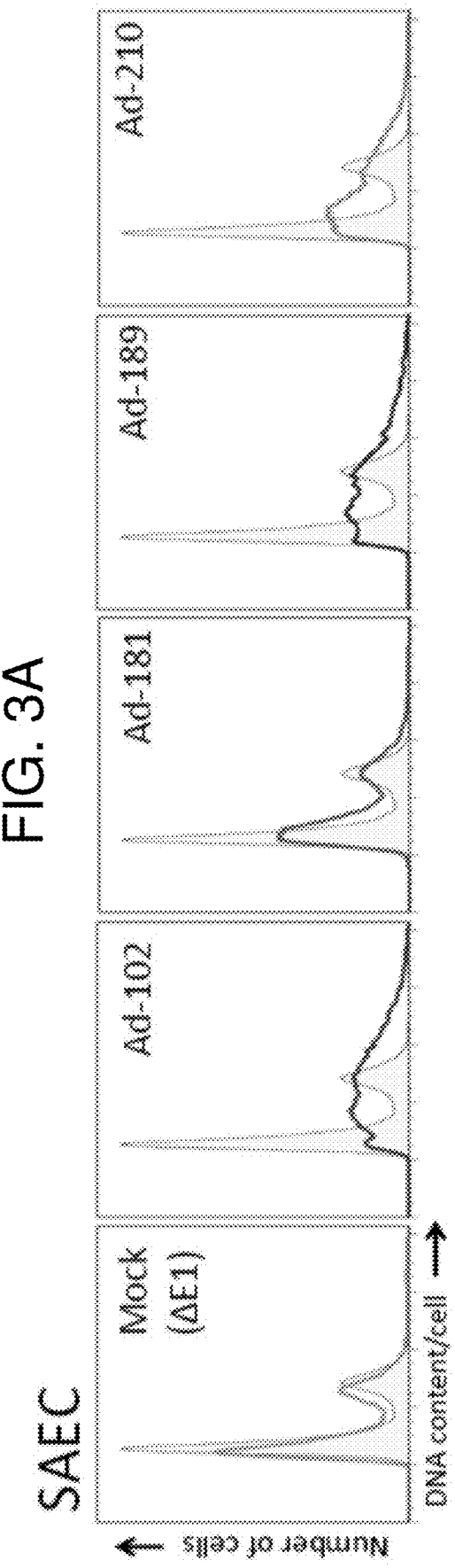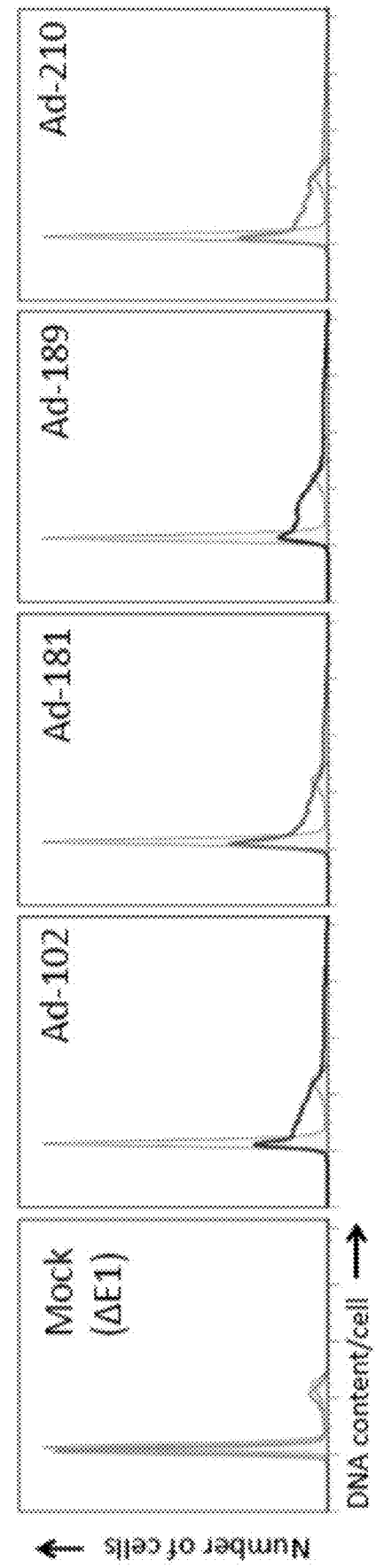

FIG. 5A
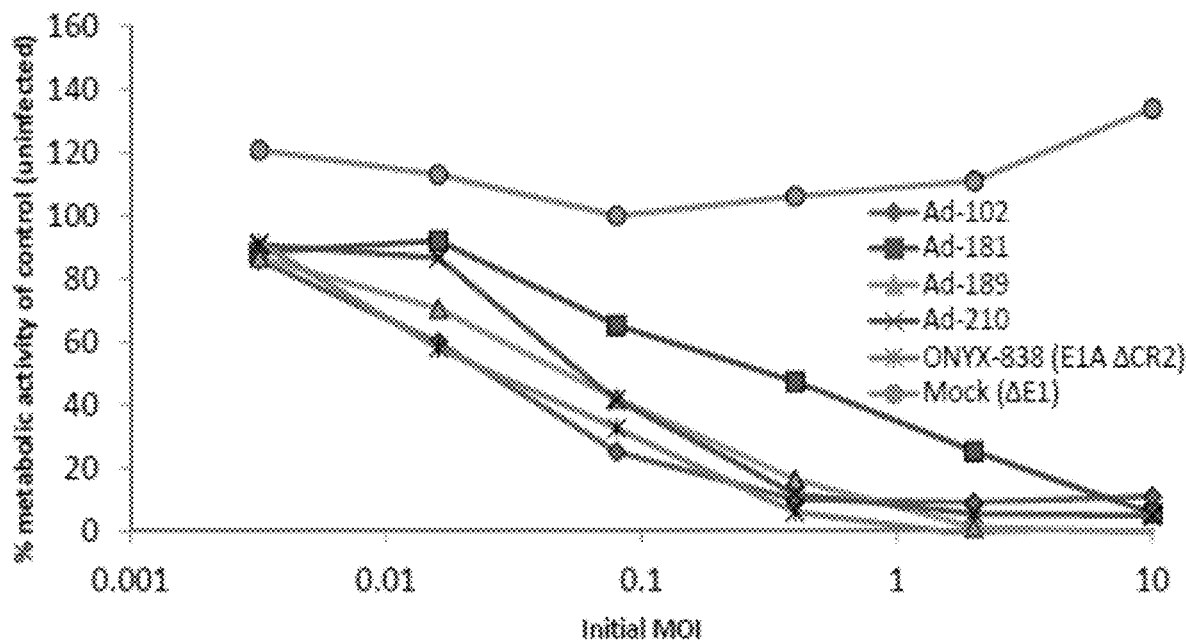
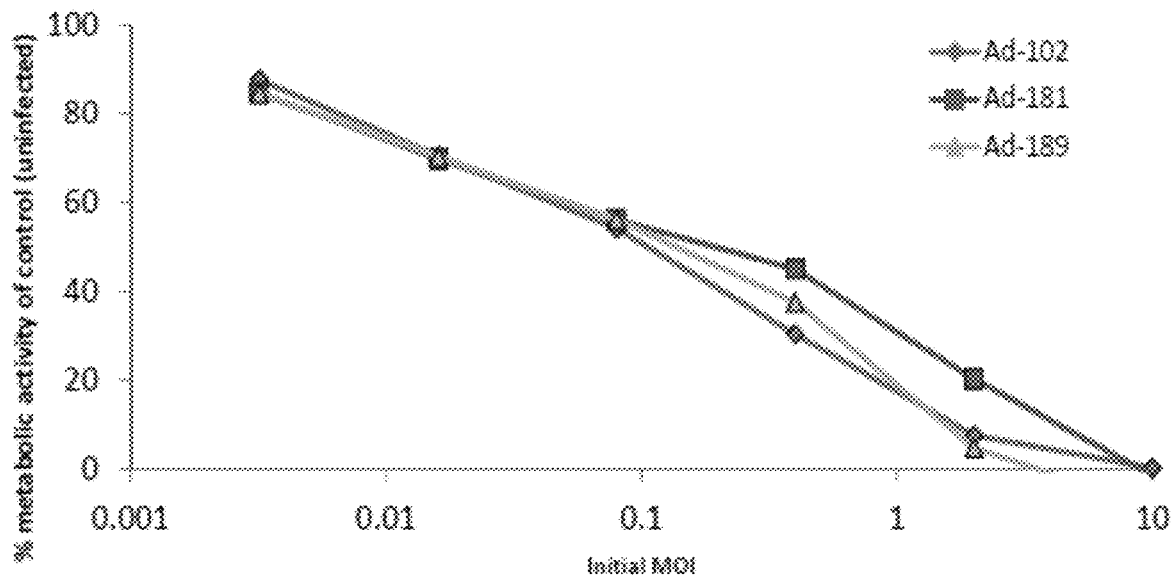
FIG.5B

FIG. 16

| Adenovirus, Initial MOI | NHA 10 | NHA 3.3 | NHA 1.1 | Quiescent SAEC-hTERT 10 | Quiescent SAEC-hTERT 3.3 | Quiescent SAEC-hTERT 1.1 | Proliferating SAEC-hTERT 10 | Proliferating SAEC-hTERT 3.3 | Proliferating SAEC-hTERT 1.1 | A549 10 | A549 3.3 | A549 1.1 | MDA MB 231 10 | MDA MB 231 3.3 | MDA MB 231 1.1 | U87 10 | U87 3.3 | U87 1.1 |
|---|---|---|---|---|---|---|---|---|---|---|---|---|---|---|---|---|---|---|
| AdSyn-CO102 | 27 | 31 | 40 | 8 | 14 | 20 | 4 | 6 | 6 | 3 | 3 | 5 | 6 | 8 | 24 | 34 | 23 | 31 |
| AdSyn-CO210 | 19 | 25 | 32 | 11 | 30 | 50 | 22 | 37 | 59 | 3 | 3 | 4 | 5 | 7 | 30 | 18 | 11 | 16 |
| AdSyn-CO283 | 11 | 17 | 32 | 7 | 19 | 37 | 21 | 47 | 67 | 1 | 1 | 1 | 1 | 4 | 46 | 10 | 14 | 29 |
| AdSyn-CO284 | 14 | 18 | 29 | 57 | 84 | 82 | 13 | 15 | 24 | 0 | 1 | 1 | 1 | 5 | 34 | 16 | 8 | 33 |
| AdSyn-CO236 | 5 | 6 | 32 | 15 | 29 | 59 | 9 | 30 | 50 | 1 | 1 | 1 | 2 | 8 | 26 | 35 | 36 | 68 |
| AdSyn-CO290 | 5 | 21 | 32 | 23 | 49 | 78 | 9 | 10 | 22 | 3 | 3 | 6 | 13 | 27 | 59 | 9 | 11 | 21 |
| AdSyn-CO291 | 5 | 7 | 21 | 4 | 22 | 36 | 9 | 31 | 54 | 3 | 2 | 2 | 2 | 4 | 9 | 49 | 28 | 43 |
| AdSyn-CO292 | 8 | 10 | 24 | 3 | 22 | 36 | 6 | 16 | 44 | 0 | 0 | 1 | 7 | 20 | 34 | 30 | 34 | 47 |
| AdSyn-CO189 | 28 | 32 | 40 | 17 | 46 | 74 | 41 | 65 | 80 | 3 | 3 | 5 | 3 | 8 | 17 | 23 | 37 | 27 |
| AdSyn-CO181 | 39 | 46 | 50 | 78 | 93 | 90 | 98 | 103 | 106 | 3 | 2 | 3 | 20 | 27 | 53 | 32 | 31 | 28 |
| AdSyn-CO285 | 27 | 35 | 46 | 31 | 65 | 81 | 72 | 100 | 106 | 1 | 1 | 3 | 17 | 22 | 38 | 16 | 22 | 57 |
| AdSyn-CO286 | 25 | 36 | 56 | 40 | 70 | 81 | 82 | 102 | 100 | 1 | 1 | 2 | 11 | 21 | 44 | 14 | 18 | 45 |
| AdSyn-CO235 | 14 | 21 | 40 | 16 | 39 | 65 | 26 | 60 | 70 | 1 | 2 | 5 | 15 | 28 | 53 | 29 | 39 | 64 |
| AdSyn-CO287 | 26 | 36 | 51 | 38 | 69 | 76 | 76 | 90 | 95 | 1 | 1 | 2 | 16 | 44 | 66 | 16 | 36 | 51 |
| AdSyn-CO288 | 28 | 32 | 33 | 37 | 70 | 83 | 58 | 96 | 102 | 0 | 0 | 1 | 9 | 16 | 49 | 34 | 36 | 52 |
| AdSyn-CO289 | 33 | 36 | 49 | 55 | 85 | 95 | 69 | 90 | 105 | 1 | 2 | 2 | 1 | 10 | 38 | 29 | 10 | 25 |
| AdSyn-CO238 | 5 | 11 | 33 | 15 | 54 | 84 | 46 | 82 | 73 | 1 | 1 | 2 | 2 | 2 | 11 | 30 | 19 | 40 |
| AdSyn-CO293 | 29 | 36 | 43 | 55 | 84 | 100 | 47 | 61 | 98 | 1 | 1 | 2 | 14 | 22 | 30 | 26 | 13 | 38 |
| AdSyn-CO294 | 31 | 29 | 34 | 74 | 85 | 98 | 62 | 96 | 95 | 1 | 1 | 2 | 14 | 28 | 44 | 37 | 32 | 44 |
| AdSyn-CO295 | 34 | 37 | 38 | 59 | 89 | 96 | 100 | 100 | 99 | 1 | 1 | 2 | 3 | 10 | 30 | 30 | 14 | 54 |
| AdSyn-CO244 | 23 | 38 | 48 | 39 | 81 | 95 | 39 | 61 | 78 | 1 | 1 | 1 | 14 | 27 | 42 | 17 | 21 | 43 |
| AdSyn-CO296 | 37 | 53 | 57 | 67 | 92 | 93 | 64 | 76 | 85 | 2 | 1 | 3 | 3 | 43 | 56 | 19 | 11 | 54 |
| AdSyn-CO297 | 37 | 35 | 38 | 46 | 67 | 79 | 66 | 94 | 95 | 2 | 4 | 6 | 14 | 43 | 42 | 8 | 17 | 40 |
| AdSyn-CO298 | 39 | 43 | 49 | 50 | 75 | 88 | 96 | 94 | 101 | 3 | 4 | 6 | 45 | 48 | 48 | 7 | 14 | 53 |

FIG. 17

| Adenovirus, Initial MOI | U2OS | | | | | | SaOS2 | | | | | |
|---|---|---|---|---|---|---|---|---|---|---|---|---|
| | 30 | 10 | 3.33 | 1.11 | 0.37 | 0.12 | 0.04 | 30 | 10 | 3.33 | 1.11 | 0.37 | 0.12 | 0.04 |
| AdSyn-CO102 | 7 | 6 | 5 | 4 | 8 | 19 | 29 | 13 | 52 | 67 | 92 | 105 | 105 | 100 |
| AdSyn-CO210 | 5 | 4 | 4 | 4 | 10 | 19 | 47 | 8 | 47 | 66 | 97 | 100 | 102 | 100 |
| AdSyn-CO283 | 7 | 5 | 4 | 5 | 11 | 19 | 49 | 12 | 50 | 73 | 97 | 107 | 104 | 103 |
| AdSyn-CO284 | 6 | 4 | 3 | 3 | 2 | 3 | 5 | 8 | 11 | 24 | 42 | 68 | 87 | 95 |
| AdSyn-CO236 | 6 | 5 | 4 | 3 | 3 | 10 | 16 | 11 | 46 | 71 | 96 | 105 | 104 | 99 |
| AdSyn-CO290 | 5 | 4 | 3 | 3 | 4 | 7 | 27 | 27 | 51 | 60 | 77 | 99 | 98 | 98 |
| AdSyn-CO291 | 6 | 5 | 4 | 4 | 8 | 17 | 31 | 7 | 16 | 43 | 76 | 96 | 101 | 99 |
| AdSyn-CO292 | 4 | 3 | 3 | 3 | 4 | 12 | 21 | 11 | 38 | 56 | 78 | 96 | 103 | 100 |
| AdSyn-CO189 | 7 | 6 | 6 | 7 | 12 | 21 | 32 | 8 | 34 | 69 | 92 | 105 | 106 | 98 |
| AdSyn-CO181 | 6 | 5 | 4 | 6 | 11 | 19 | 31 | 10 | 40 | 59 | 87 | 104 | 107 | 104 |
| AdSyn-CO285 | 6 | 5 | 5 | 4 | 6 | 12 | 25 | 8 | 25 | 44 | 65 | 87 | 94 | 99 |
| AdSyn-CO286 | 5 | 5 | 4 | 5 | 6 | 8 | 18 | 7 | 33 | 58 | 76 | 90 | 96 | 97 |
| AdSyn-CO235 | 6 | 5 | 5 | 7 | 19 | 31 | 47 | 10 | 60 | 86 | 96 | 106 | 104 | 104 |
| AdSyn-CO287 | 5 | 4 | 4 | 8 | 18 | 30 | 58 | 5 | 25 | 62 | 98 | 100 | 99 | 98 |
| AdSyn-CO288 | 8 | 7 | 6 | 6 | 10 | 24 | 44 | 7 | 16 | 44 | 67 | 87 | 93 | 94 |
| AdSyn-CO289 | 6 | 5 | 4 | 4 | 7 | 18 | 39 | 6 | 13 | 37 | 62 | 83 | 90 | 93 |
| AdSyn-CO238 | 10 | 9 | 7 | 8 | 16 | 29 | 43 | 8 | 32 | 49 | 65 | 86 | 85 | 89 |
| AdSyn-CO293 | 7 | 6 | 5 | 5 | 11 | 19 | 39 | 8 | 23 | 34 | 41 | 61 | 80 | 83 |
| AdSyn-CO294 | 7 | 6 | 4 | 4 | 6 | 11 | 29 | 6 | 8 | 15 | 25 | 42 | 71 | 94 |
| AdSyn-CO295 | 6 | 6 | 6 | 14 | 23 | 54 | 90 | 34 | 43 | 65 | 82 | 86 | 91 | 97 |
| AdSyn-CO244 | 7 | 6 | 8 | 13 | 23 | 37 | 52 | 15 | 56 | 73 | 94 | 100 | 103 | 99 |
| AdSyn-CO296 | 6 | 5 | 7 | 8 | 17 | 29 | 41 | 10 | 33 | 52 | 70 | 85 | 90 | 94 |
| AdSyn-CO297 | 4 | 4 | 4 | 5 | 11 | 20 | 40 | 4 | 15 | 28 | 48 | 68 | 97 | 100 |
| AdSyn-CO298 | 4 | 3 | 4 | 5 | 10 | 25 | 40 | 2 | 10 | 22 | 40 | 67 | 80 | 96 |

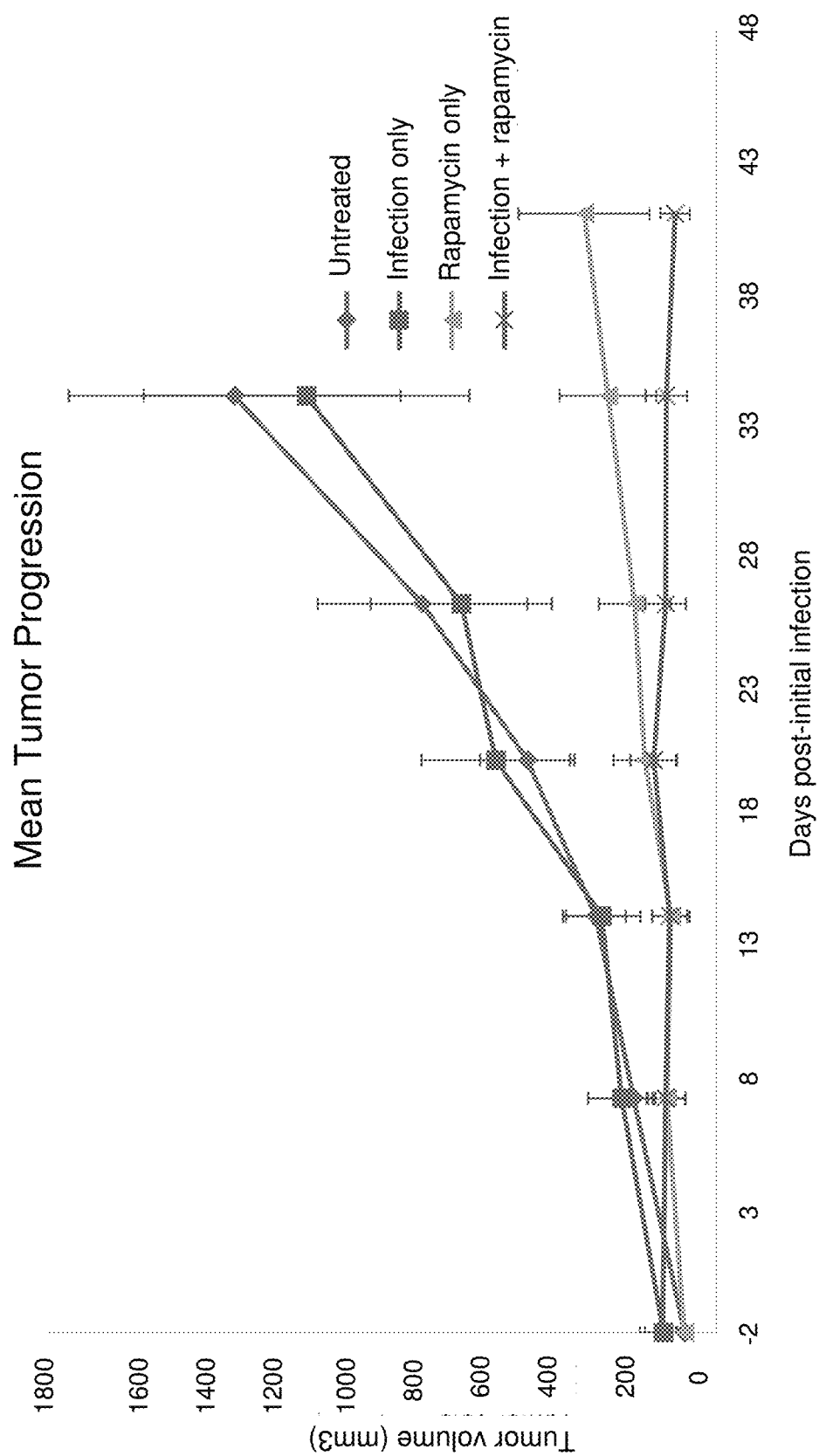

FIG. 22A
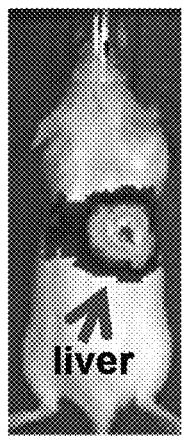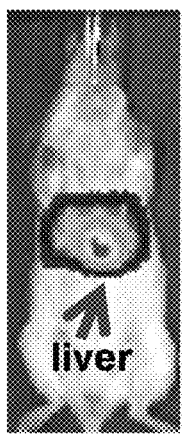
AdSyn-CO199
<u>E1 module</u> - ΔE1+
EF1α-luciferase
FIG. 22B
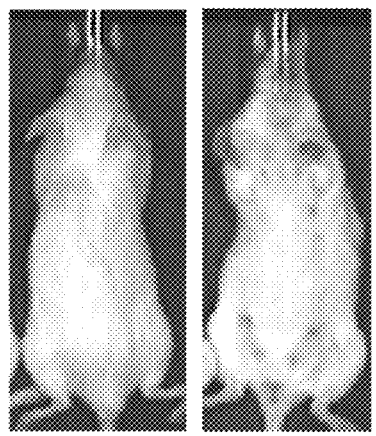
AdSyn-CO200
<u>E1 module</u> - ΔE1+
EF1α-luciferase-
(+miR122 binding)
FIG. 22C
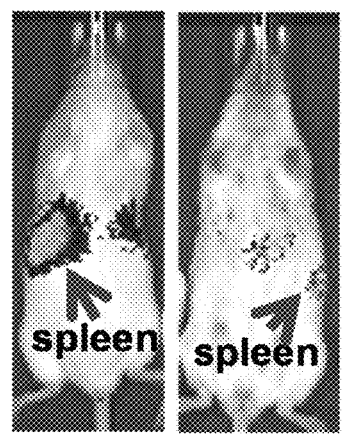
AdSyn-CO171
<u>E1 module</u> - ΔE1+
EF1α-luciferase-
(+miR122 binding)
<u>core module</u> -
Hexon E451Q

FIG. 24B

| Virus Name | Assembly Method | Module Modifications from WT Ad5 | | | | Growth in 293 cells |
| --- | --- | --- | --- | --- | --- | --- |
| | | E1 | core | E3 | E4 | |
| AdSyn-CO159 | AdSLIC | Ad11 pIX | All Ad11 | Ad11 Uexon and fiber | None | Yes |
| AdSyn-CO167 | AdSLIC | Ad9 pIX | All Ad9 | Ad9 Uexon and fiber | None | Yes |
| AdSyn-CO168 | AdSLIC | Ad12 pIX | All Ad12 | Ad12 Uexon and fiber | None | No |
| AdSyn-CO201 | AdSLIC | Ad3 pIX | All Ad3 | Ad3 Uexon and fiber | None | Yes |
| AdSyn-CO202 | AdSLIC | Ad34 pIX | All Ad34 | Ad34 Uexon and fiber | None | Yes |
| AdSyn-CO185 | AdSLIC | MAV-1 pIX, ΔE1-CMV-GFP | All MAV-1 | MAV-1 Uexon and fiber | None | No |
| AdSyn-CO254 | AdSLIC | Ad12 ITR/Ψ, Ad12 pIX | All Ad12 | Ad12 Uexon and fiber | Ad12 ITR | No |
| AdSyn-CO255 | AdSLIC | MAV-1 pIX, MAV-1 ITR/Ψ, ΔE1-CMV-GFP | All MAV-1 | MAV-1 Uexon and fiber | MAV-1 ITR | No |

FIG. 27

(Illegible sequence alignment figure – CLUSTAL W multiple sequence alignment of Species_A_Ad13_E1A, Species_B_Ad7_E1A, Species_C_Ad2_E1A, Species_C_Ad5_E1A, Species_D_Ad9_E1A, Species_E_Ad4_E1A, Species_F_Ad40_E1A, and Species_G_Ad52_E1A)

FIG. 28

```
CLUSTAL W (1.83) multiple sequence alignment
                                      1                                                 50
Species_A_Ad12_predicted_E4orf1       MAA-FETLYVYFTGPGAMLPKQEGDSNAYVLFSPANFVIPPHGVVLLYLH
Species_B_Ad7_E4orf1                  MAD---EALYVYLEGPGATLPEQQQR-NNYIFYSPVPFTLYPRGVALLYLR
Species_C_Ad2_E4orf1                  MAAAVEALYVVLEREGAILPRQEGFSGVYVFFSPINFVIPPMGAVMLSLR
Species_C_Ad5_E4orf1                  MAAAVEALYVVLEREGAILPRQEGFSGVYVFFSPINFVIPPMGAVMLSLR
Species_D_Ad9_E4orf1                  MA----ESLYAFIDSPGGIAPVQEGTSNRYTFFCPESFHIPPHGVVLLHLK
Species_E_Ad4_E4orf1                  MDA---QVLYVFLEGAGALLPVQKGS---NYIFYAPANFVLHPHGVALLELR
Species_G_Ad52_E4orf1                 MAD---QHIYVHLLGRRAFLPQQQGYSNMYVLFSPEDFVLAPRGIILLSLQ
                                          :  :*.  :       .  * *:      *   ::.*   *  :  * *   :* *:
                                      51                                                100
Species_A_Ad12_predicted_E4orf1       IAVDIPPGYLGTLFSLCDMNARGVFVGAETLYPGSRMELSVLLFNHSDVF
Species_B_Ad7_E4orf1                  LSIIIPRGYVGCFFSLTDANMSGLYASSRIIHAGHREELSVLLFNHDDRF
Species_C_Ad2_E4orf1                  LRVCIPPGYFGRFLALTDVNQPDVFTESYIMTPDMTEELSVVLFNHGDQF
Species_C_Ad5_E4orf1                  LRVCIPPGYFGRFLALTDVNQPDVFTESYIMTPDMTEELSVVLFNHGDQF
Species_D_Ad9_E4orf1                  VSVLVPTGYQGRFMALNDYHARDILTQSDVIFAGRRQELTVLLFNHTDRF
Species_E_Ad4_E4orf1                  LSIVVPQGFIGRFFSLTDANVPGVYASSRIIHAGHREGLSVMLFNHNVSF
Species_G_Ad52_E4orf1                 LSLDIPTGYLGRFFSVADMNVRGVLLCAQEIQPSTWWEVSVVLFNHSDEF
                                      :  :  :*  *:  *   ::::  *   :    :   :  ..    ::*:****    *
                                      101                     128
Species_A_Ad12_predicted_E4orf1       CDVRAKQPVARLLLSRVVFPPVCQASLI
Species_B_Ad7_E4orf1                  YEGRAGDPVACLVMERLIYPPVRQATMI
Species_C_Ad2_E4orf1                  FYGHAGMAVVRLMLIRVVFPVVRQASNV
Species_C_Ad5_E4orf1                  FYGHAGMAVVRLMLIRVVFPVVRQASNV
Species_D_Ad9_E4orf1                  LYVRKGHPVGTLLLERVIFPSVKIATLV
Species_E_Ad4_E4orf1                  YNGRAGDPVACLVLERVIYPPVRQASMV
Species_G_Ad52_E4orf1                 YRGSRGQPVACLLLERVIYPTVRQASLV
                                       .*   *::  *:::*  *   *: :
```

ONCOLYTIC TUMOR VIRUSES AND METHODS OF USE

CROSS REFERENCE TO RELATED APPLICATIONS

This is a continuation of International Application No. PCT/US2015/051745, filed Sep. 23, 2015, published in English under PCT Article 21(2), which claims the benefit of U.S. Provisional Application No. 62/054,724, filed Sep. 24, 2014. The above-listed applications are herein incorporated by reference in their entirety.

ACKNOWLEDGMENT OF GOVERNMENT SUPPORT

This invention was made with government support under grant number 5T32GM007240-35 awarded by the National Institutes of Health. The government has certain rights in the invention.

FIELD

This disclosure concerns recombinant adenoviruses comprising one or more modifications in E1A, E4orf1 and/or E4orf6/7 that selectively undergo lytic replication in tumor cells. The recombinant adenoviruses optionally have one or more modifications in fiber, hexon or capsid proteins to enable systemic delivery and uptake in tumor cells.

BACKGROUND

Cancer is a complex, debilitating disease that accounts for more than half a million deaths each year. There is a profound need for more effective, selective and safe treatments for cancer. Existing treatments for this pervasive, life threatening disease, such as chemotherapy and surgery, rarely eliminate all malignant cells, and often exhibit deleterious side-effects that can outweigh therapeutic benefit.

One approach that has the potential to address many of the shortcomings of current cancer treatments is oncolytic adenoviral therapy (Pesonen et al., *Molecular Pharmaceutics* 8(1):12-28, 2010). Adenovirus (Ad) is a self-replicating biological machine. It consists of a linear double-stranded 36 kb DNA genome sheathed in a protein coat. Adenoviruses invade and hijack the cellular replicative machinery to reproduce, and upon assembly, induce lytic cell death to spread to surrounding cells. These very same cellular controls are targeted by mutations in cancer. This knowledge can be exploited to create synthetic viruses that act like guided missiles, specifically infecting and replicating in tumor cells, and lysing the cells to release thousands of virus progeny that can seek out and destroy distant metastases, while overcoming possible resistance. Thus, the goal of oncolytic virus design is to generate a virus that specifically replicates in cancer cells, but leaves normal cells unharmed. However, there have been significant challenges in designing a virus that can selectively replicate in cancer cells. Thus, there remains a need for additional viruses that selectively replicate in cancer cells.

SUMMARY

Recombinant adenoviruses that selectively replicate in E2F deregulated tumor cells are disclosed. The recombinant adenoviruses have a genome encoding a modified E1A protein, a modified or deleted E4orf1 protein, a modified or deleted E4orf6/7 protein, or any combination thereof, such that the recombinant adenoviruses exhibit replication defects in normal cells compared to tumor cells. The genome of the recombinant adenoviruses optionally further encodes additional modifications that target the recombinant adenoviruses to specific cell types, detarget the viruses from the liver, inhibit viral replication in the liver, and/or evade pre-existing neutralizing antibodies.

Provided herein is a recombinant adenovirus, wherein the genome of the recombinant adenovirus encodes a modified E1A protein, a modified or deleted E4orf1 protein, a modified or deleted E4orf6/7 protein, or any combination thereof, and wherein the recombinant adenovirus exhibits replication defects in normal cells compared to tumor cells.

In some embodiments, the recombinant adenovirus genome further encodes modifications for inducible retargeting. For example, the genome optionally encodes a targeting ligand fused to an FK506 binding protein (FKBP), and an adenovirus fiber protein fused to a wild-type FKBP-rapamycin binding (FRB) protein or a mutant FRB protein comprising a T2098L substitution.

In some embodiments, the recombinant adenovirus genome further encodes modifications that detarget the adenovirus from the liver. In some examples, the genome encodes a modification of the hexon protein and/or includes one or more binding sites for a liver-specific microRNA.

In some embodiments, the recombinant adenovirus genome encodes a chimeric fiber protein to redirect the virus to alternative cellular receptors.

In some embodiments, the recombinant adenovirus genome encodes a capsid-swapped adenovirus to evade pre-existing neutralizing antibodies. In some examples, the E1, E3 and E4 regions of the genome are derived from a first adenovirus serotype and the E2B, L1, L2, L3, E2A and L4 regions of the genome are derived from a second adenovirus serotype.

Further provided are recombinant reporter adenovirus gene expression vectors, wherein the genome of the recombinant adenovirus comprises a deletion of E1 and encodes an EF1α promoter driven GFP-luciferase fusion protein. In some embodiments, the adenovirus expression vectors further include liver-specific microRNA binding sites in the 3'-UTR.

Also provided herein are compositions comprising the disclosed recombinant adenoviruses. In addition, recombinant nucleic acid molecules and vectors comprising the sequence of the recombinant adenovirus genomes are provided.

Methods of inhibiting tumor cell viability, inhibiting tumor progression, reducing tumor volume and treating a subject with cancer by administering a recombinant adenovirus (or composition thereof) disclosed herein is further provided by the present disclosure.

The foregoing and other objects and features of the disclosure will become more apparent from the following detailed description, which proceeds with reference to the accompanying figures.

BRIEF DESCRIPTION OF THE DRAWINGS

FIGS. 2A-2B are immunoblots of cell lysates showing expression of cellular cyclins and adenovirus late proteins in infected primary and tumor cells. Cells were mock infected or infected with AdSyn-CO102 (wild-type), AdSyn-CO181 (E1A ΔLXCXE/ΔE4orf6/7), AdSyn-CO189 (E1A ΔLXCXE), AdSyn-CO210 (ΔE4orf6/7), or ONYX-838 (E1A ΔCR2). For FIG. 2A, SAEC were infected at MOI 10. In contrast to wild-type virus and viruses with E1A mutations alone, AdSyn-CO181 failed to activate E2F dependent cell cycle targets, the S phase cyclins, cyclin A and cyclin B. Furthermore, AdSyn-CO181 and AdSyn-CO210, which have E4orf6/7 mutations, were defective for late protein expression and replication. Both of these defects were apparent to a lesser extent with AdSyn-CO210. For FIG. 2B, A549 cells were infected at MOI 30. In contrast to infected primary cells, there were no apparent defects in expression of late structural proteins, and cyclin A and cyclin B remained present in all infected A549 samples.

FIGS. 3A-3B are FACS histograms quantifying cellular DNA in infected SAEC and A549 cells, respectively. Cells were mock infected or infected with AdSyn-CO102 (wild-type), AdSyn-CO181 (E1A ΔLXCXE/ΔE4orf6/7), AdSyn-CO189 (E1A ΔLXCXE) or AdSyn-CO210 (ΔE4orf6/7), and collected 48 hours post-infection. DNA content of uninfected cells is shown in the background profile. The Y-axis is the relative abundance of cells, and the X-axis is the fluorescence from propidium iodide (PI) in the cell, which is proportional to the amount of DNA. For FIG. 3A, quiescent SAEC were infected at MOI 10. AdSyn-CO181 infection exhibited a strong DNA replication defect in SAEC relative to AdSyn-CO102, which is linked to decreased virus replication. A modest defect was also apparent in AdSyn-CO210 infected SAEC at this timepoint. For FIG. 3B, A549 cells were infected at MOI 30. No DNA replication defect was apparent with any mutant virus infection in these cells.

FIGS. 5A-5B are graphs showing cell viability of infected SAEC and A549 cells, respectively, after 7 days of infection. Cells were mock infected or infected with a serial dilution of AdSyn-CO102 (wild-type), AdSyn-CO181 (E1A ΔLXCXE/ΔE4orf6/7), AdSyn-CO189 (E1A ΔLXCXE), AdSyn-CO210 (ΔE4orf6/7) or ONYX-838 (E1A ΔCR2) and cellular metabolic activity was quantified by WST-1 assay. As shown in FIG. 5A, compared to AdSyn-CO102, AdSyn-CO181 exhibited decreased cell-killing capability in SAEC. As shown in FIG. 5B, of the mutant viruses tested, there was no defect in cell killing relative to wild-type virus.

FIG. 16 is a table showing the quantitation of cell viability assays for infected primary NHA, SAEC-hTERT (quiescent), SAEC-hTERT (proliferating), A549, MDA MB 231 and U87 cells shown in FIGS. 10-15.

FIG. 17 is a table showing the quantitation cell viability assays for infected U2OS cells (which have functional p53 and Rb) and SaOS2 cells (which have non-functional p53 and Rb). Cells were infected with a serial dilution of wild-type or modified virus. The metabolic activity was quantified by WST-1 assay.

FIG. 19 is a graph showing the mean tumor volume of HS578T subcutaneous xenografts in treated mice. Mice with established tumors received intratumoral injection of AdSyn-CO313, then subsequently received periodic intraperitoneal 8 mg/kg rapamycin injection (n=5) or vehicle control (n=4), or they received intratumoral vehicle control, then subsequently received periodic intraperitoneal 8 mg/kg rapamycin injection (n=5) or vehicle control (n=4). Infection was repeated in the same groups three more times every 4 days starting 19 days following the initial infection. AdSyn-CO313 bears the oncolytic mutations of E1A ΔLXCXE, ΔE4orf6/7, ΔE3-RIDα/β, ΔE3-14.7k, and expresses the rapamycin-dependent EGFR-targeting genes EGFRVHH-FKBP and FRB-fiber. The tumors in mice receiving the EGFR-targeted oncolytic virus with rapamycin exhibited the best response.

FIGS. 22A-22C show the elimination of adenovirus mediated gene expression in the liver, and detargeting of adenovirus infection to the liver. As shown in FIG. 22A, AdSyn-CO199, an adenovirus vector lacking the E1 region, expresses luciferase at high levels exclusively in the liver following systemic infection. As shown in FIG. 22B, the luciferase signal is lost when mice are systemically infected with AdSyn-CO200, a virus matching AdSyn-CO199, except that the liver-specific microRNA miR122 eliminates luciferase expression. As shown in FIG. 22C, expression of luciferase can be detected in the spleen when mice are systemically infected with AdSyn-CO171, a virus matching AdSyn-CO200, except that the adenovirus hexon protein bears the mutation E451Q, which detargets it from the liver.

FIG. 24B is a table listing specific mutant viruses and their E1, core, E3 and E4 module modifications.

FIG. 27 shows an alignment of E1A sequences from human adenovirus species, including species A (Ad12; SEQ ID NO: 47), species B (Ad7; SEQ ID NO: 48), species C (Ad2 and Ad5; SEQ ID NO: 49 and SEQ ID NO: 50, respectively), species D (Ad9; SEQ ID NO: 51), species E (Ad4; SEQ ID NO: 52), species F (Ad40; SEQ ID NO: 53) and species G (Ad52; SEQ ID NO: 54). Outlined is Y47, a site of mutation found in the oncolytic adenovirus compositions disclosed herein. Highlighted in the gray box is the LXCXE motif containing C124, which is necessary for strong E1A-Rb interaction.

FIG. 28 shows an alignment of E4orf1 sequences from human adenovirus species, including species A (Ad12; SEQ ID NO: 55), species B (Ad7; SEQ ID NO: 56), species C (Ad2 and Ad5; SEQ ID NO: 57 and SEQ ID NO: 58, respectively), species D (Ad9; SEQ ID NO: 59), species E (Ad4; SEQ ID NO: 60), and species G (Ad52; SEQ ID NO: 61). Highlighted in the gray box is the PDZ binding motif through which E4orf1 upregulates PI3K and prevents negative regulation of cellular proliferation.

SEQUENCE LISTING

Figure 1A:
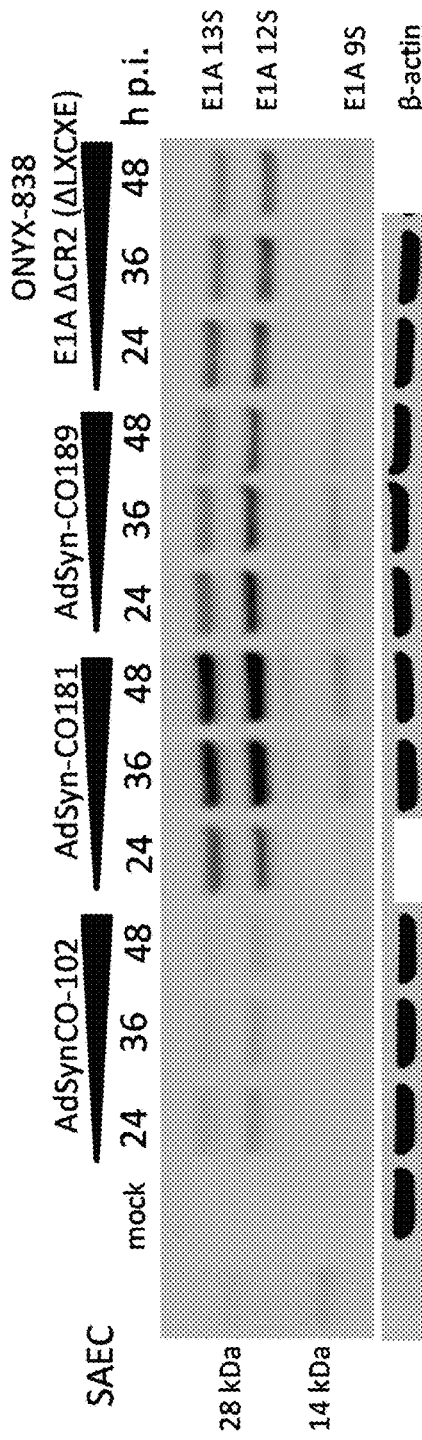
FIGS. 1A-1B are immunoblots of cell lysates showing expression of adenovirus E1A from recombinant adenovirus infected cells. Cells were mock infected or infected with AdSyn-CO102 (wild-type), AdSyn-CO181 (E1A ΔLXCXE/ΔE4orf6/7), AdSyn-CO189 (E1A ΔLXCXE) or ONYX-838 (E1A ΔCR2). For FIG. 1A, quiescent human primary small airway epithelial cells (SAEC) were infected at MOI 10 and lysates were analyzed for E1A expression. In cells infected with AdSyn-CO102, there was a decrease in E1A levels at later times during infection. Similarly, in cells infected with AdSyn-CO189 or ONYX-838, there was a decrease in E1A levels at later times during infection; however, at the earlier timepoint, expression of E1A is greater than expression of E1A in AdSyn-CO102-infected cells. In contrast, cells infected with AdSyn-CO181 exhibit stronger and continued expression of E1A throughout the infection, which is indicative of a failure to progress through the adenovirus lifecycle. For FIG. 1B, confluent lung adenocarcinoma cells (A549) were infected at MOI 30 and lysates were analyzed for E1A expression. All infections led to a decrease in E1A levels at later times during infection, indicative of a typical adenovirus lifecycle progression.

The nucleic and amino acid sequences listed in the accompanying sequence listing are shown using standard letter abbreviations for nucleotide bases, and three letter code for amino acids, as defined in 37 C.F.R. 1.822. Only one strand of each nucleic acid sequence is shown, but the complementary strand is understood as included by any reference to the displayed strand. The Sequence Listing is submitted as an ASCII text file, created on Mar. 15, 2017, 2.91 MB, which is incorporated by reference herein. In the accompanying sequence listing:

SEQ ID NOs: 1-31 and 68-98 are nucleotide sequences of recombinant adenoviruses (see Tables 1-5; Example 6; and Example 7).
SEQ ID NO: 32 is the amino acid sequence of Ad5 E1A.
SEQ ID NO: 33 is the amino acid sequence of Ad5 E1A ΔLXCXE.
SEQ ID NO: 34 is the amino acid sequence of Ad5 E1A C124G.
SEQ ID NO: 35 is the amino acid sequence of Ad5 E1A Δ2-11.
SEQ ID NO: 36 is the amino acid sequence of Ad5 E1A Y47H C124G.
SEQ ID NO: 37 is the amino acid sequence of Ad5 E1A Δ2-11 Y47H C124G.
SEQ ID NO: 38 is the amino acid sequence of Ad5 E4orf1.
SEQ ID NO: 39 is the amino acid sequence of Ad5 E4orf1 ΔPDZb.
SEQ ID NO: 40 is the amino acid sequence of Ad5 E4orf6/7.
SEQ ID NO: 41 is the amino acid sequence of Ad5 fiber.
SEQ ID NO: 42 is the amino acid sequence of Ad5 FRB-fiber.
SEQ ID NO: 43 is the amino acid sequence of Ad5 FRB*-fiber.
SEQ ID NO: 44 is the amino acid sequence of EGFRVHH-GS-FKBP.
SEQ ID NO: 45 is the amino acid sequence of Ad5 hexon.
SEQ ID NO: 46 is the amino acid sequence of Ad5 hexon E451Q.
SEQ ID NO: 47 is the amino acid sequence of species A (Ad12) E1A.
SEQ ID NO: 48 is the amino acid sequence of species B (Ad7) E1A.
SEQ ID NO: 49 is the amino acid sequence of species C (Ad2) E1A.
SEQ ID NO: 50 is the amino acid sequence of species C (Ad5) E1A.
SEQ ID NO: 51 is the amino acid sequence of species D (Ad9) E1A.
SEQ ID NO: 52 is the amino acid sequence of species E (Ad4) E1A.
SEQ ID NO: 53 is the amino acid sequence of species F (Ad40) E1A.
SEQ ID NO: 54 is the amino acid sequence of species G (Ad52) E1A.
SEQ ID NO: 55 is the amino acid sequence of species A (Ad12) E4orf1.
SEQ ID NO: 56 is the amino acid sequence of species B (Ad7) E4orf1.
SEQ ID NO: 57 is the amino acid sequence of species C (Ad2) E4orf1.
SEQ ID NO: 58 is the amino acid sequence of species C (Ad5) E4orf1.
SEQ ID NO: 59 is the amino acid sequence of species D (Ad9) E4orf1.
SEQ ID NO: 60 is the amino acid sequence of species E (Ad4) E4orf1.
SEQ ID NO: 61 is the amino acid sequence of species G (Ad52) E4orf1.
SEQ ID NO: 62 is the nucleotide sequence of Ad2.
SEQ ID NO: 63 is the nucleotide sequence of Ad5.
SEQ ID NO: 64 is the amino acid sequence of Ad2 E4orf6/7.
SEQ ID NO: 65 is the amino acid sequence of Ad5 E3-RIDα.
SEQ ID NO: 66 is the amino acid sequence of Ad5 E3-RIDβ.
SEQ ID NO: 67 is the amino acid sequence of Ad5 E3-14.7K.

DETAILED DESCRIPTION

I. Abbreviations

Ad adenovirus
CAR coxsackie adenovirus receptor
CPE cytopathic effect
EGFR epidermal growth factor receptor
ELISA enzyme-linked immunosorbent assay
FACS fluorescence activated cell sorting
FKBP FK 506 binding protein
FRB FKBP-rapamycin binding
hTERT human telomerase reverse transcriptase
HuVEC human vascular endothelial cells
MAV-1 mouse adenovirus 1
miR microRNA
MOI multiplicity of infection
mTOR mammalian target of rapamycin
NHA normal human astrocytes
PET positron emission topography
PI propidium iodide
PRP PET reporter probe
Rb retinoblastoma
SAEC small airway epithelial cells
WT wild-type II. Terms and Methods Unless otherwise noted, technical terms are used according to conventional usage. Definitions of common terms in molecular biology may be found in Benjamin Lewin, *Genes V*, published by Oxford University Press, 1994 (ISBN 0-19-854287-9); Kendrew et al. (eds.), *The Encyclopedia of Molecular Biology*, published by Blackwell Science Ltd., 1994 (ISBN 0-632-02182-9); and Robert A. Meyers (ed.), *Molecular Biology and Biotechnology: a Comprehensive Desk Reference*, published by VCH Publishers, Inc., 1995 (ISBN 1-56081-569-8).

In order to facilitate review of the various embodiments of the disclosure, the following explanations of specific terms are provided:

Adenovirus: A non-enveloped virus with a liner, double-stranded DNA genome and an icosahedral capsid. There are currently 68 known serotypes of human adenovirus, which are divided into seven species (species A, B, C, D, E, F and G). Different serotypes of adenovirus are associated with different types of disease, with some serotypes causing respiratory disease (primarily species B and C), conjunctivitis (species B and D) and/or gastroenteritis (species F and G).

Administration: To provide or give a subject an agent, such as a therapeutic agent (e.g. a recombinant virus), by any effective route. Exemplary routes of administration include, but are not limited to, injection (such as subcutaneous, intramuscular, intradermal, intraperitoneal, and intravenous), oral, intraductal, sublingual, rectal, transdermal, intranasal, vaginal and inhalation routes.

Antibody: A polypeptide ligand comprising at least a light chain and/or heavy chain immunoglobulin variable region which recognizes and binds (such as specifically recognizes and specifically binds) an epitope of an antigen. Immunoglobulin molecules are composed of a heavy and a light chain, each of which has a variable region, termed the variable heavy ($V_H$) region and the variable light ($V_L$) region. Together, the $V_H$ region and the $V_L$ region are responsible for binding the antigen recognized by the antibody.

Antibodies include intact immunoglobulins and the variants and portions (fragments) of antibodies well known in the art, such as single-domain antibodies (e.g. VH domain antibodies, or VHH antibodies), Fab fragments, Fab' fragments, F(ab)'$_2$ fragments, single chain Fv proteins ("scFv"), and disulfide stabilized Fv proteins ("dsFv"). A scFv protein is a fusion protein in which a light chain variable region of an immunoglobulin and a heavy chain variable region of an immunoglobulin are bound by a linker, while in dsFvs, the chains have been mutated to introduce a disulfide bond to stabilize the association of the chains. The term "antibody" also includes genetically engineered forms such as chimeric antibodies (for example, humanized murine antibodies) and heteroconjugate antibodies (such as bispecific antibodies). See also, *Pierce Catalog and Handbook,* 1994-1995 (Pierce Chemical Co., Rockford, IL); Kuby, J., *Immunology,* 3$^{rd}$ Ed., W. H. Freeman & Co., New York, 1997.

Chemotherapeutic agent: Any chemical agent with therapeutic usefulness in the treatment of diseases characterized by abnormal cell growth. Such diseases include tumors, neoplasms, and cancer as well as diseases characterized by hyperplastic growth, such as psoriasis. In one embodiment, a chemotherapeutic agent is a radioactive compound. One of skill in the art can readily identify a chemotherapeutic agent of use (see for example, Slapak and Kufe, *Principles of Cancer Therapy*, Chapter 86 in Harrison's Principles of Internal Medicine, 14th edition; Perry et al., *Chemotherapy*, Ch. 17 in Abeloff, Clinical Oncology 2$^{nd}$ ed., © 2000 Churchill Livingstone, Inc; Baltzer, L., Berkery, R. (eds.): *Oncology Pocket Guide to Chemotherapy,* 2nd ed. St. Louis, Mosby-Year Book, 1995; Fischer, D. S., Knobf, M. F., Durivage, H. J. (eds): *The Cancer Chemotherapy Handbook,* 4th ed. St. Louis, Mosby-Year Book, 1993). Combination chemotherapy is the administration of more than one agent to treat cancer.

Figure 23A:
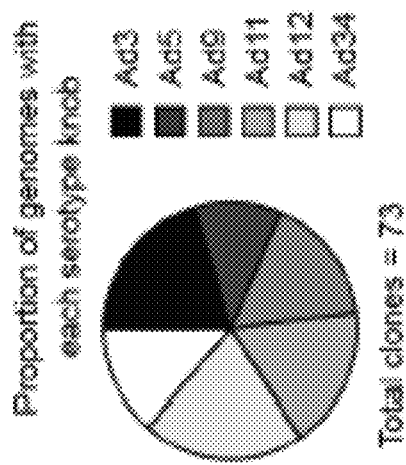
FIGS. 23A-23E include an illustration of the fiber protein structure and a series of graphs and images characterizing recombinant adenoviruses generated by combining modules from two adenovirus serotypes to create viruses with chimeric fiber proteins that better transduce a variety of cell types.
Figure 23B:
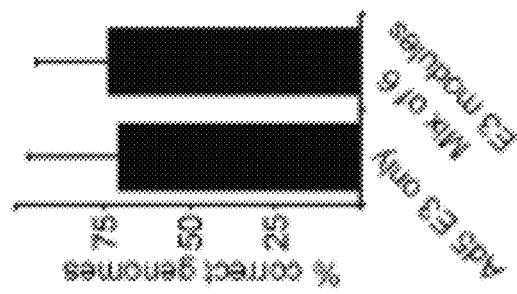
Figure 23C:
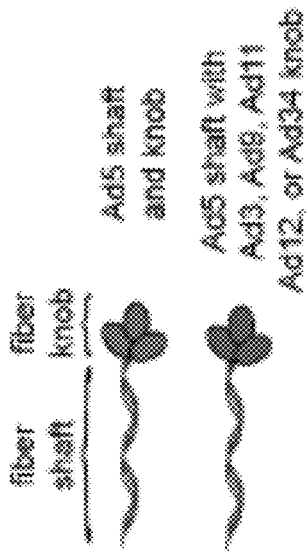

Chimeric: Composed of at least two parts having different origins. In the context of the present disclosure, a "chimeric adenovirus" is an adenovirus having genetic material and/or proteins derived from at least two different serotypes (such as from Ad5 and a second serotype of adenovirus). In this context, a "capsid-swapped" adenovirus refers to a chimeric adenovirus in which the capsid proteins are derived from one serotype of adenovirus and the remaining proteins are derived from another adenovirus serotype. Similarly, a "chimeric fiber" is a fiber protein having amino acid sequence derived from at least two different serotypes of adenovirus. For example, a chimeric fiber can be composed of a fiber shaft from Ad5 and a fiber knob from a second serotype of adenovirus (see FIG. 23A).

Contacting: Placement in direct physical association; includes both in solid and liquid form.

Degenerate variant: In the context of the present disclosure, a "degenerate variant" refers to a polynucleotide encoding a peptide that includes a sequence that is degenerate as a result of the genetic code. There are 20 natural amino acids, most of which are specified by more than one codon. Therefore, all degenerate nucleotide sequences encoding a peptide are included as long as the amino acid sequence of the peptide encoded by the nucleotide sequence is unchanged.

Deleted: An adenovirus genome encoding a "deleted" E4orf1 or E4orf6/7 protein refers to an adenovirus having a complete deletion of the E4orf1 or E4orf6/7 coding sequence, or a partial deletion that results in the absence of E4orf1 or E4orf6/7 protein expression.

Deregulation of E2F: Refers to an increase in activity of the E2F transcription factor and downstream target genes, which occurs in nearly all types of human cancer. Deregulation of the E2F pathway activity and transcription can result from a variety of different mutations in any upstream component of the pathway, such as loss of function mutations and deletions in Rb, p107 and p130 tumor suppressors. Rb was the first tumor suppressor to be identified and is absent or mutated in at least one third of human tumors. In addition, p16 mutations and/or epigenetic silencing can activate E2F in tumor cells. Cyclin D and CDK4 mutations, gene amplifications or over-expression can also result in deregulated E2F activity in human tumors. In addition, E2F is activated by growth factor receptor pathway mutations including EGFR, RTKs, RAS, RAF, PI-3K, PTEN, RAF, MYC. Mutations in the p16$^{INK4a}$-Cyclin D:cdk4/6-RB-E2F pathway generally occur in a mutually exclusive fashion, so that one 'hit' (for example, p16) is unaccompanied by others (for example, Rb mutation or cyclin D:cdk over-expression). However, most current chemotherapies are proliferative poisons that inhibit E2F transcriptional targets, but are also toxic to normal cells and have often devastating iatrogenic complications. As disclosed herein, an alternative therapeutic approach is to use a virus that undergoes selective lytic replication in cancer cell lesions that have deregulated the p16-cyclin D:cdk4-RB-E2F pathway.

E1A: The adenovirus early region 1A (E1A) gene and polypeptides expressed from the gene. The E1A protein plays a role in viral genome replication by driving cells into the cell cycle. As used herein, the term "E1A protein" refers to the proteins expressed from the E1A gene and the term includes E1A proteins produced by any adenovirus serotype. By way of example, the amino acid sequence of wild-type Ad5 E1A protein is set forth herein as SEQ ID NO: 32, and modified Ad5 E1A sequences are provided herein as SEQ ID NOs: 33-37. In addition, wild-type E1A protein sequences from a variety of different adenovirus serotypes are set forth herein as SEQ ID NOs: 47-54. In some embodiments, a modified E1A protein includes a protein having at least 80%, at least 85%, at least 90%, at least 95%, at least 96%, at least 97%, at least 98%, or at least 99% sequence identity to any one of SEQ ID NOs: 32-37 or SEQ ID NOs: 47-54. The modified E1A proteins contemplated herein are those that contribute to the replication defects of a recombinant adenovirus in normal cells compared to tumor cells. The modified E1A proteins disclosed herein are Ad5 E1A proteins. However, corresponding modifications can be made in any desired serotype, and thus are encompassed by the present disclosure. For example, all species of human adenovirus contain the LXCXE motif, which in Ad5 corresponds to LTCHE (residues 122-126 of SEQ ID NO: 32). Similarly, the deletion of residues 2-11 and the Y47H and C124G substitutions are numbered with reference to Ad5, but can be introduced into any other serotype (see FIG. 27, which provides an alignment of E1A from all human adenovirus species).

E3-RIDα/RIDβ and E3-14.7k: Early-expressed proteins produced from the E3 gene. The E3-RIDα, E3-RIDβ, and E3-14.7k proteins make up the receptor internalization and degradation complex (RID), which localizes to the nuclear membrane and causes the endocytosis and degradation of a variety of receptors including CD95 (FasL receptor), and TNFR1 and 2 (TNF/TRAIL receptors) to protect infected cells from host antiviral responses. The E3-RIDα, E3-RIDβ, and E3-14.7k coding sequences are next to each other, in this order. In some embodiments of the present disclosure, the start codon of E3-RIDα to the stop codon of E3-14.7k was deleted and replaced with the coding sequence of the FKBP-fusion protein (see, e.g. AdSyn-CO312, AdSyn-CO313, AdSyn-CO335 and AdSyn-CO440). The amino acid sequences of Ad5 E3-RIDα, E3-RIDβ, and E3-14.7k are set forth herein as SEQ ID NOs: 65-67.

E4orf1: An adenovirus protein produced from the E4 gene. The term "E4orf1 protein" includes E4orf1 proteins produced by the E4 gene from any adenovirus serotype. By way of example, the amino acid sequence of the wild-type Ad5 E4orf1 protein is set forth herein as SEQ ID NO: 38, and a modified Ad5 E4orf1 protein having a deletion of the PDZ-binding motif is provided herein as SEQ ID NOs: 39. In addition, wild-type E4orf1 protein sequences from a variety of different adenovirus serotypes are set forth herein as SEQ ID NOs: 55-61. In some embodiments, a modified E4orf1 protein includes a protein having at least 80%, at least 85%, at least 90%, at least 95%, at least 96%, at least 97%, at least 98%, or at least 99% sequence identity to any one of SEQ ID NOs: 38, 39 and 55-61. The modified E4orf1 proteins contemplated herein are those that contribute to the replication defects of a recombinant adenovirus in normal cells compared to tumor cells. The modified E4orf1 proteins disclosed herein are Ad5 E4orf1 proteins. However, corresponding modifications can be made in any desired serotype, and thus are encompassed by the present disclosure. As indicated in the E4orf1 alignment shown in FIG. 28, the C-terminal three residues of E4orf1 constitute the PDZ-binding motif in adenovirus species A, B, C, D, E and G. In some embodiments herein, the recombinant adenovirus encodes a complete deletion E4orf1.

E4orf6/7: A protein encoded by the adenovirus E4 gene. The term "E4orf6/7 protein" includes E4orf6/7 proteins produced by the E4 gene from any adenovirus serotype. By way of example, the amino acid sequence of the wild-type Ad5 E4orf6/7 protein is set forth herein as SEQ ID NO: 40, and the amino acid sequence of the wild-type Ad2 E4orf6/7 protein is set forth herein as SEQ ID NO: 64. In some embodiments, an E4orf6/7 protein includes a protein having at least 80%, at least 85%, at least 90%, at least 95%, at least 96%, at least 97%, at least 98%, or at least 99% sequence identity to any one of SEQ ID NO: 40 or SEQ ID NO: 64. The modified E4orf6/7 proteins contemplated herein are those that contribute to the replication defects of a recombinant adenovirus in normal cells compared to tumor cells. In some embodiments, the modified E4orf6/7 protein comprises a mutation (such as a deletion) that abolishes or impairs its E2F binding site and/or impairs E2F interactions. In other embodiments, the modified E4orf6/7 protein comprises a modification that deletes or impairs the nuclear localization signal, which is required for efficient translocation of E2F4. Exemplary modifications of E4orf6/7 are discussed further in the sections below.

Epidermal growth factor receptor (EGFR): The cell-surface receptor for members of the EGF family of extra-cellular protein ligands. EGFR is also known as ErbB-1 and HER1. Many types of cancer contain mutations that lead to overexpression of EGFR.

Fiber: The adenovirus fiber protein is a trimeric protein that mediates binding to cell surface receptors. The fiber protein is comprised of a long N-terminal shaft and globular C-terminal knob (see FIG. 23A).

FK506 binding protein (FKBP): A family of proteins expressed in eukaryotes that function as protein folding chaperones. FKBP is known for its capacity to bind rapamycin. An exemplary FKBP sequence is set forth herein as residues 132-238 of SEQ ID NO: 44.

FKBP-rapamycin binding (FRB): A domain of mammalian target of rapamycin (mTOR) that binds rapamycin. An exemplary sequence for FRB is set forth herein as residues 547-636 of SEQ ID NO: 42. A mutant form of FRB (referred to herein as "FRB*") that is capable of binding both rapamycin and rapalog (also known as AP21967) is set forth herein as residues 547-636 of SEQ ID NO: 43. FRB* contains a threonine to leucine substitution (T2098L) at position 2098 of human mTOR, which corresponds to residue 620 of SEQ ID NO: 43.

Fusion protein: A protein containing amino acid sequence from at least two different (heterologous) proteins or peptides. Fusion proteins can be generated, for example, by expression of a nucleic acid sequence engineered from nucleic acid sequences encoding at least a portion of two different (heterologous) proteins. To create a fusion protein, the nucleic acid sequences must be in the same reading frame and contain no internal stop codons. Fusion proteins, particularly short fusion proteins, can also be generated by chemical synthesis.

Heterologous: A heterologous protein or polypeptide refers to a protein or polypeptide derived from a different source or species.

Hexon: A major adenovirus capsid protein. An exemplary hexon sequence from Ad5 is set forth herein as SEQ ID NO: 45. A mutant hexon sequence comprising an E451Q substitution is set forth herein as SEQ ID NO: 46.

Isolated: An "isolated" biological component (such as a nucleic acid molecule, protein, virus or cell) has been substantially separated or purified away from other biological components in the cell or tissue of the organism, or the organism itself, in which the component naturally occurs, such as other chromosomal and extra-chromosomal DNA and RNA, proteins and cells. Nucleic acid molecules and proteins that have been "isolated" include those purified by standard purification methods. The term also embraces nucleic acid molecules and proteins prepared by recombinant expression in a host cell as well as chemically synthesized nucleic acid molecules and proteins.

MicroRNA (miRNA or miR): A single-stranded RNA molecule that regulates gene expression in plants, animals and viruses. A gene encoding a microRNA is transcribed to form a primary transcript microRNA (pri-miRNA), which is processed to form a short stem-loop molecule, termed a precursor microRNA (pre-miRNA), followed by endonucleolytic cleavage to form the mature microRNA. Mature microRNAs are approximately 21-23 nucleotides in length and are partially complementary to the 3'UTR of one or more target messenger RNAs (mRNAs). MicroRNAs modulate gene expression by promoting cleavage of target mRNAs or by blocking translation of the cellular transcript. In the context of the present disclosure, a "liver-specific microRNA" is a microRNA that is preferentially expressed in the liver, such as a microRNA that is expressed only in the liver, or a microRNA that is expressed significantly more in the liver as compared to other organs or tissue types.

Modification: A change in the sequence of a nucleic acid or protein sequence. For example, amino acid sequence modifications include, for example, substitutions, insertions and deletions, or combinations thereof. Insertions include amino and/or carboxyl terminal fusions as well as intrasequence insertions of single or multiple amino acid residues. Deletions are characterized by the removal of one or more amino acid residues from the protein sequence. In some embodiments herein, the modification (such as a substitution, insertion or deletion) results in a change in function, such as a reduction or enhancement of a particular activity of a protein. As used herein, "Δ" or "delta" refer to a deletion. For example, E1AΔLXCXE refers to an E1A polypeptide having a deletion of the LXCXE motif. Substitutional modifications are those in which at least one residue has been removed and a different residue inserted in its place. Amino acid substitutions are typically of single residues, but can occur at a number of different locations at once. Substitutions, deletions, insertions or any combination thereof may be combined to arrive at a final mutant sequence. These modifications can be prepared by modification of nucleotides in the DNA encoding the protein, thereby producing DNA encoding the modification. Techniques for making insertion, deletion and substitution mutations at predetermined sites in DNA having a known sequence are well known in the art. A "modified" protein, nucleic acid or virus is one that has one or more modifications as outlined above.

Neoplasia, malignancy, cancer and tumor: A neoplasm is an abnormal growth of tissue or cells that results from excessive cell division. Neoplastic growth can produce a tumor. The amount of a tumor in an individual is the "tumor burden" which can be measured as the number, volume, or weight of the tumor. A tumor that does not metastasize is referred to as "benign." A tumor that invades the surrounding tissue and/or can metastasize is referred to as "malignant." Malignant tumors are also referred to as "cancer."

Hematologic cancers are cancers of the blood or bone marrow. Examples of hematological (or hematogenous) cancers include leukemias, including acute leukemias (such as acute lymphocytic leukemia, acute myelocytic leukemia, acute myelogenous leukemia and myeloblastic, promyelocytic, myelomonocytic, monocytic and erythroleukemia), chronic leukemias (such as chronic myelocytic (granulocytic) leukemia, chronic myelogenous leukemia, and chronic lymphocytic leukemia), polycythemia vera, lymphoma, Hodgkin's disease, non-Hodgkin's lymphoma (indolent and high grade forms), multiple myeloma, Waldenstrom's macroglobulinemia, heavy chain disease, myelodysplastic syndrome, hairy cell leukemia and myelodysplasia. In some cases, lymphomas are considered solid tumors.

Solid tumors are abnormal masses of tissue that usually do not contain cysts or liquid areas. Solid tumors can be benign or malignant. Different types of solid tumors are named for the type of cells that form them (such as sarcomas, carcinomas, and lymphomas). Examples of solid tumors, such as sarcomas and carcinomas, include fibrosarcoma, myxosarcoma, liposarcoma, chondrosarcoma, osteosarcoma, and other sarcomas, synovioma, mesothelioma, Ewing's tumor, leiomyosarcoma, rhabdomyosarcoma, colon carcinoma, lymphoid malignancy, pancreatic cancer, breast cancer, lung cancers, ovarian cancer, prostate cancer, hepatocellular carcinoma, squamous cell carcinoma, basal cell carcinoma, adenocarcinoma, sweat gland carcinoma, medullary thyroid carcinoma, papillary thyroid carcinoma, pheochromocytomas sebaceous gland carcinoma, papillary carcinoma, human papilloma virus (HPV)-infected neoplasias, papillary adenocarcinomas, medullary carcinoma, bronchogenic carcinoma, renal cell carcinoma, hepatoma, bile duct carcinoma, choriocarcinoma, Wilms' tumor, cervical cancer, testicular tumor, seminoma, bladder carcinoma, melanoma, and CNS tumors (such as a glioma (such as brainstem glioma and mixed gliomas), glioblastoma (also known as glioblastoma multiforme) astrocytoma, CNS lymphoma, germinoma, medulloblastoma, Schwannoma craniopharyogioma, ependymoma, pinealoma, hemangioblastoma, acoustic neuroma, oligodendroglioma, menangioma, neuroblastoma, retinoblastoma and brain metastasis).

Oncolytic virus: A virus that selectively kills cells of a proliferative disorder, e.g., cancer/tumor cells. Killing of the cancer cells can be detected by any method established in the art, such as determining viable cell count, or detecting cytopathic effect, apoptosis, or synthesis of viral proteins in the cancer cells (e.g., by metabolic labeling, immunoblot, or RT-PCR of viral genes necessary for replication), or reduction in size of a tumor.

Operably linked: A first nucleic acid sequence is operably linked with a second nucleic acid sequence when the first nucleic acid sequence is placed in a functional relationship with the second nucleic acid sequence. For instance, a promoter is operably linked to a coding sequence if the promoter affects the transcription or expression of the coding sequence. Generally, operably linked DNA sequences are contiguous and, where necessary to join two protein-coding regions, in the same reading frame.

Pharmaceutically acceptable carrier: The pharmaceutically acceptable carriers (vehicles) useful in this disclosure are conventional. *Remington's Pharmaceutical Sciences*, by E. W. Martin, Mack Publishing Co., Easton, PA, 15th Edition (1975), describes compositions and formulations suitable for pharmaceutical delivery of one or more therapeutic compounds, molecules or agents (e.g. a recombinant virus disclosed herein).

In general, the nature of the carrier will depend on the particular mode of administration being employed. For instance, parenteral formulations usually comprise injectable fluids that include pharmaceutically and physiologically acceptable fluids such as water, physiological saline, balanced salt solutions, aqueous dextrose, glycerol or the like as a vehicle. For solid compositions (for example, powder, pill, tablet, or capsule forms), conventional nontoxic solid carriers can include, for example, pharmaceutical grades of mannitol, lactose, starch, or magnesium stearate. In addition to biologically-neutral carriers, pharmaceutical compositions to be administered can contain minor amounts of non-toxic auxiliary substances, such as wetting or emulsifying agents, preservatives, and pH buffering agents and the like, for example sodium acetate or sorbitan monolaurate.

Polypeptide, peptide or protein: A polymer in which the monomers are amino acid residues which are joined together through amide bonds. When the amino acids are alpha-amino acids, either the L-optical isomer or the D-optical isomer can be used. The terms "polypeptide," "peptide" and "protein" are used interchangeably herein. These terms apply to amino acid polymers in which one or more amino acid residue is an artificial chemical mimetic of a corresponding naturally occurring amino acid, as well as to naturally occurring amino acid polymers and non-naturally occurring amino acid polymers. The term "residue" or "amino acid residue" includes reference to an amino acid that is incorporated into a protein, polypeptide, or peptide.

A conservative substitution in a polypeptide is a substitution of one amino acid residue in a protein sequence for a different amino acid residue having similar biochemical properties. Typically, conservative substitutions have little to no impact on the activity of a resulting polypeptide. For example, a protein or peptide including one or more conservative substitutions (for example no more than 1, 2, 3, 4 or 5 substitutions) retains the structure and function of the wild-type protein or peptide. A polypeptide can be produced to contain one or more conservative substitutions by manipulating the nucleotide sequence that encodes that polypeptide using, for example, standard procedures such as site-directed mutagenesis or PCR. In one example, such variants can be readily selected by testing antibody cross-reactivity or its ability to induce an immune response. Examples of conservative substitutions are shown below.

| Original Residue | Conservative Substitutions |
| --- | --- |
| Ala | Ser |
| Arg | Lys |
| Asn | Gln, His |
| Asp | Glu |
| Cys | Ser |
| Gln | Asn |
| Glu | Asp |
| His | Asn; Gln |
| Ile | Leu, Val |
| Leu | Ile; Val |
| Lys | Arg; Gln; Glu |
| Met | Leu; Ile |
| Phe | Met; Leu; Tyr |
| Ser | Thr |
| Thr | Ser |
| Trp | Tyr |
| Tyr | Trp; Phe |
| Val | Ile; Leu |

Conservative substitutions generally maintain (a) the structure of the polypeptide backbone in the area of the substitution, for example, as a sheet or helical conformation, (b) the charge or hydrophobicity of the molecule at the target site, or (c) the bulk of the side chain.

The substitutions which in general are expected to produce the greatest changes in protein properties will be non-conservative, for instance changes in which (a) a hydrophilic residue, for example, seryl or threonyl, is substituted for (or by) a hydrophobic residue, for example, leucyl, isoleucyl, phenylalanyl, valyl or alanyl; (b) a cysteine or proline is substituted for (or by) any other residue; (c) a residue having an electropositive side chain, for example, lysyl, arginyl, or histadyl, is substituted for (or by) an electronegative residue, for example, glutamyl or aspartyl; or (d) a residue having a bulky side chain, for example, phenylalanine, is substituted for (or by) one not having a side chain, for example, glycine.

Preventing, treating or ameliorating a disease: "Preventing" a disease refers to inhibiting the full development of a disease. "Treating" refers to a therapeutic intervention that ameliorates a sign or symptom of a disease or pathological condition after it has begun to develop. "Ameliorating" refers to the reduction in the number or severity of signs or symptoms of a disease.

Promoter: A region of DNA that directs/initiates transcription of a nucleic acid (e.g. a gene). A promoter includes necessary nucleic acid sequences near the start site of transcription. Typically, promoters are located near the genes they transcribe. A promoter also optionally includes distal enhancer or repressor elements which can be located as much as several thousand base pairs from the start site of transcription. A "constitutive promoter" is a promoter that is continuously active and is not subject to regulation by external signals or molecules. In contrast, the activity of an "inducible promoter" is regulated by an external signal or molecule (for example, a transcription factor or tetracycline).

Protein IX (pIX): A minor component of the adenovirus capsid that associates with the hexon protein.

Purified: The term "purified" does not require absolute purity; rather, it is intended as a relative term. Thus, for example, a purified peptide, protein, virus, or other active compound is one that is isolated in whole or in part from naturally associated proteins and other contaminants. In certain embodiments, the term "substantially purified" refers to a peptide, protein, virus or other active compound that has been isolated from a cell, cell culture medium, or other crude preparation and subjected to fractionation to remove various components of the initial preparation, such as proteins, cellular debris, and other components.

Rapamycin: A small molecule with known immunosuppressive and anti-proliferative properties. Rapamycin, also known as sirolimus, is a macrolide that was first discovered as a product of the bacterium *Streptomyces hygroscopicus*. Rapamycin binds and inhibits the activity of mTOR.

Rb-deficient cell: A cell (such as a tumor cell) in which the level of the tumor suppressor Rb is reduced compared to the level of Rb in a normal or control cell, or a cell in which the Rb pathway is disrupted or inactive. The terms "Rb pathway," or "Rb signaling pathway" refer to, at least in part, molecules that affect pRb activity including pRb/p107, E2F-1/-2/-3, and G1 cyclin/cdk complexes. It will be appreciated that molecules not presently known may also come within this definition.

Rb/p16/Cyclin D:cdk4/E2F replication impaired or deficient adenovirus: An adenovirus (such as a modified/recombinant adenovirus) that upon infection of a cell, exhibits partially or fully attenuated replication in the presence of normal levels of functional cellular Rb/p107/p130/p16/Cyclin:CDK/E2F pathway proteins, including Rb/p107/p130/p16/E2F/CDK-cyclin checkpoints. For example, if the infected cell is Rb/p16 pathway impaired or deficient (i.e. the infected cell does not express normal levels of fully functional Rb or other proteins in the Rb/p16 pathway), replication of the Rb/p16/E2F pathway replication impaired adenovirus will proceed normally. Conversely, if a cell expresses normal levels of functional Rb (e.g. Rb with normal activity, also referred to herein as an "Rb expressing cell"), replication of the Rb replication impaired or deficient adenovirus is attenuated or prevented. A cell may be Rb impaired or deficient by failing to express normal levels of Rb (e.g. a mutation to the regulatory region of the Rb gene) or expressing mutated Rb having below normal Rb activity. Normal levels of Rb and normal Rb activity levels are found in healthy, non-diseased cells of the same type. Thus, the Rb impaired cell includes a mutated Rb gene. Optionally, the Rb impaired cell includes a genome wherein the Rb gene is wholly or partially deleted. The Rb impaired cell may be a cancer/tumor cell. Other genomic lesions that can result in the loss of normal Rb function include, but are not limited to, CDK mutations, cyclin mutations and amplifications, p16 mutations and/or epigenetic silencing, p107 mutations, p130 mutations, and growth factor receptor pathway mutations.

Rb/p16 tumor suppressor pathway or Rb/p16 pathway: Refers to the entire signaling pathway that includes the retinoblastoma (Rb) protein, and other protein/protein families in the pathway, including but not limited to Cdk, E2F, atypical protein kinase C, and Skp2. The term "Rb/p16 tumor suppressor pathway impaired or deficient" means that one or more molecules in the signaling pathway are impaired or deficient, e.g., by failing to express normal levels or a protein or expressing mutated proteins having below normal activity, such that the pathway functions abnormally. Such defects result in high expression levels of free E2F and high activity of the E2F promoter. Thus, a cell may be Rb/p16 pathway impaired or deficient by failing to express normal levels of a protein or expressing mutated proteins having below normal activity in the Rb/p16 tumor suppressor pathway.

Recombinant: A recombinant nucleic acid molecule, protein or virus is one that has a sequence that is not naturally occurring or has a sequence that is made by an artificial combination of two otherwise separated segments of sequence. This artificial combination can be accomplished by chemical synthesis or by the artificial manipulation of isolated segments of nucleic acid molecules, such as by genetic engineering techniques. The term "recombinant" also includes nucleic acids, proteins and viruses that have been altered solely by addition, substitution, or deletion of a portion of the natural nucleic acid molecule, protein or virus.

Replication defects: An adenovirus that exhibits "replication defects" in a non-tumor cell (compared to a tumor cell) refers to an adenovirus that exhibits reduced viral replication in normal cells compared to tumor cells. Replication defects are evidenced by, for example, a lack of viral late protein expression, a reduction in viral DNA synthesis, a reduced ability to induce E2F target genes (e.g. cyclin A and B), a reduced ability to elicit S phase entry and/or a reduced ability to induce cell killing in normal cells compared to tumor cells.

Replication deficient virus: A virus that preferentially inhibits cell proliferation, causes cell lysis, or induces apoptosis (collectively considered killing) in a predetermined cell population with a given phenotype (e.g., tumor cells with a deregulated E2F pathway). Such viruses are unable to or are limited in the ability to reduce or inhibit cell proliferation, cause cell lysis, induce apoptosis, or otherwise replicate in cells that do not have the predetermined cell phenotype (such as normal, non-tumor cells).

Sequence identity: The identity or similarity between two or more nucleic acid sequences, or two or more amino acid sequences, is expressed in terms of the identity or similarity between the sequences. Sequence identity can be measured in terms of percentage identity; the higher the percentage, the more identical the sequences are. Sequence similarity can be measured in terms of percentage similarity (which takes into account conservative amino acid substitutions); the higher the percentage, the more similar the sequences are. Homologs or orthologs of nucleic acid or amino acid sequences possess a relatively high degree of sequence identity/similarity when aligned using standard methods. This homology is more significant when the orthologous proteins or cDNAs are derived from species which are more closely related (such as human and mouse sequences), compared to species more distantly related (such as human and *C. elegans* sequences).

Methods of alignment of sequences for comparison are well known in the art. Various programs and alignment algorithms are described in: Smith & Waterman, *Adv. Appl. Math.* 2:482, 1981; Needleman & Wunsch, *J. Mol. Biol.* 48:443, 1970; Pearson & Lipman, *Proc. Natl. Acad. Sci. USA* 85:2444, 1988; Higgins & Sharp, *Gene,* 73:237-44, 1988; Higgins & Sharp, *CABIOS* 5:151-3, 1989; Corpet et al., *Nuc. Acids Res.* 16:10881-90, 1988; Huang et al. *Computer Appls. in the Biosciences* 8, 155-65, 1992; and Pearson et al., *Meth. Mol. Bio.* 24:307-31, 1994. Altschul et al., *J. Mol. Biol.* 215:403-10, 1990, presents a detailed consideration of sequence alignment methods and homology calculations.

The NCBI Basic Local Alignment Search Tool (BLAST) (Altschul et al., *J. Mol. Biol.* 215:403-10, 1990) is available from several sources, including the National Center for Biological Information (NCBI) and on the internet, for use in connection with the sequence analysis programs blastp, blastn, blastx, tblastn and tblastx. Additional information can be found at the NCBI web site.

Serotype: A group of closely related microorganisms (such as viruses) distinguished by a characteristic set of antigens.

Subject: Living multi-cellular vertebrate organisms, a category that includes human and non-human mammals.

Synthetic: Produced by artificial means in a laboratory, for example a synthetic nucleic acid or protein can be chemically synthesized in a laboratory.

Targeting ligand: In the context of the present disclosure, a "targeting ligand" is a protein that directs a recombinant adenovirus to a specific cell type that expresses a receptor or binding protein specific for the targeting ligand. In some embodiments, the targeting ligand is an antibody specific for a cell surface protein overexpressed in tumors (e.g. EGFR).

Therapeutic agent: A chemical compound, small molecule, recombinant virus or other composition, such as an antisense compound, antibody, peptide or nucleic acid molecule capable of inducing a desired therapeutic or prophylactic effect when properly administered to a subject. For example, therapeutic agents for cancer include agents that prevent or inhibit development or metastasis of the cancer.

Therapeutically effective amount: A quantity of a specified pharmaceutical or therapeutic agent (e.g. a recombinant virus) sufficient to achieve a desired effect in a subject, or in a cell, being treated with the agent. The effective amount of the agent can be dependent on several factors, including, but not limited to the subject or cells being treated, and the manner of administration of the therapeutic composition.

Uexon: An open reading frame located on the 1 strand (leftward transcription) between the early E3 region and the fiber gene (Tollefson et al., *J Virol* 81(23):12918-12926).

Vector: A vector is a nucleic acid molecule allowing insertion of foreign nucleic acid without disrupting the ability of the vector to replicate and/or integrate in a host cell. A vector can include nucleic acid sequences that permit it to replicate in a host cell, such as an origin of replication. A vector can also include one or more selectable marker genes and other genetic elements. An expression vector is a vector that contains the necessary regulatory sequences to allow transcription and translation of inserted gene or genes.

Unless otherwise explained, all technical and scientific terms used herein have the same meaning as commonly understood by one of ordinary skill in the art to which this disclosure belongs. The singular terms "a," "an," and "the" include plural referents unless context clearly indicates otherwise. "Comprising A or B" means including A, or B, or A and B. It is further to be understood that all base sizes or amino acid sizes, and all molecular weight or molecular mass values, given for nucleic acids or polypeptides are approximate, and are provided for description. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including explanations of terms, will control. In addition, the materials, methods, and examples are illustrative only and not intended to be limiting.

III. Recombinant Adenoviruses

Recombinant adenoviruses capable of selectively replicating in E2F deregulated tumor cells are provided by the present disclosure. The recombinant adenoviruses disclosed herein have a genome that encodes a modified E1A protein, a modified or deleted E4orf1 protein, a modified or deleted E4orf6/7 protein, or any combination thereof. As a result of the E1A, E4orf1 and/or E4orf6/7 mutations, the recombinant adenoviruses exhibit replication defects in normal (i.e., non-tumor) cells, while retaining the capacity to replicate in and lyse tumor cells. In one example, the recombinant adenoviruses have decreased replication in a normal (i.e., non-tumor) cell, relative to a tumor cell of the same cell type (e.g., breast cancer cell vs. normal breast cell), such as a decrease of at least 20%, at least 40%, at least 50%, at least 60%, at least 70%, at least 80%, at least 90%, at least 95%, at least 98%, or at least 99%, for example as determined by comparing the number of infectious particles in infected normal cells and infected tumor cells.

The recombinant adenoviruses provided herein optionally include additional modifications, such as for targeting to specific cell types, to inhibit targeting to and replication in the liver, and to evade pre-existing neutralizing antibodies to common adenovirus serotypes. Recombinant nucleic acid molecules encoding the oncolytic adenoviruses are also provided.

Further provided herein are recombinant reporter adenovirus gene expression vectors expressing GFP-luciferase under the control of the EF1α promoter. In some instances, the disclosed reporter adenoviruses include one or more modifications to inhibit targeting to and replication in the liver. Recombinant nucleic acid molecules encoding the recombinant reporter adenoviruses are also provided.

A. Oncolytic Modifications

The specific oncolytic modifications disclosed herein are described with reference to the adenovirus 5 (Ad5) genome sequence. However, the same modifications and deletions could be made in any human adenovirus serotype. In one exemplary embodiment, the recombinant adenovirus is Ad34. In other specific embodiments, the recombinant adenovirus is Ad11 or Ad37. FIGS. 27 and 28 illustrate the sequence similarity in the E1A and E4orf1 regions amongst human adenovirus species.

The CR1 region of E1A has sequence and structural homology to cellular E2F, and competes with E2F-Rb interactions. The conserved E1A hydrophobic residues L43, L46 and Y47 serve as hydrophobic anchors for interaction with Rb. The mutation of L43, L46 and/or Y47 to a polar amino acid such as D, E, H, K or R would eliminate this E1A-Rb interaction. In some embodiments of the present disclosure, the recombinant adenovirus includes a Y74H mutation in E1A to disrupt the E1A-Rb interaction.

E1A interacts strongly with Rb via its LXCXE motif. Since the side chains of the first leucine and central cysteine bind in a small hydrophobic pocket of the B box motif of Rb, deletions or mutations of this residues to small (such as G) or polar amino acids (such as D, E, H, K or R) would eliminate this E1A-Rb interaction. Thus, in some embodiments herein, the recombinant adenovirus includes a deletion of the LXCXE motif (ΔLXCXE) or a C124G substitution in E1A.

Both E1A residues C124 and Y47 are critical for binding to and inactivating Rb. Thus, in some embodiments, the recombinant adenovirus encodes the double mutant Y/F47H and C124G, but it is believed that any mutations made to these residues or regions (as described above) will result in weakening E1A-Rb interactions. Accordingly, mutations or deletions of any residues that disrupt the Rb-E1A interaction are contemplated herein.

The deletion of residues 2-11 of E1A eliminates a p300/CBP interaction, and disrupts DP-1 interaction, further reducing the ability of E1A to upregulate E2F targets. Also contemplated herein are point mutations in E1A residues 2-11, such as glycine or alanine mutations of the conserved R2 or H3 residues, or polar residue mutations (e.g. D, E, H, K, or R) of the hydrophobic I/L/V4 from different adenovirus serotypes (see E1A alignment shown in FIG. 27) to eliminate this interaction.

E4orf1 interacts with cellular proteins containing PDZ motifs via the PDZ-binding motif at its C-terminus. In some embodiments disclosed herein, the last three amino acids of E4orf1 are deleted to eliminate its PDZ-binding motif. Also contemplated herein are point mutations of the highly conserved S126 of Ad5 E4orf1 to large hydrophobic residues such as V, L, or I; or the point-mutation of V128 of Ad5 E4orf1 to polar residues such as D, E, H, K, or R. These substitutions are believed to eliminate the PDZ-binding activity of E4orf1, and eliminate this transforming function of E4orf1. The same deletions and/or mutations in E4orf1 can be made in other adenovirus serotypes, such as Ad34. Complete deletions of E4orf1 can also be introduced.

Provided herein is a recombinant adenovirus, wherein the genome of the recombinant adenovirus encodes a modified E1A protein, a modified or deleted E4orf1 protein, a modified or deleted E4orf6/7 protein, or any combination thereof, and wherein the recombinant adenovirus exhibits replication defects in normal cells compared to tumor cells.

In some embodiments, the genome encodes a modified E1A protein and a modified or deleted E4orf1 protein. In other embodiments, the genome encodes a modified E1A protein and a deleted E4orf6/7 protein. In yet other embodiments, the genome encodes a modified E1A protein, a modified or deleted E4orf1 protein, and a deleted E4orf6/7 protein.

In some examples, the modified E1A protein of the recombinant adenovirus comprises a deletion of the LXCXE motif; a deletion of residues 2-11; a C124G substitution; a Y47H substitution; a Y47H substitution and a C124G substitution; or a Y47H substitution, a C124G substitution and a deletion of residues 2-11. These mutations are described with reference to Ad5 E1A having the amino acid sequence of SEQ ID NO: 32; however, corresponding mutations can be made in any other human adenovirus as E1A sequences are highly conserved (see FIG. 27).

In some examples, the modified E4orf1 protein comprises a deletion of the PDZ-binding motif. In other examples, the E4orf1 protein comprises a deletion of the C-terminal 10 amino acids or 20 amino acids, or a mutation of D68 to A, K, R, P, F, G or L.

In some examples, the modified E4orf6/7 protein comprises a mutation (such as a deletion) that abolishes or impairs its E2F binding site and/or impairs E2F interactions. In other examples, the modified E4orf6/7 protein comprises a modification that deletes or impairs the nuclear localization signal, which is required for efficient translocation of E2F4.

In particular non-limiting examples, the genome of the recombinant adenovirus encodes a modified E1A protein comprising a deletion of the LXCXE motif and a deleted E4orf6/7 protein (see e.g., AdSyn-CO181, AdSyn-CO312, AdSyn-CO313, AdSyn-CO335, AdSyn-CO442);

- a modified E1A protein comprising a deletion of the LXCXE motif, a modified E4orf1 protein comprising a deletion of the PDZ-binding motif, and a deleted E4orf6/7 protein (see, e.g., AdSyn-CO285);
- a modified E1A protein comprising a deletion of the LXCXE motif, a deleted E4orf1 protein, and a deleted E4orf6/7 protein (see, e.g., AdSyn-CO286);
- a modified E1A protein comprising a C124G substitution and a deleted E4orf6/7 protein (see, e.g., AdSyn-CO287);
- a modified E1A protein comprising a C124G substitution, a modified E4orf1 protein comprising a deletion of the PDZ-binding motif, and a deleted E4orf6/7 protein (see, e.g., AdSyn-CO288);
- a modified E1A protein comprising a C124G substitution, a deleted E4orf1 protein, and a deleted E4orf6/7 protein (see, e.g., AdSyn-CO289);
- a modified E1A protein comprising a deletion of residues 2-11 and a deleted E4orf6/7 protein (see, e.g., AdSyn-CO290);
- a modified E1A protein comprising a deletion of residues 2-11, a modified E4orf1 protein comprising a deletion of the PDZ-binding motif, and a deleted E4orf6/7 protein (see, e.g., AdSyn-CO291);
- a modified E1A protein comprising a deletion of residues 2-11, a deleted E4orf1 protein, and a deleted E4orf6/7 protein (see, e.g., AdSyn-CO292);
- a modified E1A protein comprising a Y47H substitution and a C124G substitution, and a deleted E4orf6/7 protein (see, e.g., AdSyn-CO293);
- a modified E1A protein comprising a Y47H substitution and a C124G substitution, a modified E4orf1 protein comprising a deletion of the PDZ-binding motif, and a deleted E4orf6/7 protein (see, e.g., AdSyn-CO294);
- a modified E1A protein comprising a Y47H substitution and a C124G substitution, a deleted E4orf1 protein, and a deleted E4orf6/7 protein (see, e.g., AdSyn-CO295);
- a modified E1A protein comprising a Y47H substitution, a C124G substitution and a deletion of residues 2-11, and a deleted E4orf6/7 protein (see, e.g., AdSyn-CO296);
- a modified E1A protein comprising a Y47H substitution, a C124G substitution and a deletion of residues 2-11, a modified E4orf1 protein comprising a deletion of the PDZ-binding motif, and a deleted E4orf6/7 protein (see, e.g., AdSyn-CO297); or
- a modified E1A protein comprising a Y47H substitution, a C124G substitution and a deletion of residues 2-11, a deleted E4orf1 protein, and a deleted E4orf6/7 protein (see, e.g., AdSyn-CO298).

In specific examples, the genome of the recombinant adenovirus is at least 90%, at least 95%, at least 96%, at least 97%, at least 98% or at least 99% identical to any one of SEQ ID NOs: 6-8, 10-12, 14, 15, 18-20, 22-26, 30, 31 and 82-87, or the genome of the recombinant adenovirus comprises or consists of any one of SEQ ID NOs: 6-8, 10-12, 14, 15, 18-20, 22-26, 30, 31, 82-87, and 92-97 and has decreased replication in a normal (i.e., non-tumor) cell, relative to a tumor cell of the same cell type (e.g., breast cancer cell vs. normal breast cell), such as a decrease of at least 20%, at least 40%, at least 50%, at least 60%, at least 70%, at least 80%, at least 90%, at least 95%, at least 98%, or at least 99%, for example as determined by comparing the number of infectious particles in normal and tumor cells.

In some embodiments, the genome of the recombinant adenovirus comprises a deletion of the E3-RIDα/RIDβ and E3-14.7k coding sequences.

B. Liver Detargeting Modifications

The recombinant adenoviruses disclosed herein may further include modifications that detarget the virus from the liver. Ad5 hexon can bind to Factor X in the blood, which can lead to its absorption by Kuppfer cells in the liver that prevent systemic dissemination and limit inflammation. To overcome this, recombinant adenoviruses were engineered to include additional genomic modifications in the E1 and core modules that prevent uptake and expression in the liver.

To test genomic modules that include these additional modifications, and to create Ad5 expression vectors for in vivo use and gene delivery, the E1A/E1 genes were deleted and replaced with an EF1α driven luciferase-GFP fusion. When injected intravenously, AdSyn-CO199 primarily accumulated in the liver as evidenced by luciferase bioluminescence (see FIG. 22).

To prevent off-target expression in the liver, viruses were engineered to include binding sites in the 3'UTR of E1A for micro-RNAs that are specifically expressed in the liver. In particular embodiments, miR122 was selected as the liver-specific microRNA as its expression and binding sites are conserved in both human and mouse liver cells. In some examples, two micro-RNA binding sites for liver-specific miR122 were inserted in the 3'UTR of E1A to prevent any residual virus uptake in the liver inducing viral gene expression and cellular inflammatory responses. In contrast to Adsyn-CO199, AdSyn-CO200 (see FIG. 22 and Example 2 below) does not drive luciferase expression in the liver.

To prevent virus uptake and sequestration in the liver through Ad5 hexon binding to Factor X, viruses were engineered with an additional mutation in hexon (E451Q) that prevents liver uptake. In contrast to AdSyn-CO199 and AdSyn-CO200, AdSyn-CO171 does not accumulate in the liver and instead is able to target other organs, in this case the spleen and lymph nodes as these were non-tumor bearing animals (FIG. 22).

Figure 20:
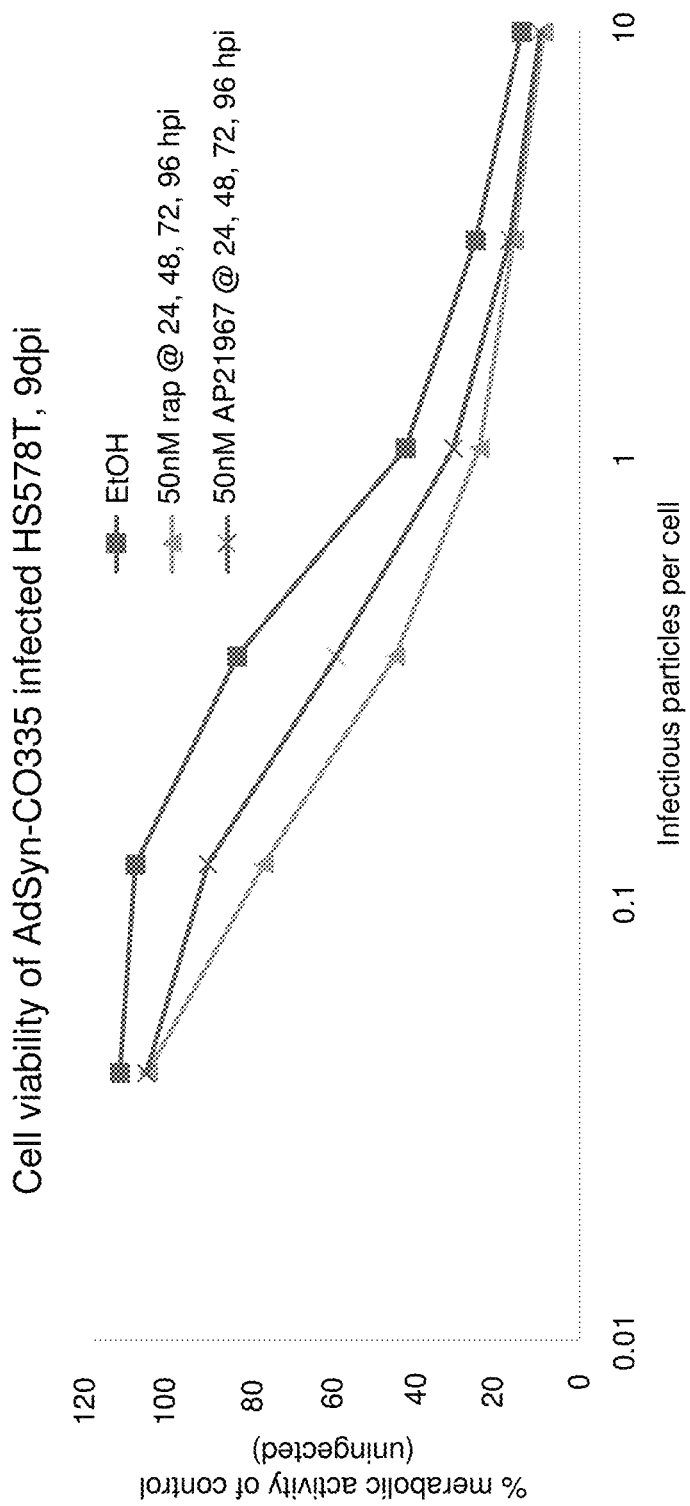
FIG. 20 is a graph showing the cell viability of infected HS578T metastatic breast cancer cells after 9 days of infection. Cells were infected with a serial dilution of AdSyn-CO335. At 24, 48, 72 and 96 hours after infection, fresh rapamycin or AP21967 was added to 50 nM. The metabolic activity was quantified by WST-1 assay, and was normalized to uninfected cells with a matching drug treatment. AdSyn-CO335 bears the oncolytic mutations of E1A ΔLXCXE, ΔE4orf6/7, ΔE3-RIDα/β, ΔE3-14.7k; the liver detargeting hexon mutation E451Q; and expresses the rapamycin- or AP21967-dependent EGFR-targeting genes EGFRVHH-FKBP and FRB*-fiber. There is enhanced killing of cells infected with the EGFR-targeted oncolytic virus that receive either rapamycin or AP21967 versus without targeting.
Figure 21A:
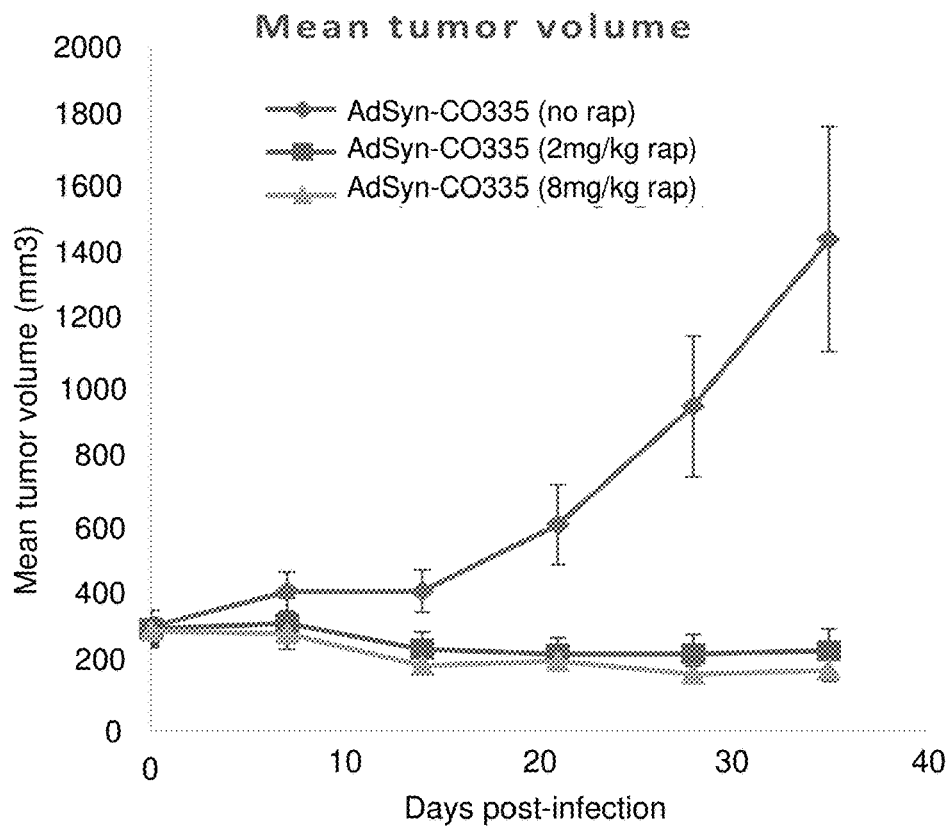
FIGS. 21A-21B are graphs showing the mean volumes of HS578T subcutaneous xenografts in treated mice.
Figure 21B:
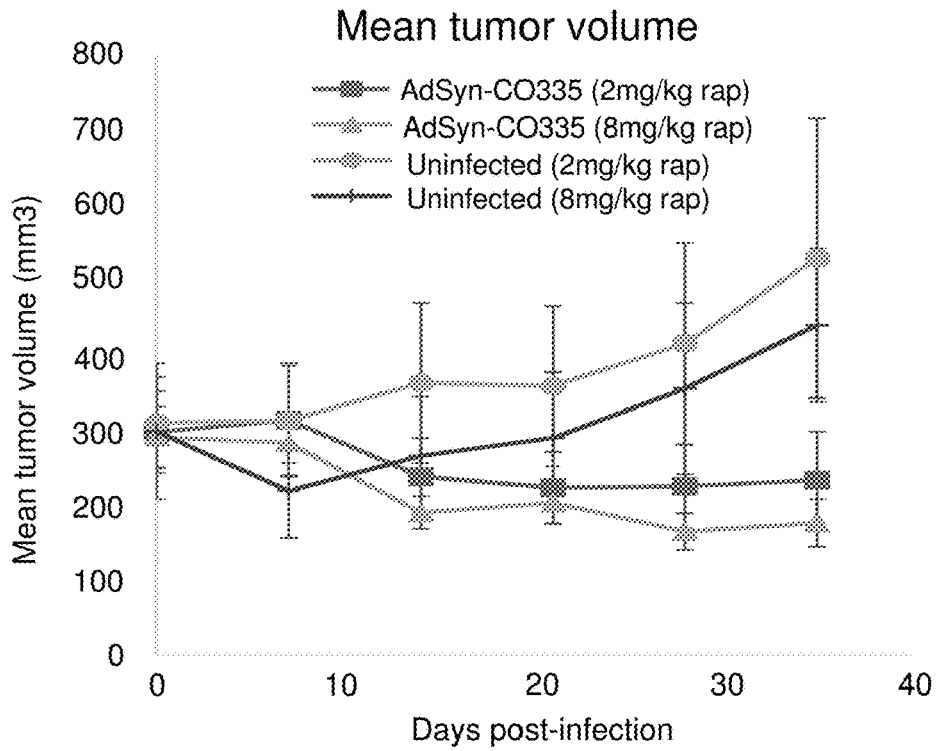
Figure 21C:
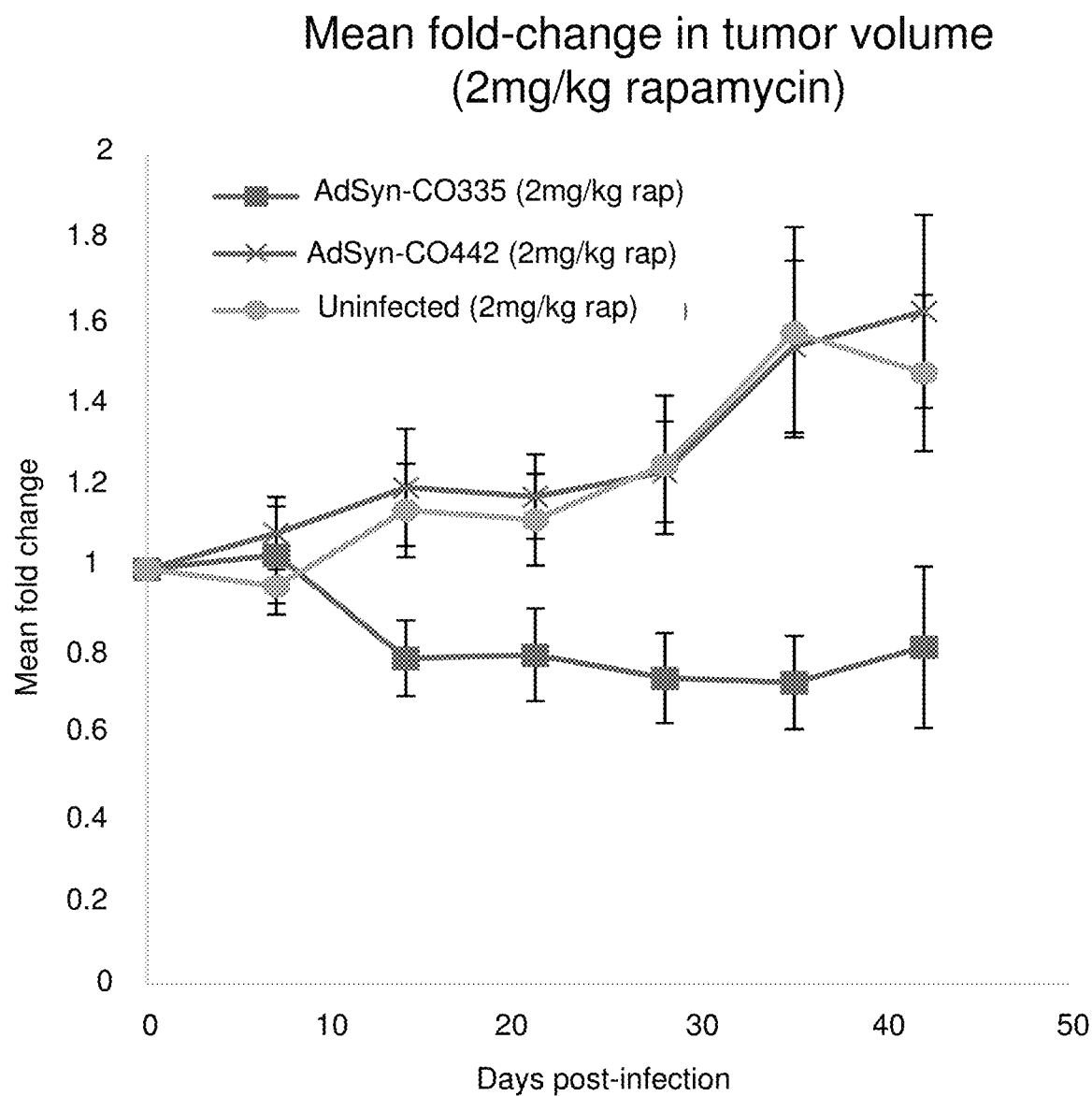
FIGS. 21C-21D are graphs showing the fold-change in volumes of HS578T subcutaneous xenografts in treated mice. Mice with established tumors received three intratumoral injections every 4 days of AdSyn-CO335, then subsequently received intraperitoneal 2 or 8 mg/kg rapamycin injection (n=8 and n=8, respectively) every other following day or vehicle control (n=6) every other following day; or they received three intratumoral injections every 4 days of AdSyn-CO442, then subsequently received intraperitoneal 2 or 8 mg/kg rapamycin injection (n=6 and n=6, respectively) every other following day; or they received three intratumoral injections every 4 days of vehicle control, then subsequently received intraperitoneal 2 or 8 mg/kg rapamycin injection (n=6 and n=6, respectively) every other following day. The tumors in mice receiving the EGFR-targeted oncolytic virus with 8 mg/kg rapamycin show the best response.
Figure 21D:
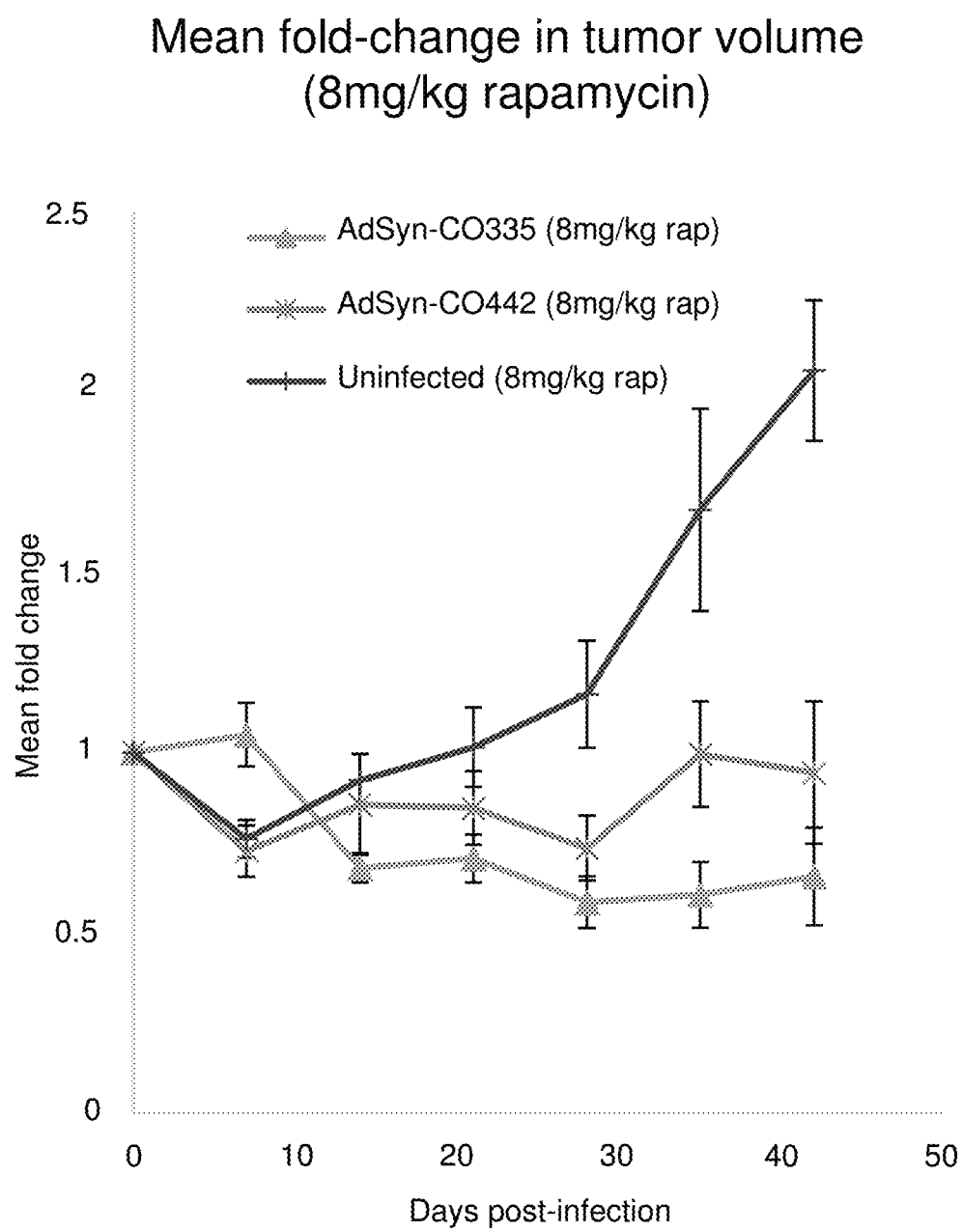

To enable systemic delivery of E2F selective viruses with one or more mutations in E1A, E4orf1 and/or E4orf6/7, recombinant adenoviruses were engineered to further include the liver detargeting E451Q modification in hexon (see, e.g., AdSyn-CO335 and AdSyn-CO442; see FIGS. 20 and 21 and Example 2).

Other mutations to the adenovirus hexon gene are contemplated herein to prevent adenovirus accumulation in the liver. For example, a recombinant adenovirus could be detargeted from the liver by replacing the nine hypervariable regions of hexon with those from different serotypes.

Provided herein are recombinant adenoviruses, wherein the genome of the recombinant adenovirus encodes a modified E1A protein, a modified or deleted E4orf1 protein, a modified or deleted E4orf6/7 protein, or any combination thereof, and further encodes a modified hexon protein, wherein the recombinant adenovirus exhibits replication defects in normal cells compared to tumor cells (see, e.g., AdSyn-CO335).

In some embodiments, the modified hexon protein comprises an E451Q substitution. In specific examples, the genome of the recombinant adenovirus is at least 90%, at least 95%, at least 96%, at least 97%, at least 98% or at least 99% identical to SEQ ID NO: 30, SEQ ID NO: 92 or SEQ ID NO; 97, or the genome comprises or consists of the nucleotide sequence of SEQ ID NO: 30, SEQ ID NO: 92 or SEQ ID NO; 97.

Further provided herein are recombinant adenoviruses, wherein the genome of the recombinant adenovirus encodes a modified E1A protein, a modified or deleted E4orf1 protein, a modified or deleted E4orf6/7 protein, or any combination thereof, and further comprises one or more binding sites for a liver-specific microRNA, wherein the recombinant adenovirus exhibits replication defects in normal cells compared to tumor cells.

In some embodiments, the one or more binding sites for the liver-specific microRNA are located in the 3'-UTR of E1A. In some examples, the liver-specific microRNA is miR-122, miR-30 or miR-192.

C. Modifications for Inducible Retargeting

The recombinant adenoviruses disclosed herein may be further modified for inducible re-targeting in vivo to tumor cell receptors. The ubiquitously used Ad2/5 vectors depend on coxsackie adenovirus receptor (CAR) for infection, which is present on epithelial cells, but absent on most metastatic cancers. "RapAD" enables rapamycin/rapalog inducible targeting of adenoviral infection to any tumor cell receptor (or any cell type) through fusion proteins (see PCT Publication No. WO 2013/138505, which is herein incorporated by reference in its entirety). The use of a flexible adapter system does not interfere with the assembly of viral capsids. An ideal re-targeting fusion protein is an antibody that has strong affinity for a specific cancer cell surface molecule. Camelids and sharks encode single-domain antibodies (sdAbs) that recognize their epitopes through a single 10 kDa variable VHH domain. Using synthetic biology, VHHs can be created that recognize specific molecules, such as EGFR and CEACAM5, which are highly upregulated on lung cancer. It has been demonstrated that rapamycin retargets synthetic adenovirus infection to EGFR on metastatic tumor cells in which CAR is downregulated.

Engineered adenoviruses can also be targeted with biologically orthogonal rapalog AP21967. Although rapamycin is a rational combination with oncolytic adenoviral therapy, there may be instances in which it would be desirable to avoid the cellular and organismal effects of rapamycin. Thus, as another option for retargeting adenovirus, the rapamycin structural homolog AP21967 can be used. AP21967 can form stable heterodimers with FKBP and a mutant FRB* domain (mTOR mutation T2098L), but not with the wild-type FRB domain. In contrast to rapamycin, AP21967 does not inactivate mTOR signaling as evidenced by p70S6kinase phosphorylation, a canonical downstream substrate. However, AP21967 is still able to induce the retargeting of FRB*-fiber (but not FRB-fiber) expressing viruses to tumor cells through the FKBP-VHH fusions (FIG. 18).

When the EGFR-targeted adenovirus is modified with the mutant FRB domain (FRB*), it can be induced to infect cells via EGFR with both rapamycin and AP21967 (see FIGS. 18-21 and Example 2 below).

Provided herein are recombinant adenoviruses, wherein the genome of the recombinant adenovirus encodes a modified E1A protein, a modified or deleted E4orf1 protein, a modified or deleted E4orf6/7 protein, or any combination thereof, and further encodes a targeting ligand fused to an FKBP protein, and an adenovirus fiber protein fused to a wild-type FRB protein or a mutant FRB protein comprising a T2098L substitution.

In some embodiments, the targeting ligand is a single domain antibody, such as a camelid VHH antibody. In particular examples, the single domain antibody is specific for EGFR, or another molecule that is upregulated on tumor cells. In non-limiting examples, the genome of the recombinant adenovirus is at least 90%, at least 95%, at least 96%, at least 97%, at least 98% or at least 99% identical to SEQ ID NO: 25, SEQ ID NO: 26 or SEQ ID NO: 88, or comprises or consists of the nucleotide sequence of SEQ ID NO: 25, SEQ ID NO: 26 or SEQ ID NO: 88 (see, e.g., AdSyn-CO312, AdSyn-CO313 and AdSyn-CO205).

In some embodiments, the FKBP-targeting ligand fusion proteins are accommodated in the adenovirus genome by deleting the E3-RIDα/RIDβ and E3-14.7k coding sequences. However, alternative locations in the adenovirus genome are contemplated. For examples, the targeting ligand-FKBP fusion protein could also be inserted as an N-terminal fusion to E3-ADP, with a self-cleaving P2A linker sequence (see, e.g., AdSyn-CO440; SEQ ID NO: 68) or a C-terminal fusion to E1B-55k, with a self-cleaving P2A sequence.

Further provided are recombinant adenoviruses, wherein the genome of the recombinant adenovirus encodes a modified E1A protein, a modified or deleted E4orf1 protein, a modified or deleted E4orf6/7 protein, or any combination thereof, and further encodes an adenovirus fiber protein fused to a mutant FRB protein comprising a T2098L substitution. In some examples, the genome further encodes a modified hexon protein comprising an E451Q substitution. In specific examples, the genome of the recombinant adenovirus is at least 90%, at least 95%, at least 96%, at least 97%, at least 98% or at least 99% identical to SEQ ID NO: 31, or comprises or consists of the nucleotide sequence of SEQ ID NO: 31 (see, e.g. AdSyn-CO336).

The inducibly retargeted recombinant adenoviruses described above can further include liver retargeting modifications, such as a mutant hexon protein (e.g. an E451Q substitution). Alternatively or in addition, the genome of the recombinant adenovirus can include one or more binding sites for a liver-specific microRNA (as described above).

D. Chimeric Fiber Proteins for Retargeting

While the fiber proteins of Ad5 and many other serotypes have been shown to bind to the coxsackie adenovirus receptor (CAR) for cellular attachment, other serotypes have been shown to use CD46, desmoglein 2, sialic acid, or others. Thus, provided herein are recombinant adenoviruses having a genome that encodes a chimeric fiber protein, thereby targeting the recombinant virus to different cellular receptors (see FIGS. 23A-23E and Example 3 below).

Provided herein are recombinant adenoviruses, wherein the genome of the recombinant adenovirus encodes a modified E1A protein, a modified or deleted E4orf1 protein, a modified or deleted E4orf6/7 protein, or any combination thereof, and further encodes a chimeric fiber protein.

In some embodiments, the chimeric fiber protein comprises a fiber shaft from a first adenovirus serotype and a fiber knob from a second adenovirus serotype. In some examples, the first adenovirus serotype is Ad5 and the second adenovirus serotype is Ad3, Ad9, Ad11, Ad12, Ad34 or Ad37. In one non-limiting example, the first adenovirus serotype is Ad5 and the second adenovirus serotype is Ad34.

In particular examples, the genome of the recombinant adenovirus comprises the nucleotide sequence of SEQ ID NO: 82, SEQ ID NO: 83 or SEQ ID NO: 84.

The recombinant oncolytic adenoviruses expressing a chimeric fiber can further include inducible targeting and/or liver retargeting modifications as discussed above.

E. Capsid Swaps for Evading Neutralizing Antibodies

The present disclosure further contemplates exploiting natural adenovirus modularity to create chimeric viruses capable of evading existing neutralizing antibodies. In particular, disclosed herein are Ad5-based viruses that have complete 'capsid' module swaps (almost 60% of genome), which render them 'invisible' to pre-existing antibodies and enables repeated inoculations. Capsid swapped recombinant adenoviruses are further described in Example 4 (see also FIGS. 24-26).

Provided herein are recombinant adenoviruses, wherein the genome of the recombinant adenovirus encodes a modified E1A protein, a modified or deleted E4orf1 protein, a modified or deleted E4orf6/7 protein, or any combination thereof, and wherein the genome of the recombinant adenovirus encodes a capsid-swapped chimeric adenovirus. In some embodiments, the E1, E3 and E4 regions of the genome are derived from a first adenovirus serotype and the E2B, L1, L2, L3, E2A and L4 regions of the genome are derived from a second adenovirus serotype. In some examples, the E1 region of the first adenovirus serotype is modified to encode a pIX protein from the second adenovirus serotype; and/or the E3 region of the first adenovirus serotype is modified to encode Uexon and fiber proteins from the second adenovirus serotype. In particular examples, the first adenovirus serotype is Ad5 and the second adenovirus serotype is Ad3, Ad9, Ad11, Ad34 or Ad37.

In particular examples, the genome of the recombinant adenovirus comprises the nucleotide sequence of SEQ ID NO: 85, or any one of SEQ ID NOs: 92-97.

The recombinant oncolytic, capsid-swapped adenoviruses can further include the chimeric fiber, inducible targeting and/or liver retargeting modifications as discussed above.

F. Other Modifications

The recombinant adenoviruses disclosed herein can also include additional modifications, such as to enhance tumor selectively, direct infection to specific cell types and to evade existing neutralizing antibodies.

In one embodiment, the recombinant adenovirus is an EGFR-targeted oncolytic adenovirus with E1, E3, and E4 mutations together with the capsid protein penton bearing a mutation in the integrin-binding RGD motif to RGE (e.g., AdSyn-CO511; SEQ ID NO: 86). This penton mutation has been shown to reduce uptake up the virus in the spleen and attenuates the antiviral inflammatory response.

In another embodiment, the recombinant oncolytic adenovirus comprises E1 and E4 mutations together with an insertion of an RGD peptide in the fiber protein (e.g., AdSyn-CO512; SEQ ID NO: 87). The RGD insertion in the fiber protein has been shown to dramatically increase infection to a wider variety of cell types, including vascular endothelial cells.

G. Recombinant Reporter Adenoviruses

Further provided herein are recombinant reporter adenoviruses. In some embodiments, the genome of the recombinant adenovirus comprises a deletion of E1A and encodes EF1α-luciferase (see, e.g., AdSyn-CO199, AdSyn-CO200 and AdSyn-CO171).

In some embodiments, the genome of the recombinant adenovirus further comprises one or more binding sites for a liver-specific microRNA and/or encodes a modified hexon protein. In some examples, the one or more binding sites for the liver-specific microRNA are located in the 3'-UTR of E1A. In specific non-limiting examples, the liver-specific microRNA is miR-122. In some examples, the modified hexon protein comprises an E451Q substitution.

In specific non-limiting examples, the genome of the recombinant adenovirus at least 90%, at least 95%, at least 96%, at least 97%, at least 98% or at least 99% identical to, or comprises or consists of, the nucleotide sequence of SEQ ID NO: 27 (AdSyn-CO199), SEQ ID NO: 28 (AdSyn-CO200), or SEQ ID NO: 29 (AdSyn-CO171).

IV. Wild-Type and Mutant Virus Sequences

Further provided by the present disclosure are recombinant adenovirus genomes of the recombinant adenoviruses disclosed herein. In particular, provided are recombinant nucleic acid molecules comprising a nucleotide sequence at least 90%, at least 95%, at least 96%, at least 97%, at least 98% or at least 99% identical to any one of SEQ ID NOs: 1-31 and 68-98. In specific examples, the recombinant nucleic acid comprises or consists of the nucleotide sequence of any one of SEQ ID NOs: 1-31 and 68-98.

Also provided are vectors comprising the recombinant adenovirus genomes. In some embodiments, provided is a vector comprising a nucleic acid molecule at least 90%, at least 95%, at least 96%, at least 97%, at least 98% or at least 99% identical to any one of SEQ ID NOs: 1-31 and 68-98. In some examples, provided is a vector comprising a nucleic acid molecule comprising or consisting of the nucleotide sequence of any one of SEQ ID NOs: 1-31 and 68-98.

Provided below are wild-type and mutant adenovirus protein sequences expressed by the recombinant adenoviruses disclosed herein.

E1A Mutants

In the E1A sequences below, the LXCXE motif is indicated by underline. This motif is present at amino acids 122-126 of Ad5 E1A (SEQ ID NO: 32). The Y47H and C124G substitutions are shown in bold.

```
Ad5 E1A
                                                   (SEQ ID NO: 32)
MRHIICHGGVITEEMAASLLDQLIEEVLADNLPPPSHFEPPTLHELYDLD

VTAPEDPNEEAVSQIFPDSVMLAVQEGIDLLTFPPAPGSPEPPHLSRQPE

QPEQRALGPVSMPNLVPEVIDLTCHEAGFPPSDDEDEEGEEFVLDYVEHP

GHGCRSCHYHRRNTGDPDIMCSLCYMRTCGMFVYSPVSEPEPEPEPEPEP

ARPTRRPKMAPAILRRPTSPVSRECNSSTDSCDSGPSNTPPEIHPVVPLC

PIKPVAVRVGGRRQAVECIEDLLNEPGQPLDLSCKRPRP

Ad5 E1A ΔLXCXE
                                                   (SEQ ID NO: 33)
MRHIICHGGVITEEMAASLLDQLIEEVLADNLPPPSHFEPPTLHELYDLD

VTAPEDPNEEAVSQIFPDSVMLAVQEGIDLLTFPPAPGSPEPPHLSRQPE

QPEQRALGPVSMPNLVPEVIDAGFPPSDDEDEEGEEFVLDYVEHPGHGCR

SCHYHRRNTGDPDIMCSLCYMRTCGMFVYSPVSEPEPEPEPEPEPARPTR
```

-continued

RPKMAPAILRRPTSPVSRECNSSTDSCDSGPSNTPPEIHPVVPLCPIKPV

AVRVGGRRQAVECIEDLLNEPGQPLDLSCKRPRP

Ad5 E1A C124G
(SEQ ID NO: 34)
MRHIICHGGVITEEMAASLLDQLIEEVLADNLPPPSHFEPPTLHELYDLD

VTAPEDPNEEAVSQIFPDSVMLAVQEGIDLLTFPPAPGSPEPPHLSRQPE

QPEQRALGPVSMPNLVPEVIDLTGHEAGFPPSDDEDEEGEEFVLDYVEHP

GHGCRSCHYHRRNTGDPDIMCSLCYMRTCGMFVYSPVSEPEPEPEPEPEP

ARPTRRPKMAPAILRRPTSPVSRECNSSTDSCDSGPSNTPPEIHPVVPLC

PIKPVAVRVGGRRQAVECIEDLLNEPGQPLDLSCKRPRP

Ad5 E1A Δ2-11
(SEQ ID NO: 35)
MEEMAASLLDQLIEEVLADNLPPPSHFEPPTLHELYDLDVTAPEDPNEEA

VSQIFPDSVMLAVQEGIDLLTFPPAPGSPEPPHLSRQPEQPEQRALGPVS

MPNLVPEVIDLTCHEAGFPPSDDEDEEGEEFVLDYVEHPGHGCRSCHYHR

RNTGDPDIMCSLCYMRTCGMFVYSPVSEPEPEPEPEPEPARPTRRPKMAP

AILRRPTSPVSRECNSSTDSCDSGPSNTPPEIHPVVPLCPIKPVAVRVGG

RRQAVECIEDLLNEPGQPLDLSCKRPRP

Ad5 E1A Y47H C124G
(SEQ ID NO: 36)
MRHIICHGGVITEEMAASLLDQLIEEVLADNLPPPSHFEPPTLHELHDLD

VTAPEDPNEEAVSQIFPDSVMLAVQEGIDLLTFPPAPGSPEPPHLSRQPE

QPEQRALGPVSMPNLVPEVIDLTGHEAGFPPSDDEDEEGEEFVLDYVEHP

GHGCRSCHYHRRNTGDPDIMCSLCYMRTCGMFVYSPVSEPEPEPEPEPEP

ARPTRRPKMAPAILRRPTSPVSRECNSSTDSCDSGPSNTPPEIHPVVPLC

PIKPVAVRVGGRRQAVECIEDLLNEPGQPLDLSCKRPRP

Ad5 E1A Δ2-11 Y47H C124G
(SEQ ID NO: 37)
MEEMAASLLDQLIEEVLADNLPPPSHFEPPTLHELHDLDVTAPEDPNEEA

VSQIFPDSVMLAVQEGIDLLTFPPAPGSPEPPHLSRQPEQPEQRALGPVS

MPNLVPEVIDLTGHEAGFPPSDDEDEEGEEFVLDYVEHPGHGCRSCHYHR

RNTGDPDIMCSLCYMRTCGMFVYSPVSEPEPEPEPEPEPARPTRRPKMAP

AILRRPTSPVSRECNSSTDSCDSGPSNTPPEIHPVVPLCPIKPVAVRVGG

RRQAVECIEDLLNEPGQPLDLSCKRPRP

Ad5 E4orf1 and E4orf6/7

The PDZ-binding motif at the C-terminus of Ad5 E4orf1 (residues 126-128 of SEQ ID NO: 38) is underlined.

Ad5 E4orf1
(SEQ ID NO: 38)
MAAAVEALYVVLEREGAILPRQEGFSGVYVFFSPINFVIPPMGAVMLSLR

LRVCIPPGYFGRFLALTDVNQPDVFTESYIMTPDMTEELSVVLFNHGDQF

FYGHAGMAVVRLMLIRVVFPVVRQASNV

Ad5 E4orf1 ΔPDZb
(SEQ ID NO: 39)
MAAAVEALYVVLEREGAILPRQEGFSGVYVFFSPINFVIPPMGAVMLSLR

LRVCIPPGYFGRFLALTDVNQPDVFTESYIMTPDMTEELSVVLFNHGDQF

FYGHAGMAVVRLMLIRVVFPVVRQA

Ad5 E4orf6/7
(SEQ ID NO: 40)
MTTSGVPFGMTLRPTRSRLSRRTPYSRDRLPPFETETRATILEDHPLLPE

CNTLTMHNAWTSPSPPVKQPQVGQQPVAQQLDSDMNLSELPGEFINITDE

RLARQETVWNITPKNMSVTHDMMLFKASRGERTVYSVCWEGGGRLNTRVL

Recombinant adenoviruses having a genome encoding a modified E4orf6/7 protein that eliminates or impairs binding to E2F, or deletes or impairs the nuclear localization signal are contemplated herein. In some examples, the modified E4orf6/7 protein comprises a deletion of about 60, about 50, about 40, about 30, about 20 or about 10 amino acids at the C-terminus to delete/impair the E2F binding site. In other examples, the E4orf6/7 protein comprises a deletion, a frameshift or an insertion in the C-terminal 10 amino acids, or a deletion of 33 amino acids from the C-terminal third of the protein that abolish or impair E2F binding. In some embodiments, the mutations comprise amino acids 81-91 that impair the E2F interactions.

In other examples, the modified E4orf6/7 protein comprises an N-terminal deletion of 58 amino acids to abolish the nuclear localization sequence, which is required for efficient translocation of E2F4. There are eight arginine residues located between amino acids 13 and 38 of Ad2 and Ad5 E4orf6/7, which equates with greater than 25% arginine content for this region. The overall clustering of arginine residues in the N-terminus of E4orf6 is maintained in other adenovirus serotypes. Mutations that substitute arginine residues 16, 18, 21, 22, 27 and/or 29 for alanine (or other appropriate residues to abolish nuclear localization through this region) are contemplated.

In other examples, the modified E4orf6/7 protein comprises one or more modifications to eliminate or inhibit the ability of E4orf6/7 to induce E2F double site occupancy. Specific, non-limiting examples include a mutation of F125 to proline, alanine, lysine, aspartic acid or glutamic acid; or a mutation of D121 to P, A, K, R, G, F.

Other E4orf6/7 mutations include: T133A, R101A, Q105P or any mutations that prevent E2F single site occupancy; M84N or P, G, K, L, H and/or E93A, or K, P, G, R, L, M that disrupt an alpha helix and prevent E2F binding. Other contemplated mutations include T133Q or A, K, G, P, L, H; G141L, P, K H, F, A; or V149N, K, P, H, G, E, D.

Fiber Sequences

In the recombinant fiber sequences below, the FRB sequence is underlined. The mutation present in FRB* is shown in bold.

Ad5 fiber
(SEQ ID NO: 41)
MKRARPSEDTFNPVYPYDTETGPPTVPFLTPPFVSPNGFQESPPGVLSLR

LSEPLVTSNGMLALKMGNGLSLDEAGNLTSQNVTTVSPPLKKTKSNINLE

ISAPLTVTSEALTVAAAAPLMVAGNTLTMQSQAPLTVHDSKLSIATQGPL

TVSEGKLALQTSGPLTTTDSSTLTITASPPLTTATGSLGIDLKEPIYTQN

GKLGLKYGAPLHVTDDLNTLTVATGPGVTINNTSLQTKVTGALGFDSQGN

-continued

MQLNVAGGLRIDSQNRRLILDVSYPFDAQNQLNLRLGQGPLFINSAHNLD
INYNKGLYLFTASNNSKKLEVNLSTAKGLMFDATAIAINAGDGLEFGSPN
APNTNPLKTKIGHGLEFDSNKAMVPKLGTGLSFDSTGAITVGNKNNDKLT
LWTTPAPSPNCRLNAEKDAKLTLVLTKCGSQILATVSVLAVKGSLAPISG
TVQSAHLIIRFDENGVLLNNSFLDPEYWNFRNGDLTEGTAYTNAVGFMPN
LSAYPKSHGKTAKSNIVSQVYLNGDKTKPVTLTITLNGTQETGDTTPSAY
SMSFSWDWSGHNYINEIFATSSYTFSYIAQE

Ad5 FRB-fiber
(SEQ ID NO: 42)
MKRARPSEDTFNPVYPYDTETGPPTVPFLTPPFVSPNGFQESPPGVLSLR
LSEPLVTSNGMLALKMGNGLSLDEAGNLTSQNVTTVSPPLKKTKSNINLE
ISAPLTVTSEALTVAAAAPLMVAGNTLTMQSQAPLTVHDSKLSIATQGPL
TVSEGKLALQTSGPLTTTDSSTLTITASPPLTTATGSLGIDLKEPIYTQN
GKLGLKYGAPLHVTDDLNTLTVATGPGVTINNTSLQTKVTGALGFDSQGN
MQLNVAGGLRIDSQNRRLILDVSYPFDAQNQLNLRLGQGPLFINSAHNLD
INYNKGLYLFTASNNSKKLEVNLSTAKGLMFDATAIAINAGDGLEFGSPN
APNTNPLKTKIGHGLEFDSNKAMVPKLGTGLSFDSTGAITVGNKNNDKLT
LWTTPAPSPNCRLNAEKDAKLTLVLTKCGSQILATVSVLAVKGSLAPISG
TVQSAHLIIRFDENGVLLNNSFLDPEYWNFRNGDLTEGTAYTNAVGFMPN
LSAYPKSHGKTAKSNIVSQVYLNGDKTKPVTLTITLNGTQETGDT<u>TEMWH</u>
<u>EGLEEASRLYFGERNVKGMFEVLEPLHAMMERGPQTLKETSFNQAYGRDL</u>
<u>MEAQEWCRKYMKSGNVKDLTQAWDLYYHVFRRISKQ</u>PSAYSMSFSWDWSG
HNYINEIFATSSYTFSYIAQE Ad5 FRB*-fiber
(SEQ ID NO: 43)
MKRARPSEDTFNPVYPYDTETGPPTVPFLTPPFVSPNGFQESPPGVLSLR
LSEPLVTSNGMLALKMGNGLSLDEAGNLTSQNVTTVSPPLKKTKSNINLE
ISAPLTVTSEALTVAAAAPLMVAGNTLTMQSQAPLTVHDSKLSIATQGPL
TVSEGKLALQTSGPLTTTDSSTLTITASPPLTTATGSLGIDLKEPIYTQN
GKLGLKYGAPLHVTDDLNTLTVATGPGVTINNTSLQTKVTGALGFDSQGN
MQLNVAGGLRIDSQNRRLILDVSYPFDAQNQLNLRLGQGPLFINSAHNLD
INYNKGLYLFTASNNSKKLEVNLSTAKGLMFDATAIAINAGDGLEFGSPN
APNTNPLKTKIGHGLEFDSNKAMVPKLGTGLSFDSTGAITVGNKNNDKLT
LWTTPAPSPNCRLNAEKDAKLTLVLTKCGSQILATVSVLAVKGSLAPISG
TVQSAHLIIRFDENGVLLNNSFLDPEYWNFRNGDLTEGTAYTNAVGFMPN
LSAYPKSHGKTAKSNIVSQVYLNGDKTKPVTLTITLNGTQETGDT<u>TEMWH</u>
<u>EGLEEASRLYFGERNVKGMFEVLEPLHAMMERGPQTLKETSFNQAYGRDL</u>
<u>MEAQEWCRKYMKSGNVKDLL<b>Q</b>AWDLYYHVFRRISKQ</u>PSAYSMSFSWDWSG
HNYINEIFATSSYTFSYIAQE Targeting Ligand Sequences EGFRVHH-GS-FKBP
MAVQLVESGGGSVQAGGSLRLTCAASGRTSRSYGMGWFRQAPGKEREFVS
GISWRGDSTGYADSVKGRFTISRDNAKNTVDLQMNSLRPEDTAIYYCAAA
AGSTWYGTLYEYDYWGQGTQVTVSSGSGSGSTGVQVETISPDGRTFPKR
<u>GQTCVVHYTGMLEDGKKFDSSRDRNKPFKFMLGKQEVIRGWEEGVAQMSV</u>
<u>GQRAKLTISPDYAYGATGHPGIIPPHATLVFDVELLKL</u> (SEQ ID NO:
44; FKBP12 sequence is underlined)

Hexon Sequences

Ad5 hexon
MATPSMMPQWSYMHISGQDASEYLSPGLVQFARATETYFSLNNKFRNPTV
APTHDVTTDRSQRLTLRFIPVDREDTAYSYKARFTLAVGDNRVLDMASTY
FDIRGVLDRGPTFKPYSGTAYNALAPKGAPNPCEWDEAATALEINLEEED
DDNEDEVDEQAEQQKTHVFGQAPYSGINITKEGIQIGVEGQTPKYADKTF
QPEPQIGESQWYETEINHAAGRVLKKTTPMKPCYGSYAKPTNENGGQGIL
VKQQNGKLESQVEMQFFSTTEATAGNGDNLTPKVVLYSEDVDIETPDTHI
SYMPTIKEGNSRELMGQQSMPNRPNYIAFRDNFIGLMYYNSTGNMGVLAG
QASQLNAVVDLQDRNTELSYQLLLDSIGDRTRYFSMWNQAVDSYDPDVRI
IENHGTEDELPNYCFPLGGVINTETLTKVKPKTGQENGWEKDATEFSDKN
<u>E</u>IRVGNNFAMEINLNANLWRNFLYSNIALYLPDKLKYSPSNVKISDNPNT
YDYMNKRVVAPGLVDCYINLGARWSLDYMDNVNPFNHHRNAGLRYRSMLL
GNGRYVPFHIQVPQKFFAIKNLLLLPGSYTYEWNFRKDVNMVLQSSLGND
LRVDGASIKFDSICLYATFFPMAHNTASTLEAMLRNDTNDQSFNDYLSAA
NMLYPIPANATNVPISIPSRNWAAFRGWAFTRLKTKETPSLGSGYDPYYT
YSGSIPYLDGTFYLNHTFKKVAITFDSSVSWPGNDRLLTPNEFEIKRSVD
GEGYNVAQCNMTKDWFLVQMLANYNIGYQGFYIPESYKDRMYSFFRNFQP
MSRQVVDDTKYKDYQQVGILHQHNNSGFVGYLAPTMREGQAYPANFPYPL
IGKTAVDSITQKKFLCDRTLWRIPFSSNFMSMGALTDLGQNLLYANSAHA
LDMTFEVDPMDEPTLLYVLFEVFDVVRVHRPHRGVIETVYLRTPFSAGNA
TT (SEQ ID NO: 45)

Ad5 hexon E451Q
MATPSMMPQWSYMHISGQDASEYLSPGLVQFARATETYFSLNNKFRNPTV
APTHDVTTDRSQRLTLRFIPVDREDTAYSYKARFTLAVGDNRVLDMASTY
FDIRGVLDRGPTFKPYSGTAYNALAPKGAPNPCEWDEAATALEINLEEED
DDNEDEVDEQAEQQKTHVFGQAPYSGINITKEGIQIGVEGQTPKYADKTF
QPEPQIGESQWYETEINHAAGRVLKKTTPMKPCYGSYAKPTNENGGQGIL
VKQQNGKLESQVEMQFFSTTEATAGNGDNLTPKVVLYSEDVDIETPDTHI
SYMPTIKEGNSRELMGQQSMPNRPNYIAFRDNFIGLMYYNSTGNMGVLAG
QASQLNAVVDLQDRNTELSYQLLLDSIGDRTRYFSMWNQAVDSYDPDVRI
IENHGTEDELPNYCFPLGGVINTETLTKVKPKTGQENGWEKDATEFSDKN
<u>Q</u>IRVGNNFAMEINLNANLWRNFLYSNIALYLPDKLKYSPSNVKISDNPNT -continued

```
YDYMNKRVVAPGLVDCYINLGARWSLDYMDNVNPFNHHRNAGLRYRSMLL

GNGRYVPFHIQVPQKFFAIKNLLLLPGSYTYEWNFRKDVNMVLQSSLGND

LRVDGASIKFDSICLYATFFPMAHNTASTLEAMLRNDTNDQSFNDYLSAA

NMLYPIPANATNVPISIPSRNWAAFRGWAFTRLKTKETPSLGSGYDPYYT

YSGSIPYLDGTFYLNHTFKKVAITFDSSVSWPGNDRLLTPNEFEIKRSVD

GEGYNVAQCNMTKDWFLVQMLANYNIGYQGFYIPESYKDRMYSFFRNFQP

MSRQVVDDTKYKDYQQVGILHQHNNSGFVGYLAPTMREGQAYPANFPYPL

IGKTAVDSITQKKFLCDRTLWRIPFSSNFMSMGALTDLGQNLLYANSAHA

LDMTFEVDPMDEPTLLYVLFEVFDVVRVHRPHRGVIETVYLRTPFSAGNA

TT (SEQ ID NO: 46; the E451Q substitution is shown in bold underline)
```

E3 Sequences

```
Ad5 E3-RIDα
                                        (SEQ ID NO: 65)
MIPRVFILLTLVALFCACSTLAAVSHIEVDCIPAFTVYLLYGFVTLTLIC

SLITVVIAFIQCIDWVCVRFAYLRHHPQYRDRTIAELLRIL

Ad5 E3-RIDβ
                                        (SEQ ID NO: 66)
MKFTVTFLLIICTLSAFCSPTSKPQRHISCRFTRIWNIPSCYNEKSDLSE

AWLYAIISVMVFCSTILALAIYPYLDIGWNAIDAMNHPTFPAPAMLPLQQ

VVAGGFVPANQPRPPSPTPTEISYFNLTGGDD

Ad5 E3-14.7K
                                        (SEQ ID NO: 67)
MTDTLDLEMDGIITEQRLLERRRAAAEQQRMNQELQDMVNLHQCKRGIFC

LVKQAKVTYDSNTTGHRLSYKLPTKRQKLVVMVGEKPITITQHSVETEGC

IHSPCQGPEDLCTLIKTLCGLKDLIPFN
```

V. Pharmaceutical Compositions

Provided herein are compositions comprising a recombinant adenovirus (or one or more nucleic acids or vectors encoding the recombinant adenovirus). The compositions are, optionally, suitable for formulation and administration in vitro or in vivo. Optionally, the compositions comprise one or more of the provided agents and a pharmaceutically acceptable carrier. Suitable carriers and their formulations are described in *Remington: The Science and Practice of Pharmacy, 22nd Edition*, Loyd V. Allen et al., editors, Pharmaceutical Press (2012). Pharmaceutically acceptable carriers include materials that are not biologically or otherwise undesirable, i.e., the material is administered to a subject without causing undesirable biological effects or interacting in a deleterious manner with the other components of the pharmaceutical composition in which it is contained. If administered to a subject, the carrier is optionally selected to minimize degradation of the active ingredient and to minimize adverse side effects in the subject.

The recombinant viruses (or one or more nucleic acids or vectors encoding the recombinant adenovirus) are administered in accord with known methods, such as intravenous administration, e.g., as a bolus or by continuous infusion over a period of time, by intramuscular, intraperitoneal, intracerobrospinal, subcutaneous, intra-articular, intrasynovial, intrathecal, oral, topical, intratumoral or inhalation routes. The administration may be local or systemic. The compositions can be administered via any of several routes of administration, including topically, orally, parenterally, intravenously, intra-articularly, intraperitoneally, intramuscularly, subcutaneously, intracavity, transdermally, intrahepatically, intracranially, nebulization/inhalation, or by instalation via bronchoscopy. Thus, the compositions are administered in a number of ways depending on whether local or systemic treatment is desired, and on the area to be treated.

In some embodiments, the compositions for administration will include a recombinant adenovirus (or recombinant genome) as described herein dissolved in a pharmaceutically acceptable carrier, preferably an aqueous carrier. A variety of aqueous carriers can be used, e.g., buffered saline and the like. These solutions are sterile and generally free of undesirable matter. These compositions may be sterilized by conventional, well known sterilization techniques. The compositions may contain pharmaceutically acceptable auxiliary substances as required to approximate physiological conditions such as pH adjusting and buffering agents, toxicity adjusting agents and the like, for example, sodium acetate, sodium chloride, potassium chloride, calcium chloride, sodium lactate and the like. The concentration of active agent in these formulations can vary widely, and will be selected primarily based on fluid volumes, viscosities, body weight and the like in accordance with the particular mode of administration selected and the subject's needs.

Pharmaceutical formulations, particularly, of the recombinant viruses can be prepared by mixing the recombinant adenovirus (or one or more nucleic acids encoding the recombinant adenovirus) having the desired degree of purity with optional pharmaceutically acceptable carriers, excipients or stabilizers. Such formulations can be lyophilized formulations or aqueous solutions.

Acceptable carriers, excipients, or stabilizers are nontoxic to recipients at the dosages and concentrations used. Acceptable carriers, excipients or stabilizers can be acetate, phosphate, citrate, and other organic acids; antioxidants (e.g., ascorbic acid) preservatives, low molecular weight polypeptides; proteins, such as serum albumin or gelatin, or hydrophilic polymers such as polyvinylpyllolidone; and amino acids, monosaccharides, disaccharides, and other carbohydrates including glucose, mannose, or dextrins; chelating agents; and ionic and non-ionic surfactants (e.g., polysorbate); salt-forming counter-ions such as sodium; metal complexes (e.g. Zn-protein complexes); and/or non-ionic surfactants. The recombinant adenovirus (or one or more nucleic acids encoding the recombinant adenovirus) can be formulated at any appropriate concentration of infectious units.

Formulations suitable for oral administration can consist of (a) liquid solutions, such as an effective amount of the recombinant adenovirus suspended in diluents, such as water, saline or PEG 400; (b) capsules, sachets or tablets, each containing a predetermined amount of the active ingredient, as liquids, solids, granules or gelatin; (c) suspensions in an appropriate liquid; and (d) suitable emulsions. Tablet forms can include one or more of lactose, sucrose, mannitol, sorbitol, calcium phosphates, corn starch, potato starch, microcrystalline cellulose, gelatin, colloidal silicon dioxide, talc, magnesium stearate, stearic acid, and other excipients, colorants, fillers, binders, diluents, buffering agents, moistening agents, preservatives, flavoring agents, dyes, disintegrating agents, and pharmaceutically compatible carriers. Lozenge forms can comprise the active ingredient in a flavor, e.g., sucrose, as well as pastilles comprising the active ingredient in an inert base, such as gelatin and glycerin or sucrose and acacia emulsions, gels, and the like containing, in addition to the active ingredient, carriers known in the art.

The recombinant adenovirus (or one or more nucleic acids encoding the recombinant adenovirus), alone or in combination with other suitable components, can be made into aerosol formulations (i.e., they can be "nebulized") to be administered via inhalation. Aerosol formulations can be placed into pressurized acceptable propellants, such as dichlorodifluoromethane, propane, nitrogen, and the like.

Formulations suitable for parenteral administration, such as, for example, by intraarticular (in the joints), intravenous, intramuscular, intratumoral, intradermal, intraperitoneal, and subcutaneous routes, include aqueous and non-aqueous, isotonic sterile injection solutions, which can contain antioxidants, buffers, bacteriostats, and solutes that render the formulation isotonic with the blood of the intended recipient, and aqueous and non-aqueous sterile suspensions that can include suspending agents, solubilizers, thickening agents, stabilizers, and preservatives. In the provided methods, compositions can be administered, for example, by intravenous infusion, orally, topically, intraperitoneally, intravesically intratumorally, or intrathecally. Parenteral administration, intratumoral administration, and intravenous administration are the preferred methods of administration. The formulations of compounds can be presented in unit-dose or multi-dose sealed containers, such as ampules and vials.

Injection solutions and suspensions can be prepared from sterile powders, granules, and tablets of the kind previously described. Cells transduced or infected by adenovirus or transfected with nucleic acids for ex vivo therapy can also be administered intravenously or parenterally as described above.

The pharmaceutical preparation is preferably in unit dosage form. In such form the preparation is subdivided into unit doses containing appropriate quantities of the active component. Thus, the pharmaceutical compositions can be administered in a variety of unit dosage forms depending upon the method of administration. For example, unit dosage forms suitable for oral administration include, but are not limited to, powder, tablets, pills, capsules and lozenges.

In some embodiments, the compositions include at least two different recombinant adenoviruses, such as recombinant adenoviruses that bind different cellular receptors. For example, at least one of the recombinant adenoviruses in the composition could express a chimeric fiber protein. Alternatively, the recombinant adenoviruses could target different cellular receptors by encoding targeting ligand-FKBP fusion proteins in which the targeting ligand different between the viruses in the composition. In some examples, the composition includes two, three, four, five or six different recombinant adenoviruses.

VI. Methods of Treatment

The recombinant adenoviruses compositions disclosed herein can be administered for therapeutic or prophylactic treatment. In particular, provided are methods of inhibiting tumor cell viability in a subject, inhibiting tumor progression in a subject, reducing tumor volume in a subject and/or treating cancer in a subject. The methods include administering a therapeutically effective amount of a recombinant adenovirus (or composition thereof) to the subject. As described throughout, the adenovirus or pharmaceutical composition is administered in any number of ways including, but not limited to, intravenously, intravascularly, intrathecally, intramuscularly, subcutaneously, intraperitoneally, or orally. Optionally, the method further comprising administering to the subject one or more additional therapeutic agents. In some embodiments, the therapeutic agent is a chemotherapeutic agent. In other embodiments, the therapeutic agent is an immune modulator. In yet other embodiments, the therapeutic agent is a CDK inhibitor, such as a CDK 4 inhibitor.

In some embodiments, the cancer or tumor is a lung, prostate, colorectal, breast, thyroid, renal, or liver cancer or tumor, or is a type of leukemia. In some cases, the cancer is metastatic. In some examples, the tumor is a tumor of the mammary, pituitary, thyroid, or prostate gland; a tumor of the brain, liver, meninges, bone, ovary, uterus, or cervix; monocytic or myelogenous leukemia; adenocarcinoma, adenoma, astrocytoma, bladder tumor, brain tumor, Burkitt's lymphoma, breast carcinoma, cervical carcinoma, colon carcinoma, kidney carcinoma, liver carcinoma, lung carcinoma, ovarian carcinoma, pancreatic carcinoma, prostate carcinoma, rectal carcinoma, skin carcinoma, stomach carcinoma, testis carcinoma, thyroid carcinoma, chondrosarcoma, choriocarcinoma, fibroma, fibrosarcoma, glioblastoma, glioma, hepatoma, histiocytoma, leiomyoblastoma, leiomyosarcoma, lymphoma, liposarcoma cell, mammary tumor, medulloblastoma, myeloma, plasmacytoma, neuroblastoma, neuroglioma, osteogenic sarcoma, pancreatic tumor, pituitary tumor, retinoblastoma, rhabdomyosarcoma, sarcoma, testicular tumor, thymoma, or Wilms tumor. Tumors include both primary and metastatic solid tumors, including carcinomas of breast, colon, rectum, lung, oropharynx, hypopharynx, esophagus, stomach, pancreas, liver, gallbladder and bile ducts, small intestine, urinary tract (including kidney, bladder and urothelium), female genital tract, (including cervix, uterus, and ovaries as well as choriocarcinoma and gestational trophoblastic disease), male genital tract (including prostate, seminal vesicles, testes and germ cell tumors), endocrine glands (including the thyroid, adrenal, and pituitary glands), and skin, as well as hemangiomas, melanomas, sarcomas (including those arising from bone and soft tissues as well as Kaposi's sarcoma) and tumors of the brain, nerves, eyes, and meninges (including astrocytomas, gliomas, glioblastomas, retinoblastomas, neuromas, neuroblastomas, Schwannomas, and meningiomas). In some aspects, solid tumors may be treated that arise from hematopoietic malignancies such as leukemias (i.e. chloromas, plasmacytomas and the plaques and tumors of mycosis fungoides and cutaneous T-cell lymphoma/leukemia) as well as in the treatment of lymphomas (both Hodgkin's and non-Hodgkin's lymphomas). In addition, treatments may be useful in the prevention of metastases from the tumors described herein.

In therapeutic applications, recombinant adenoviruses or compositions thereof are administered to a subject in a therapeutically effective amount or dose. Amounts effective for this use will depend upon the severity of the disease and the general state of the patient's health. Single or multiple administrations of the compositions may be administered depending on the dosage and frequency as required and tolerated by the patient. A "patient" or "subject" includes both humans and other animals, particularly mammals. Thus, the methods are applicable to both human therapy and veterinary applications.

An effective amount of an adenovirus having a modified sequence is determined on an individual basis and is based, at least in part, on the particular recombinant adenovirus used; the individual's size, age, gender; and the size and other characteristics of the proliferating cells. For example, for treatment of a human, at least $10^3$ plaque forming units (PFU) of a recombinant virus is used, such as at least $10^4$, at least $10^5$, at least $10^6$, at least $10^7$, at least $10^8$, at least $10^9$, at least $10^{10}$, at least $10^{11}$, or at least $10^{12}$ PFU, for example approximately $10^3$ to $10^{12}$ PFU of a recombinant virus is used, depending on the type, size and number of proliferating cells or neoplasms present. The effective amount can be from about 1.0 pfu/kg body weight to about $10^{15}$ pfu/kg body weight (e.g., from about $10^2$ pfu/kg body weight to about $10^{13}$ pfu/kg body weight). A recombinant adenovirus is administered in a single dose or in multiple doses (e.g., two, three, four, six, or more doses). Multiple doses can be administered concurrently or consecutively (e.g., over a period of days or weeks).

In some embodiments, the provided methods include administering to the subject one or more additional therapeutic agents, such as an anti-cancer agent or other therapeutic treatment (such as surgical resection of the tumor). Exemplary anti-cancer agents include, but are not limited to, chemotherapeutic agents, such as, for example, mitotic inhibitors, alkylating agents, antimetabolites, intercalating antibiotics, growth factor inhibitors, cell cycle inhibitors, enzymes, topoisomerase inhibitors, anti-survival agents, biological response modifiers, anti-hormones (e.g. anti-androgens), anti-angiogenesis agents and CDK inhibitors. Other anti-cancer treatments include radiation therapy and other antibodies that specifically target cancer cells.

Non-limiting examples of alkylating agents include nitrogen mustards (such as mechlorethamine, cyclophosphamide, melphalan, uracil mustard or chlorambucil), alkyl sulfonates (such as busulfan), nitrosoureas (such as carmustine, lomustine, semustine, streptozocin, or dacarbazine).

Non-limiting examples of antimetabolites include folic acid analogs (such as methotrexate), pyrimidine analogs (such as 5-FU or cytarabine), and purine analogs, such as mercaptopurine or thioguanine.

Non-limiting examples of natural products include *vinca* alkaloids (such as vinblastine, vincristine, or vindesine), epipodophyllotoxins (such as etoposide or teniposide), antibiotics (such as dactinomycin, daunorubicin, doxorubicin, bleomycin, plicamycin, or mitomycin C), and enzymes (such as L-asparaginase).

Non-limiting examples of miscellaneous agents include platinum coordination complexes (such as cis-diamine-dichloroplatinum II also known as cisplatin), substituted ureas (such as hydroxyurea), methyl hydrazine derivatives (such as procarbazine), and adrenocrotical suppressants (such as mitotane and aminoglutethimide).

Non-limiting examples of hormones and antagonists include adrenocorticosteroids (such as prednisone), progestins (such as hydroxyprogesterone caproate, medroxyprogesterone acetate, and magestrol acetate), estrogens (such as diethylstilbestrol and ethinyl estradiol), antiestrogens (such as tamoxifen), and androgens (such as testerone proprionate and fluoxymesterone).

Examples of the most commonly used chemotherapy drugs include Adriamycin, Alkeran, Ara-C, BiCNU, Busulfan, CCNU, Carboplatinum, Cisplatinum, Cytoxan, Daunorubicin, DTIC, 5-FU, Fludarabine, Hydrea, Idarubicin, Ifosfamide, Methotrexate, Mithramycin, Mitomycin, Mitoxantrone, Nitrogen Mustard, Taxol (or other taxanes, such as docetaxel), Velban, Vincristine, VP-16, while some more newer drugs include Gemcitabine (Gemzar), Herceptin, Irinotecan (Camptosar, CPT-11), Leustatin, Navelbine, Rituxan STI-571, Taxotere, Topotecan (Hycamtin), Xeloda (Capecitabine), Zevelin and calcitriol.

Non-limiting examples of immunomodulators that can be used include AS-101 (Wyeth-Ayerst Labs.), bropirimine (Upjohn), gamma interferon (Genentech), GM-CSF (granulocyte macrophage colony stimulating factor; Genetics Institute), IL-2 (Cetus or Hoffman-LaRoche), human immune globulin (Cutter Biological), IMREG (from Imreg of New Orleans, La.), SK&F 106528, and TNF (tumor necrosis factor; Genentech).

Another common treatment for some types of cancer is surgical treatment, for example surgical resection of the cancer or a portion of it. Another example of a treatment is radiotherapy, for example administration of radioactive material or energy (such as external beam therapy) to the tumor site to help eradicate the tumor or shrink it prior to surgical resection.

CDK (Cyclin-dependent kinase) inhibitors are agents that inhibit the function of CDKs. Non-limiting examples of CDK inhibitors for use in the provided methods include AG-024322, AT7519, AZD5438, flavopiridol, indisulam, P1446A-05, PD-0332991, and P276-00 (see e.g., Lapenna et al., *Nature Reviews,* 8:547-566, 2009). Other CDK inhibitors include LY2835219, Palbociclib, LEE011 (Novartis), pan-CDK inhibitor AT7519, seliciclib, CYC065, butyrolactone I, hymenialdisine, SU9516, CINK4, PD0183812 or fascaplysin.

In some examples, the CDK inhibitor is a broad-range inhibitor (such as flavopiridol, olomoucine, roscovitine, kenpaullone, SNS-032, AT7519, AG-024322, (S)-Roscovitine or R547). In other examples, the CDK inhibitor is a specific inhibitor (such as fascaplysin, ryuvidine, purvalanol A, NU2058, BML-259, SU 9516, PD0332991 or P-276-00).

The choice of agent and dosage can be determined readily by one of skill in the art based on the given disease being treated. Combinations of agents or compositions can be administered either concomitantly (e.g., as a mixture), separately but simultaneously (e.g., via separate intravenous lines) or sequentially (e.g., one agent is administered first followed by administration of the second agent). Thus, the term combination is used to refer to concomitant, simultaneous or sequential administration of two or more agents or compositions.

According to the methods disclosed herein, the subject is administered an effective amount of one or more of the agents provided herein. The effective amount is defined as any amount necessary to produce a desired physiologic response (e.g., killing of a cancer cell). Therapeutic agents are typically administered at the initial dosage of about 0.001 mg/kg to about 1000 mg/kg daily. A dose range of about 0.01 mg/kg to about 500 mg/kg, or about 0.1 mg/kg to about 200 mg/kg, or about 1 mg/kg to about 100 mg/kg, or about 10 mg/kg to about 50 mg/kg, can be used. The dosages, however, may be varied depending upon the requirements of the subject, the severity of the condition being treated, and the compound being employed. For example, dosages can be empirically determined considering the type and stage of cancer diagnosed in a particular subject. The dose administered to a subject, in the context of the provided methods should be sufficient to affect a beneficial therapeutic response in the patient over time. Determination of the proper dosage for a particular situation is within the skill of the practitioner. Thus, effective amounts and schedules for administering the agent may be determined empirically by one skilled in the art. The dosage should not be so large as to cause substantial adverse side effects, such as unwanted cross-reactions, anaphylactic reactions, and the like. The dosage can be adjusted by the individual physician in the event of any contraindications.

Guidance can be found in the literature for appropriate dosages for given classes of pharmaceutical products.

Provided herein is a method of inhibiting tumor cell viability by contacting the tumor cell with a recombinant adenovirus, or composition thereof, as disclosed herein. In some embodiments, the method is an in vitro method. In other embodiments, the method is an in vivo method and contacting the tumor cell comprises administering the recombinant adenovirus or composition to a subject with a tumor.

Further provided is a method of inhibiting tumor progression or reducing tumor volume in a subject, by administering to the subject a therapeutically effective amount of a recombinant adenovirus (or composition thereof) disclosed herein.

Also provided is a method of treating cancer in a subject, by administering to the subject a therapeutically effective amount of a recombinant adenovirus (or composition thereof) disclosed herein.

Further provided is a method of reducing tumor volume in a subject by administering to the subject (i) a therapeutically effective amount of a rapamycin/rapalog inducible retargeted recombinant adenovirus; and (ii) rapamycin or an analog thereof. Also provided is a method of treating cancer in a subject by administering to the subject (i) a therapeutically effective amount of a rapamycin/rapalog inducible retargeted recombinant adenovirus; and (ii) rapamycin or an analog thereof.

In some embodiments, the rapamycin or rapamycin analog is administered at a dose of about 0.1 mg/kg to about 2.0 mg/kg. In other embodiments, the rapamycin is administered at a dose of about 0.1 mg/kg to about 0.5 mg/kg. In some examples, the rapamycin is administered at a dose of about 0.1 mg/kg, 0.5 mg/kg, 1.0 mg/kg, 1.5 mg/kg or 2.0 mg/kg.

In some embodiments, the rapamycin or rapamycin analog is administered at a dose of about 1 to 15 mg/m$^2$, such as about 3 to 12 mg/m$^2$, or about 5 to 10 mg/m$^2$. In some examples, the rapamycin or rapamycin analog is administered at a dose of about 1, about 2, about 3, about 4, about 5, about 6, about 7, about 8, about 9, about 10, about 11, about 12, about 13, about 14 or about 15 mg/m$^2$.

In some embodiments, the rapamycin or rapamycin analog is administered at a dose that does not cause substantial immunosuppression in the subject. Administration of rapamycin or an analog thereof "at a dose that does not cause substantial immunosuppression" refers to the dose that is less than or equivalent to the effective concentration 25 ($EC_{25}$) for a particular subject. One of skill in the art is capable of determining a dose of rapamycin or an analog thereof that does not cause substantial immunosuppression in a subject (see, e.g., Schubert et al., Am J Transplant 4:767-773, 2004). In some examples, the $EC_{25}$ is about 1 ng/mL to about 15 ng/mL, such as about 3 ng/mL to about 10 ng/mL. In non-limiting examples, the $EC_{25}$ is about 1 ng/mL, about 2 ng/mL, about 3 ng/mL, about 4 ng/mL, about 5 ng/mL, about 6 ng/mL, about 7 ng/mL, about 8 ng/mL, about 9 ng/mL, about 10 ng/mL, about 11 ng/mL, about 12 ng/mL, about 13 ng/mL, about 14 ng/mL or about 15 ng/mL.

In some embodiments, the genome of the retargeted adenovirus encodes a targeting ligand fused to an FKBP, and an adenovirus fiber protein fused to a wild-type FKBP-rapamycin binding (FRB) protein or a mutant FRB protein comprising a T2098L substitution. In some examples, the targeting ligand is a single domain antibody, such as a single domain antibody specific for EGFR. In particular non-limiting examples, the genome of the recombinant adenovirus comprises the nucleotide sequence of AdSyn-CO335 (SEQ ID NO: 30), AdSyn-CO335B-K (SEQ ID NO: 92) or AdSyn-CO335B-TK (SEQ ID NO: 97).

In some embodiments of the methods, the tumor or cancer is characterized by deregulation of the E2F pathway. In some embodiments, the tumor or cancer is a lung, prostate, colorectal, breast, thyroid, renal or liver tumor or cancer, or a leukemia.

In some embodiments, the methods further include treating the subject with an additional therapeutic agent, such as a chemotherapeutic agent, an immune modulator or a CDK inhibitor, for example a CDK4 inhibitor.

The following examples are provided to illustrate certain particular features and/or embodiments. These examples should not be construed to limit the disclosure to the particular features or embodiments described.

EXAMPLES

Example 1: Oncolytic Adenoviruses that Selectively Replicate in Tumor Cells with Deregulated E2F Activity Modified adenoviruses were made with the below referenced components, according to the methods described in PCT Publication No. WO 2012/024351, which is incorporated herein by reference. Gateway pDONR vectors were employed. From human Ad5 DNA, the E1 module was obtained by PCR and inserted into the vector pDONR P1P4 using SLIC. The pDONR P1P4 vector backbone including attL1 and attL4 recombination sites was amplified using PCR and combined with the Ad5 E1 module by SLIC. The E3 module was obtained by PCR to generate a product flanked by attB5 and attB3r recombination sites. The product was inserted into the pDONR P5P3r vector by gateway BP reaction. The E4 module was obtained by PCR to generate a product flanked by attB3 and attB2 recombination sites. The product was inserted into the pDONR P3P2 vector by gateway BP reaction. The attR5-ccdB-Cm(r)-attR2 fragment from the pDONR P5P2 vector was amplified by PCR and inserted into the Adsembly DEST vector (see "MultiSite Gateway® Pro Plus", Cat #12537-100; and Sone et al., J Biotechnol 136(3-4):113-121, 2008). The Adsembly method is described in PCT Publication No. WO 2012/024351, herein incorporated by reference in its entirety.

The vector backbone for the Adsembly DEST vector is composed of parts from three different sources. The Amp(r) cassette and lacZ gene were amplified from plasmid pUC19. This was combined with the p15A origin of replication, obtained from plasmid pSB3K5-I52002, part of the BioBricksiGEM 2007 parts distribution. The p15A ori, which maintains plasmids at a lower (10-12) copy number is necessary to reduce E1 toxicity. Lastly, in order to create a self-excising virus, the mammalian expression cassette for the enzyme ISceI was PCR amplified from plasmid pAdZ5-CV5-E3+. This cassette was cloned into the vector backbone to create the vector called p15A-SceI. This is the vector used to start genome assembly. The gene modules were all obtained from either DNA purified from wild type Ad5 virus or the plasmid pAd/CMV/V5/DEST (Invitrogen).

Regarding the DEST vector for human Ad5, the E2 and L3 modules were inserted into plasmid p15A-SceI by 3-fragment SLIC. The counterselection marker expressing ccdB and Chlor(r) flanked by attR5 and attR2 sites was obtained by PCR from plasmid pDONR P5P2. The second counterselection marker was obtained by PCR from the vector pDONR P1P4. The two counterselection markers were inserted on the right and left sides of p15A-SceI E2-L4 by SLIC after cutting with unique restriction enzymes engineered to the ends of the E2 and L4 modules to create the DEST vector.

Regarding Amp(r) cassette: plasmid pUC19, the p15Aori: plasmid pSB3K5-I52002 was part of the BioBricksiGEM 2007 parts distribution. Regarding the adenoviral gene modules, the DNA was purified from Ad5 particles or plasmid pAd/CMV/V5/DEST (Invitrogen). The DONR vectors pDONR P1P4, P5P2, P5P3R, P3P2 were obtained from Invitrogen.

All PCR assays were performed using the Phusion enzyme (NEB). PCR assays to obtain the ADENOVIRAL GENE modules from Ad5 were performed with 1×HF buffer, 200 µM each dNTP, 0.5 µM each primer, and 10 ng of template. For the E2-L2 module, 3% DMSO was also added. Template was either plasmid pAd/PL-DEST (Invitrogen; for E2-L2, L3-L4, and E4 modules) or Ad5 genomic DNA (for E1 and E3 modules). PCR conditions were as follows:

E2-L2 and L3-L4: 98° C. 30 sec-10 cycles of 98° C. 10 sec, 65° C. 30 sec (decrease temp 1° C. every 2 cycles), 72° C. 7 min-29 cycles of 98° C. 10 sec, 60° C. 30 sec, 72° C. 8 min-72° C. 10 min-4° C. hold.

E3: 98° C. 30 sec-10 cycles of 98° C. 10 sec, 70° C. 30 sec (decrease temp 0.5° C. every cycle), 72° C. 2 min 30 sec-25 cycles of 98° C. 10 sec, 68° C. 30 sec, 72° C. 2 min 30 sec-72° C. 10 min-4° C. hold.

E4: 98° C. 30 sec-6 cycles of 98° C. 10 sec, 63° C. 30 sec (decrease temp 0.5° C. every cycle), 72° C. 2 min-29 cycles of 98° C. 10 sec, 60° C. 30 sec, 72° C. 2 min-72° C. 5 min-4° C. hold.

To obtain viral genomic DNA from purified virus, up to 100 µL of purified virus was added to 300 µl of lysis buffer containing 10 mM Tris pH8, 5 mM EDTA, 200 mM NaCl, and 0.2% SDS. The mix was incubated at 60° C. for 5 min, followed by the addition of 5 µl of proteinase K stock (~20 mg/mL) and further incubated at 60° C. for 1 hour. Samples were then placed on ice for 5 min, followed by spinning at 15K×g for 15 min. Supernatant was removed and added to an equal volume of isopropanol, mixed well, and spun at 15K×g for 15 min at 4° C. The pellet was washed with 70% ethanol and re-spun for 15 min at 4° C. The pellet was dried and resuspended for use.

Regarding SLIC, linear fragments were exonuclease treated for 20 min at room temperature in the following 20 µl reaction: 50 mM Tris pH8, 10 mM MgCl2, 50 µg/mL BSA, 200 mM Urea, 5 mM DTT, and 0.5 µl T4 DNA polymerase. The reaction was stopped by addition of 1 µl 0.5M EDTA, followed by incubation at 75° C. for 20 min. An equal amount of T4-treated DNAs were then mixed to around 20 µl in volume in a new tube. For SLIC combining 2 fragments, 10 µl of each reaction was used. For SLIC combining 3 fragments, 7 µl of each reaction was used. Fragments were annealed by heating to 65° C. for 10 min, followed by a slow cool down decreasing the temperature 0.5° C. every 5 seconds down to 25° C. After annealing, 5 µl of the reaction was transformed and clones were screened.

Regarding AdSlicR, a 3-fragment SLIC reaction was performed using 100 ng of T4-treated p15A-SceI (linearized by PCR), and 300 ng of each of the E2 and L3 modules (obtained by PCR from their respective entry vectors). This created vector p15A-SceI E2-L4. Five µg of p15A-SceI E2-L4 was cut with SwaI and gel purified using Qiagen QiaexII. The E3 and E4 modules were obtained by PCR from their respective entry vectors. Each of the linearized vectors (450 ng) and PCR products (200 ng) were treated with T4 DNA polymerase and SLIC was performed as usual, using 150-200 ng of vector and ~100 ng of each module PCR. After isolation of positive clones, 5 µg of the new vector was cut with PacI and gel purified, then combined with an E1 PCR product (100 ng of T4-treated) in a new SLIC reaction. This completed the genome assembly, and the plasmid was ready for transfection to reconstitute virus.

To construct the E1 and E4 mutant regions, manipulation was carried out on the individual module entry vectors. The E1 module with vector backbone was PCR amplified with primers to generate a product lacking the LTCHE sequence (residues 122-126 of SEQ ID NO: 32), then circularized using SLIC to generate pENTR-E1-E1A-ΔLXCXE.

Alternatively, the E1 module with vector backbone was PCR amplified with primers to generate products with E1A codon changes to mutate Y47 to H, C124 to G, or to delete residues 2-11 to generate pENTR-E1-E1A-Y47H, pENTR-E1-E1A-C124G, or pENTR-E1-E1A-Δ2-11, respectively. These products were used as the template for further PCR mutation to generate combinations of these mutations: pENTR-E1-E1A-Y47H-C124G and pENTR-E1-E1A-Y47H-C124G-Δ2-11. The E4 module with vector backbone was PCR amplified with primers to generate a product lacking the E4orf6/7-specific exon sequence (297 bp) downstream of the E4orf6 stop codon to generate pENTR-E4-ΔE4orf6/7. This product was also used as the template for PCR with primers to generate products either lacking the PDZ-binding motif of E4orf1, or the entire E4orf1 sequence (pENTR-E4-ΔE4orf6/7-E4orf1ΔPDZb and pENTR-E4-ΔE4orf6/7-ΔE4orf1, respectively).

To generate complete virus genomes bearing the mutations, AdSlicR was performed using p15A-SceI E2-L4 in combination with the wild-type E3 module and the wild-type E4 or a mutant E4 module, then with either the wild-type E1 or mutant E1. The wild-type AdSlicR adenoviruses are designated in Table 1 shown below.

TABLE 1

Adenoviruses with Modifications in E1 and E4

| Virus Name | E1 | E4 | SEQ ID NO: |
| --- | --- | --- | --- |
| AdSyn-CO102 | wt | wt | 1 |
| AdSyn-CO210 | wt | ΔE4orf6/7 | 2 |
| AdSyn-CO283 | wt | E4orf1 ΔPDZb, ΔE4orf6/7 | 3 |
| AdSyn-CO284 | wt | ΔE4orf1, ΔE4orf6/7 | 4 |
| AdSyn-CO189 | E1A ΔLXCXE | wt | 5 |
| AdSyn-CO181 | E1A ΔLXCXE | ΔE4orf6/7 | 6 |
| AdSyn-CO285 | E1A ΔLXCXE | E4orf1 ΔPDZb, ΔE4orf6/7 | 7 |
| AdSyn-CO286 | E1A ΔLXCXE | ΔE4orf1, ΔE4orf6/7 | 8 |
| AdSyn-CO235 | E1A C124G | wt | 9 |
| AdSyn-CO287 | E1A C124G | ΔE4orf6/7 | 10 |
| AdSyn-CO288 | E1A C124G | E4orf1 ΔPDZb, ΔE4orf6/7 | 11 |

TABLE 1-continued

Adenoviruses with Modifications in E1 and E4

| Virus Name | E1 | E4 | SEQ ID NO: |
| --- | --- | --- | --- |
| AdSyn-CO289 | E1A C124G | ΔE4orf1, ΔE4orf6/7 | 12 |
| AdSyn-CO236 | E1A d2-11 | wt | 13 |
| AdSyn-CO290 | E1A d2-11 | ΔE4orf6/7 | 14 |
| AdSyn-CO291 | E1A d2-11 | E4orf1 ΔPDZb, ΔE4orf6/7 | 15 |
| AdSyn-CO292 | E1A d2-11 | ΔE4orf1, ΔE4orf6/7 | 16 |
| AdSyn-CO238 | E1A Y47H, C124G | wt | 17 |
| AdSyn-CO293 | E1A Y47H, C124G | ΔE4orf6/7 | 18 |
| AdSyn-CO294 | E1A Y47H, C124G | E4orf1 ΔPDZb, ΔE4orf6/7 | 19 |
| AdSyn-CO295 | E1A Y47H, C124G | ΔE4orf1, ΔE4orf6/7 | 20 |
| AdSyn-CO244 | E1A Y47H, C124G, d2-11 | wt | 21 |
| AdSyn-CO296 | E1A Y47H, C124G, d2-11 | ΔE4orf6/7 | 22 |
| AdSyn-CO297 | E1A Y47H, C124G, d2-11 | E4orf1 ΔPDZb, ΔE4orf6/7 | 23 |
| AdSyn-CO298 | E1A Y47H, C124G, d2-11 | ΔE4orf1, ΔE4orf6/7 | 24 |

Regarding virus production, concentration and purification, 293 E4 cells were infected with infectious particles, and approximately 48 hours post-infection when CPE was apparent, the cells were collected and isolated by centrifugation at 500×g for 5 minutes. The cells are lysed in TMN buffer (10 mM TrisCl pH 7.5, 1 mM MgCl2, 150 mM NaCl) via 3× freeze/thaws, and the cell debris was removed by two rounds of centrifugation at 3,000×g and 3,500×g for 15 minutes. A cesium chloride gradient (0.5 g/mL) was used to band virus particles via ultracentrifugation at 37,000×g for 18-24 hours. The band was collected and dialyzed in a 10,000 MWCO Slide-A-Lyzer® dialysis cassette (Thermo Scientific) in TMN with 10% glycerol overnight (12-18 h) at 4° C., then stored at −80° C. The titer of the purified virus was determined versus a titered wild-type standard by a cell-based serial dilution infection ELISA with anti-adenovirus type 5 primary antibody (ab6982, Abcam), and ImmunoPure anti-rabbit alkaline phosphatase secondary antibody (Thermo Scientific).

To evaluate adenovirus protein expression during infection of primary human small airway epithelial cells (SAEC), quiescent SAEC in 12-well plates were infected with MOI 30 adenovirus, and the media was replaced on the cells 4 hours after infection. At 24, 36, and 48 hours after infection, cells were washed with cold PBS, harvested in 500 μL cold PBS, pelleted at 5,000 rpm for 5 min at 4° C., snap frozen and stored at −80° C. Cell pellets were lysed in RIPA buffer (100 mM Tris pH7.4, 300 mM NaCl, 2 mM EDTA, 2% Triton X, 2% deoxycholate, 2 mM NaF, 0.2 mM NaVO$_4$, 2 mM DTT) for 1 hour at 4° C., including sonication in a cup sonicator (2×60 s pulses at 60 amplitude at 4° C.). Cell debris was pelleted by centrifuging at 13,000 rpm for 20 min at 4° C. Protein concentration was determined using Bio-Rad's DC™ Protein Assay, and the protein concentrations of the samples were normalized. Gel electrophoresis was performed using Life Technologies Novex® NuPAGE® SDS-PAGE gels, as per the manufacturer's protocol. Proteins were detected by Western blot. The primary antibodies used to detect proteins were as follows: E1A (ab28305, Abcam), β-actin (A5441, Sigma), Ad5 late proteins (ab6982, Abcam), cyclin A (Ab-6 6E6, NeoMarkers), cyclin B (Ab-3 GNS1, NeoMarkers). Alexa Fluor® antibodies (Life Technologies) were used as secondary antibodies, and the signal was detected using a LI-COR ODYSSEY® instrument. To evaluate adenovirus protein expression during infection of lung adenocarcinoma A549 cells and normal human astrocyte cells (NHA), confluent cells in 12-well plates were infected with MOI 10 adenovirus, and similarly processed as described for SAEC. To evaluate adenovirus protein expression during infection of glioblastoma U87 cells, glioblastoma U118 cells, human vascular endothelial cells (HuVEC), or human fibroblasts, confluent cells in 12-well plates were infected with MOI 20 adenovirus, and similarly processed as described for SAEC.

To perform cell cycle analysis, cells were infected with the same MOI as for protein expression. Forty-eight hours post-infection, cells were trypsinized off the plate and washed with cold PBS. Cells were resuspended in 500 μL cold PBS, and fixed with 3 mL cold 70% EtOH/15 mM glycine, pH 2.8. Samples were kept at 4° C., and prior to FACS, the cells were pelleted, washed in cold PBS, and resuspended in propidium iodide (PI)/RNase A solution, then incubated at 37° C. for 1 h. At least 10,000 events were collected by FACS for each sample.

To evaluate adenovirus bursts from infection, quiescent cells in 12-well plates were infected with MOI 1 or MOI 10 adenovirus, and the media was replaced on the cells four hours after infection. Media from the wells was collected 48 and 72 hours post-infection, flash frozen and thawed once, and centrifuged at 7,000 rpm at 4° C. for 5 min to pellet cellular debris. The volume of the media was measured, and was flash frozen and stored at −80° C. The titer of the virus in the media was determined versus a titered wild-type standard by a cell-based serial dilution infection ELISA with anti-adenovirus type 5 primary antibody (ab6982, Abcam) and ImmunoPure anti-rabbit alkaline phosphatase secondary antibody (Thermo Scientific).

Regarding cell viability assays, cells were seeded in 96-well plates, and in infected in triplicate at serial dilutions at MOI 30. Following infection at 7-10 days when there was complete CPE in the MOI 10 infected wells, metabolic activity was measured using cell proliferation reagent WST-1 (Roche) as per manufacturer's specifications.

As discussed above, cancer continues to be a problematic disease in need of additional therapeutic treatments. One such treatment includes oncolytic viruses. Adenoviruses are one of the viruses being explored for use as an oncolytic virus. The retinoblastoma (Rb) tumor suppressor pathway function is lost in almost every human cancer either by direct mutation of Rb, by loss of CDK-inhibitor p16 function (e.g. due to mutation/methylation), or by amplification of CDK/cyclins. In normal, non-dividing cells, Rb remains hypophosphorylated and binds to transcription factor E2F at its target promoters, suppressing transcription by masking the E2F transactivation domain as well as recruiting chromatin-remodeling complexes and histone-modifying activities. During the G1-S transition of the cell cycle, CDKs phosphorylate Rb which relieves E2F suppression. Adenoviruses express early viral oncoproteins that inactivate the Rb tumor suppressor pathway to force cells to replicate and concomitantly reproduce the viral genome. Adenovirus E1A binds Rb, in part, via an LXCXE motif, deregulating its tumor suppressor activities. It was thus proposed that deleting the LXCXE motif in E1A would eliminate Rb inactivation, and make a selectively replicating virus (ONYX-838). However, Johnson et al. (*Cancer Cell*, 1(4):325-337, 2002) provided evidence that the Ad E1A LXCXE mutation was not sufficient to prevent S-phase entry, viral DNA replication, and late protein expression, consistent with results from experiments described herein. Even though the Rb-selectivity of the E1A mutant is controversial, this mutation has been carried forward as the basis for an oncolytic virus (DNX-2401) that is moving into phase II clinical trials for malignant brain tumors. In an attempt to achieve higher Rb-selectivity, an adenovirus was generated that replaced the promoters for the adenovirus E1 and E4 regions with E2F promoters and combined it with the E1A ΔLXCXE motif to generate ONYX-411 (Johnson et al., *Cancer Cell*, 1(4):325-337, 2002; and Dubensky et al., *Cancer Cell*, 1(4):307-309, 2002). To test these viruses, tumor and primary human cells were infected with either wild type virus, ONYX-838 (E1A ΔLXCXE) or ONYX-411 and harvested at various time points post infection. ONYX-838 indiscriminately replicated in tumor and primary lung epithelial cells. ONYX-411, which combines the E1A ΔLXCXE with cellular E2F control of adenovirus E1A, E1B and E4 regions demonstrated selective-replication in tumor cells vs. normal cells (Johnson et al., *Cancer Cell* 1(4):325-337, 2002). However, the E2F promoters result in recombination and also limited replication to wild type virus levels in tumor cells.

As described herein, independently of E2F release from Rb suppression by E1A, there is another Ad protein, E4orf6/7, that further stabilizes E2F proteins at cellular and Ad promoters. Together, E1A and E4orf6/7 drive E2F-mediated transcription, causing S-phase initiation, concomitantly propagating the viral DNA genome. Therefore, provided herein are recombinant adenoviruses bearing E1A modifications, E4orf1 modifications and/or E4orf6/7 modifications that are a selective oncolytic viral therapy for tumor cells lacking functional Rb. Specifically, compound mutations in E1A/E4orf1/E4orf6/7 were engineered to determine if they selectively replicate in tumor cells, but not primary cells. It is proposed that the combination of these mutations result in an effective, self-amplifying therapy for cancer.

Figure 1B:
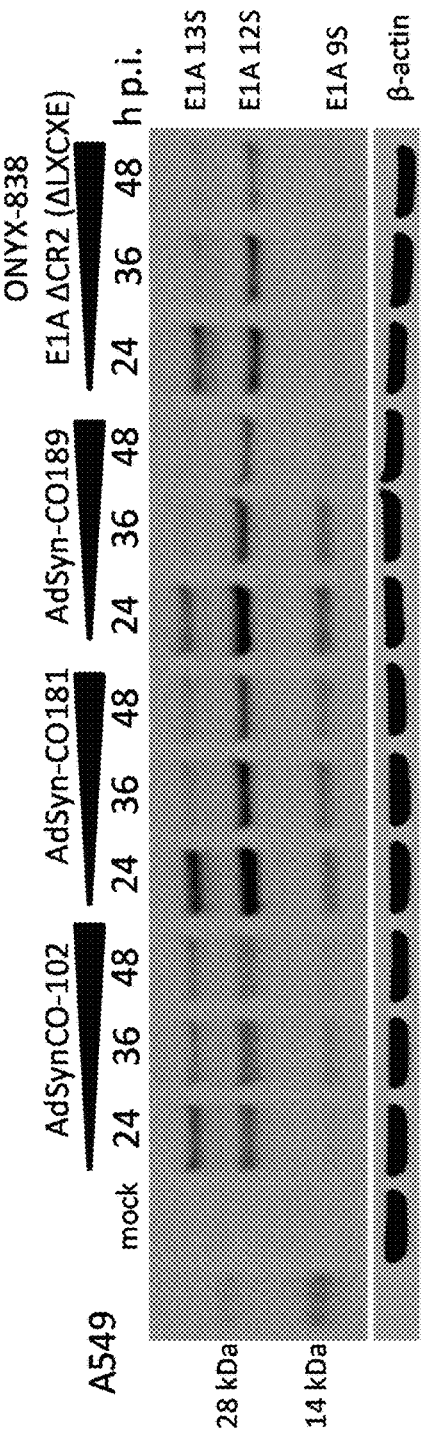

To test these viruses in normal (non-tumor) cells and tumor cells, cells were mock infected or infected with AdSyn-CO102 (wild-type), AdSyn-CO181 (E1A ΔLXCXE/ ΔE4orf6/7), AdSyn-CO189 (E1A ΔLXCXE), or ONYX-838 (E1A ΔCR2). ONYX-838 also lacks ΔLXCXE which is in the CR2 domain of E1A. Quiescent human primary small airway epithelial cells (SAEC) (non-tumor cells) were infected at MOI 10. AdSyn-CO102 exhibited the expected decrease of E1A levels at later times during infection (FIG. 1A). Similarly, in cells infected with AdSyn-CO189 or ONYX-838, there is a decrease in E1A levels at later times during infection; however, at the earlier timepoint, expression of E1A is greater than expression of E1A in AdSyn-CO102-infected cells. In contrast, AdSyn-CO181 exhibited stronger and continued expression of E1A throughout the infection, which is indicative of a failure to progress through the adenovirus lifecycle. Confluent lung adenocarcinoma (A549) cells (tumor cells) were infected at MOI 30. All infections resulted in the expected decrease of E1A levels at later times during infection, indicative of typical adenovirus lifecycle progression (FIG. 1B).

Late adenoviral protein and cellular cyclin protein expression following infection of SAEC or A549 cells with mutant adenoviruses is shown in FIG. 2A (SAEC) and FIG. 2B (A549 cells). In contrast to wild-type virus and viruses with E1A mutations alone, AdSyn-CO181 failed to activate E2F-dependent cell cycle targets, the S phase, cyclin A and cyclin B in SAEC. Furthermore, AdSyn-CO181 and AdSyn-CO210, which have E4orf6/7 mutations, were defective for late protein expression and replication in SAEC. Both of these defects were apparent to a lesser extent with AdSyn-CO210. In contrast to infected primary cells, there were no apparent defects in expression of late structural proteins in A549 cells, and cyclin A and cyclin B remain present in all infected A549 samples.

DNA replication of infected SAEC and A549 cells is shown in FIGS. 3A and 3B. AdSyn-CO181 infection exhibited a strong DNA replication defect in SAEC relative to AdSyn-CO102, which is linked to decreased virus replication. A modest defect was also apparent in AdSyn-CO210 infected SAEC at this timepoint. In A549 cells, no DNA replication defect was apparent with any mutant virus infection.

Figure 4A:
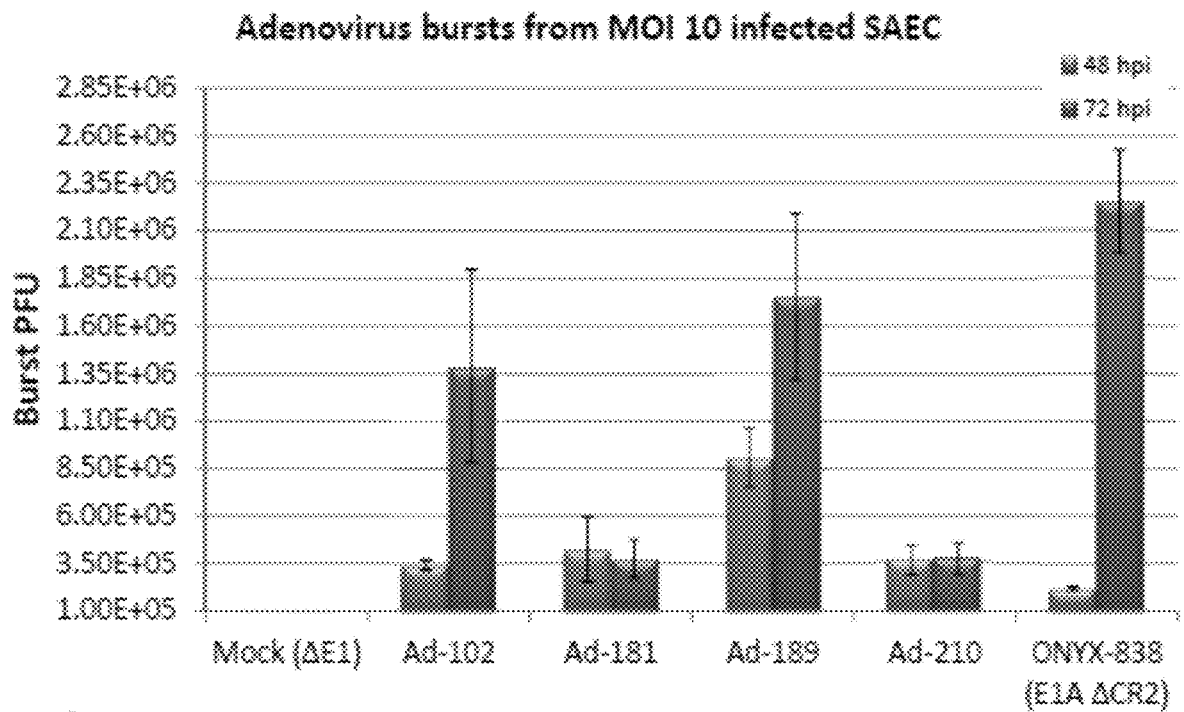
FIGS. 4A-4B are graphs showing adenovirus bursts from infected SAEC and A549 cells, respectively. Cells were mocked infected or infected with AdSyn-CO102 (wild-type), AdSyn-CO181 (E1A ΔLXCXE/ΔE4orf6/7), AdSyn-CO189 (E1A ΔLXCXE), AdSyn-CO210 (ΔE4orf6/7) or ONYX-838 (E1A ΔCR2) and the media was collected 48 and 72 hours post-infection. Infectious virus particles in the media were quantified by ELISA. For FIG. 4A, quiescent SAEC were infected at MOI 10. Both AdSyn-CO181 and AdSyn-CO210 infection revealed strong replication defects in SAEC relative to AdSyn-CO102. For FIG. 4B, A549 cells were infected at MOI 30. With the exception of AdSyn-CO210, no defect in virus replication was observed in these cells.
Figure 4B:
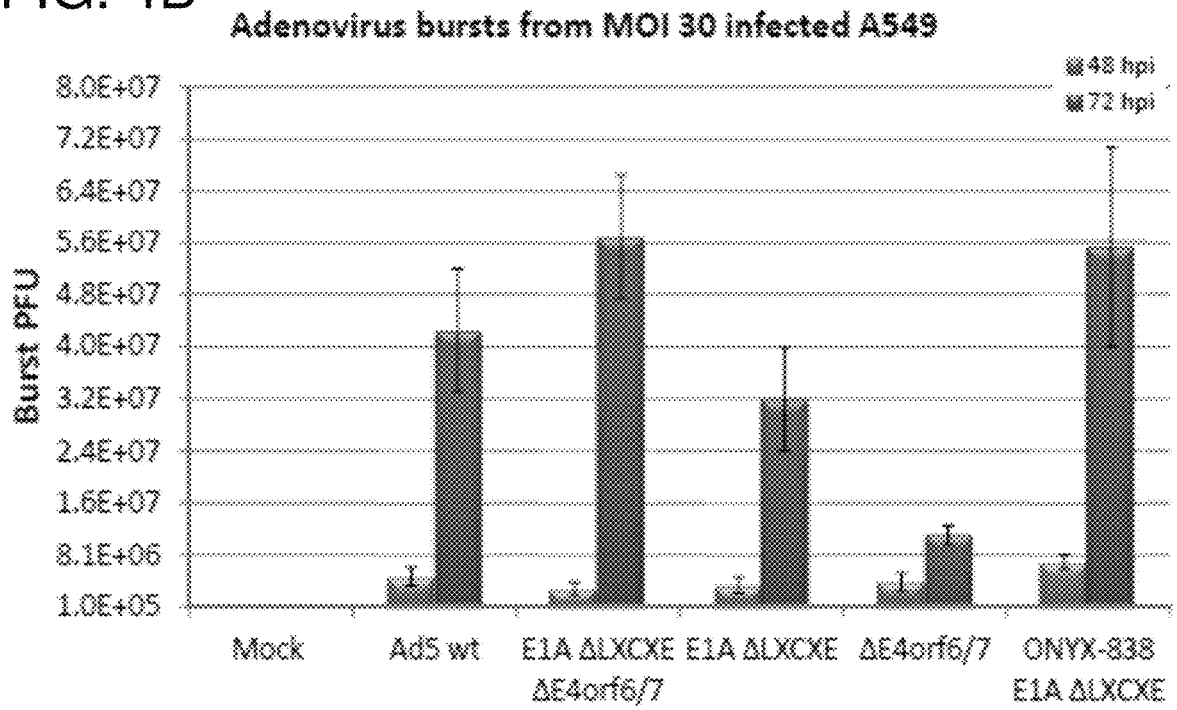

FIGS. 4A-4B show adenovirus bursts from infected SAEC and A549 cells. Both AdSyn-CO181 and AdSyn-CO210 infection revealed strong replication defects in SAEC relative to AdSyn-CO102 (FIG. 4A). With the exception of AdSyn-CO210, there was no defect in virus replication in A549 cells (FIG. 4B).

FIGS. 5A-5B show the cell viability of infected SAEC and A549 after 7 days of infection. Compared to AdSyn-CO102, AdSyn-CO181 exhibited decreased cell-killing capability in SAEC. As shown in FIG. 5B, of the mutant viruses tested, there was no defect in cell killing relative to wild-type virus in A549 cells.

Figure 6A:
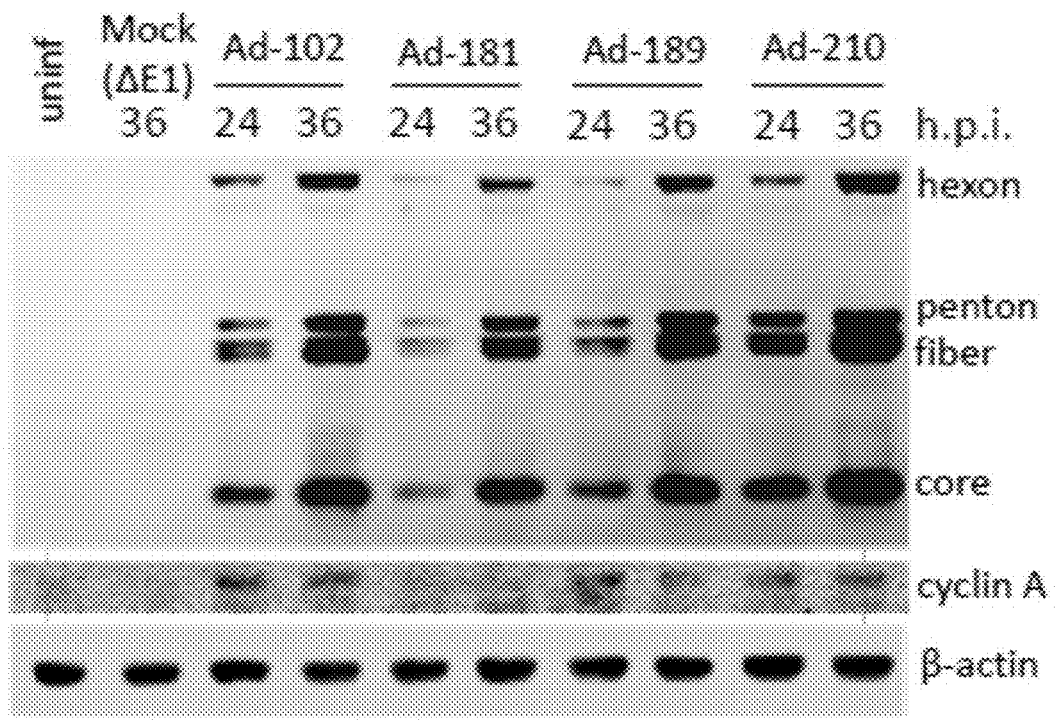
FIG. 6A is an immunoblots of cell lysates. Normal human astrocytes (NHA) infected at MOI 10 were subjected to immunoblot to detect adenovirus late structural protein expression and cellular cyclin induction. AdSyn-CO181 does not induce cyclin A, and demonstrated delayed and decreased late viral protein expression relative to AdSyn-CO102, which are indicative of replication deficiency.
Figure 6B:
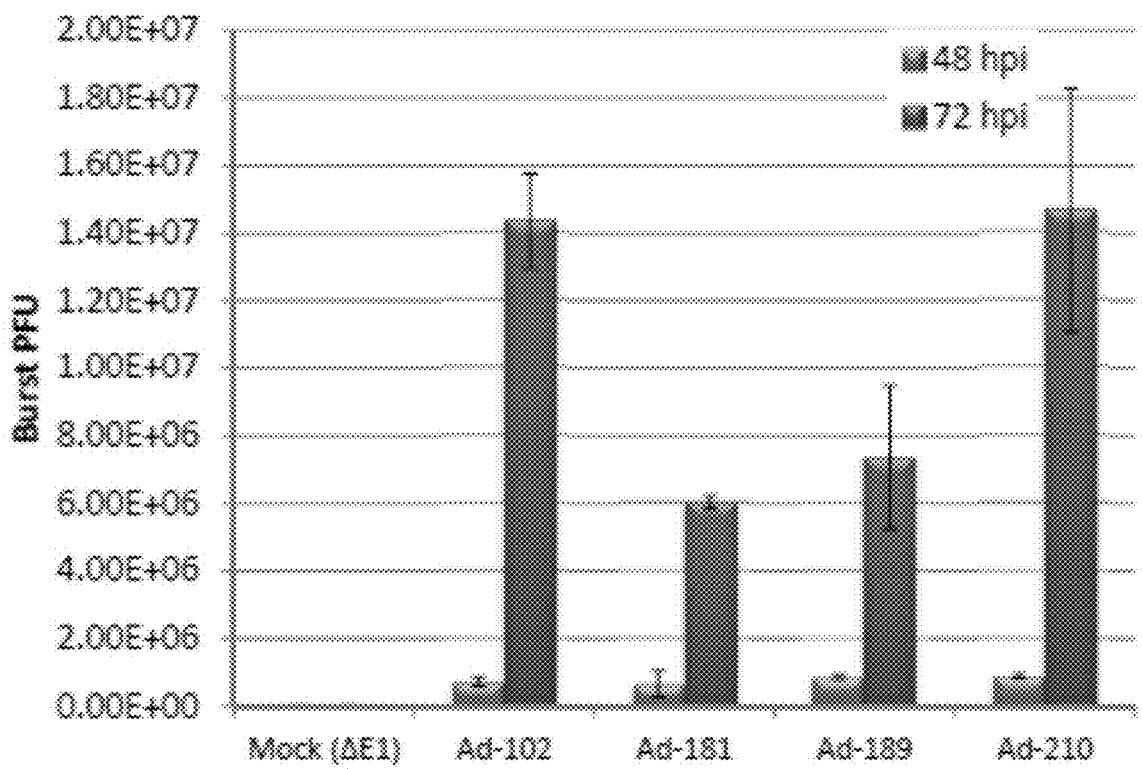
FIGS. 6B-6C are graphs showing AdSyn-CO181 exhibits attenuated infection in NHA. For FIG. 6B, NHA were infected by the panel of viruses, and the number of infectious particles in the media was quantified 48 and 72 hours post-infection. AdSyn-CO181 and AdSyn-CO189 demonstrated a replication defect in NHA relative to AdSyn-CO102. For FIG. 6C, DNA replication was quantified in MOI 10 infected NHA 48 hours post-infection by PI FACS. DNA content of uninfected cells is shown in the background profile of the histograms. The Y-axis is the relative abundance of cells, and the X-axis is the fluorescence from PI in the cell, which is proportional to the amount of nucleic acid. AdSyn-CO181 exhibited a diminished induction of DNA replication relative to AdSyn-CO102, which is linked to decreased virus replication.
Figure 6C:
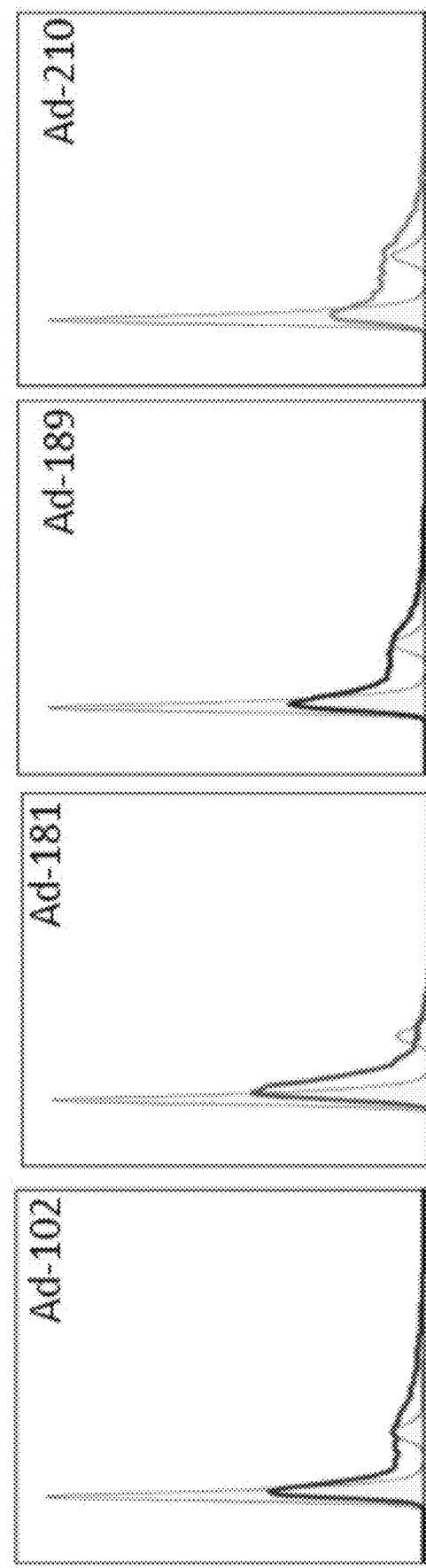
Figure 7A:
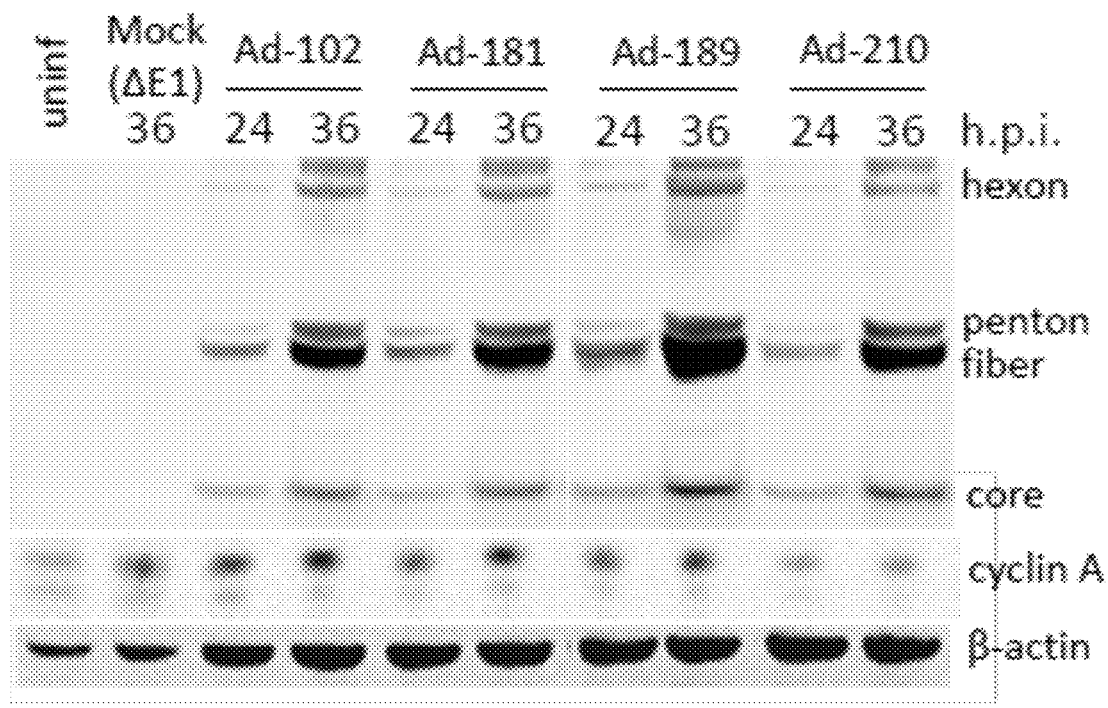
FIG. 7A is an immunoblot of cell lysates from infected glioblastoma U87 cells. MOI 20 infected U87 cells were subjected to immunoblot to detect adenovirus late structural protein expression and cellular cyclin induction.
Figure 7B:
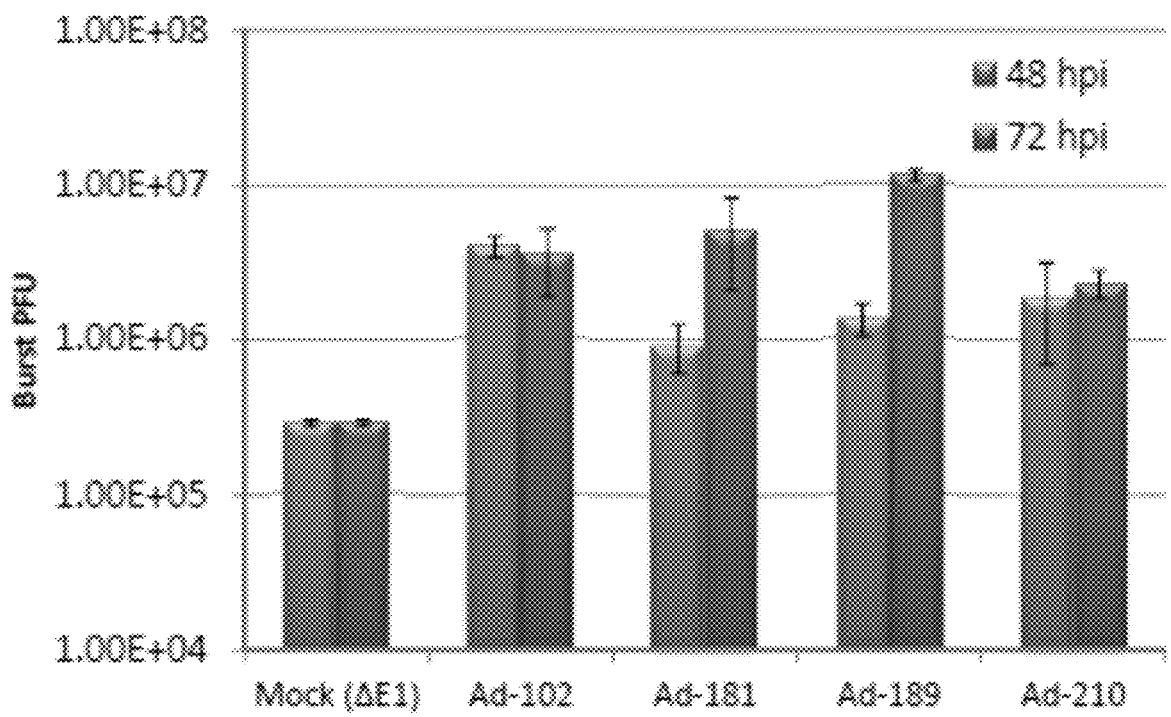
FIGS. 7B-7C are graphs showing recombinant adenoviruses have no replication defects in glioblastoma U87 cells. For FIG. 7B, U87 cells were infected by the panel of viruses, and the number of infectious particles in the media was quantified 48 and 72 hours post-infection. For FIG. 7C, DNA replication was quantified in MOI 20 infected U87 cells 48 hours post-infection by PI FACS. DNA content of uninfected cells is shown in background profile of the histograms. The Y-axis is the relative abundance of cells, and the X-axis is the fluorescence from PI in the cell, which is proportional to the amount of DNA.
Figure 7C:
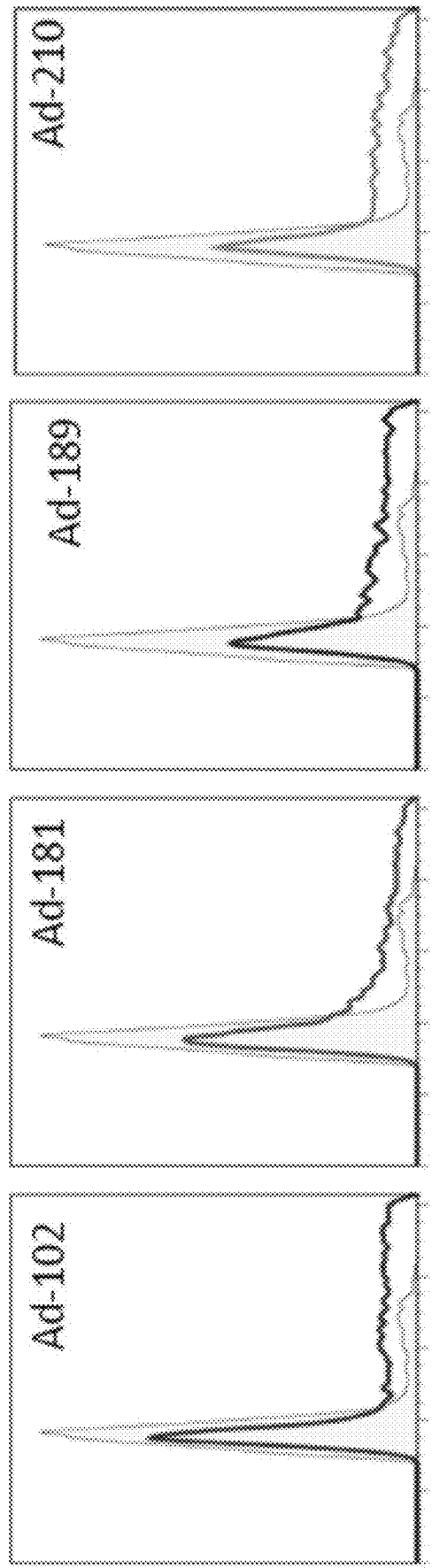
Figure 8A:
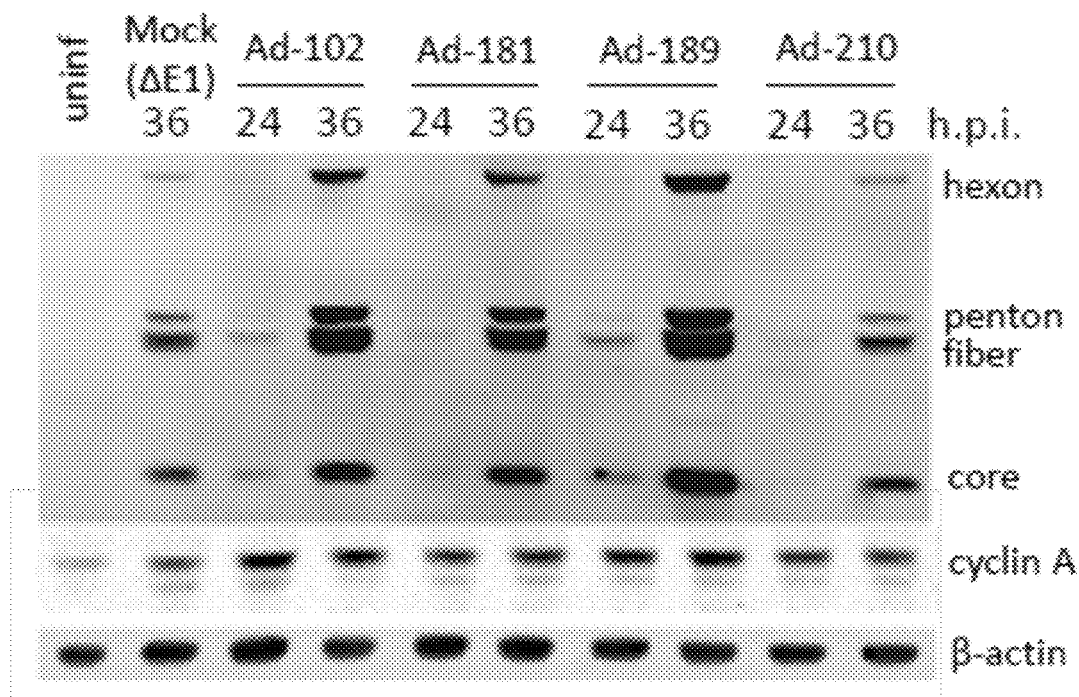
FIG. 8A is an immunoblot of cell lysates from infected glioblastoma U118 cells. MOI 20 infected U118 cells were subjected to immunoblot to detect adenovirus late structural proteins expression and cellular cyclin induction.
Figure 8B:
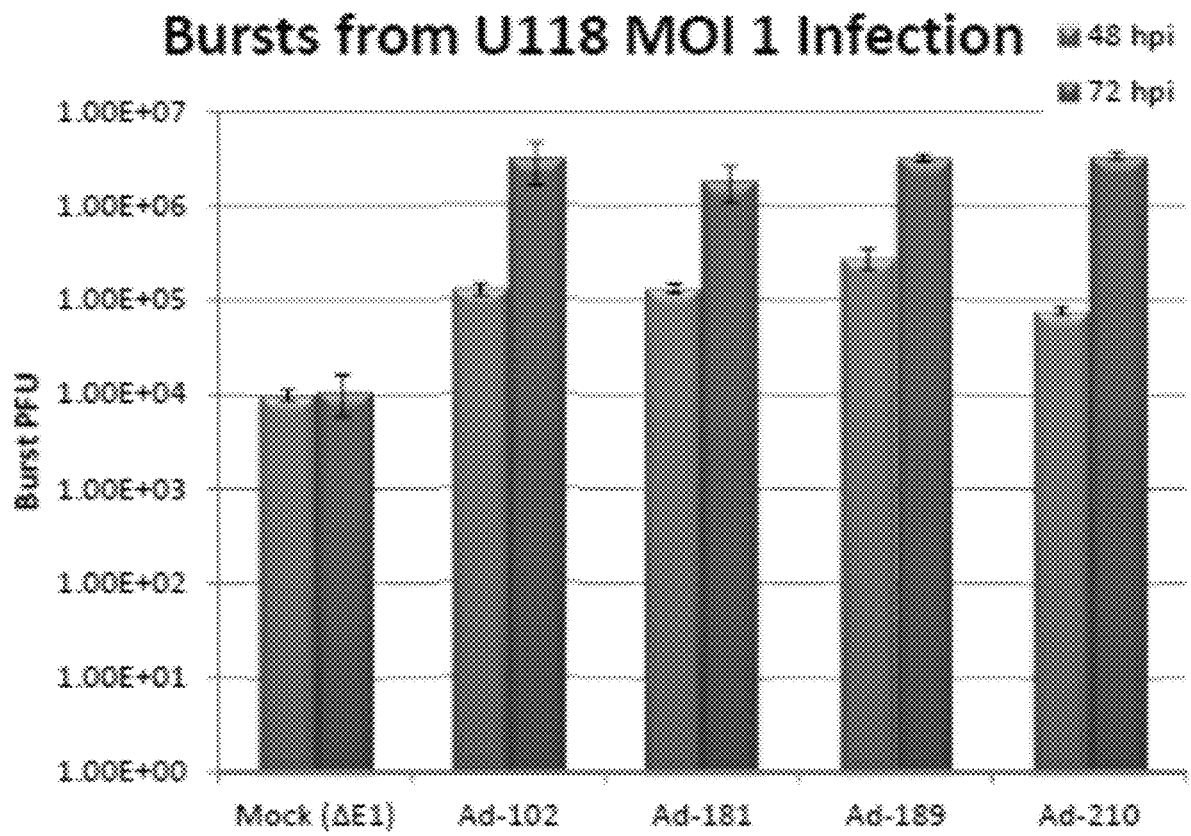
FIGS. 8B-8C are graphs showing recombinant adenoviruses have no replication defects in glioblastoma U118 cells. For FIG. 8B, U118 cells were infected by the panel of viruses, and the number of infectious particles in the media was quantified 48 and 72 hours post-infection. For FIG. 8C, DNA replication was quantified in MOI 20 infected U118 cells 48 hours post-infection by PI FACS. DNA content of uninfected cells is shown in the background profile of the histograms. The Y-axis is the relative abundance of cells, and the X-axis is the fluorescence from PI in the cell, which is proportional to the amount of DNA.
Figure 8C:
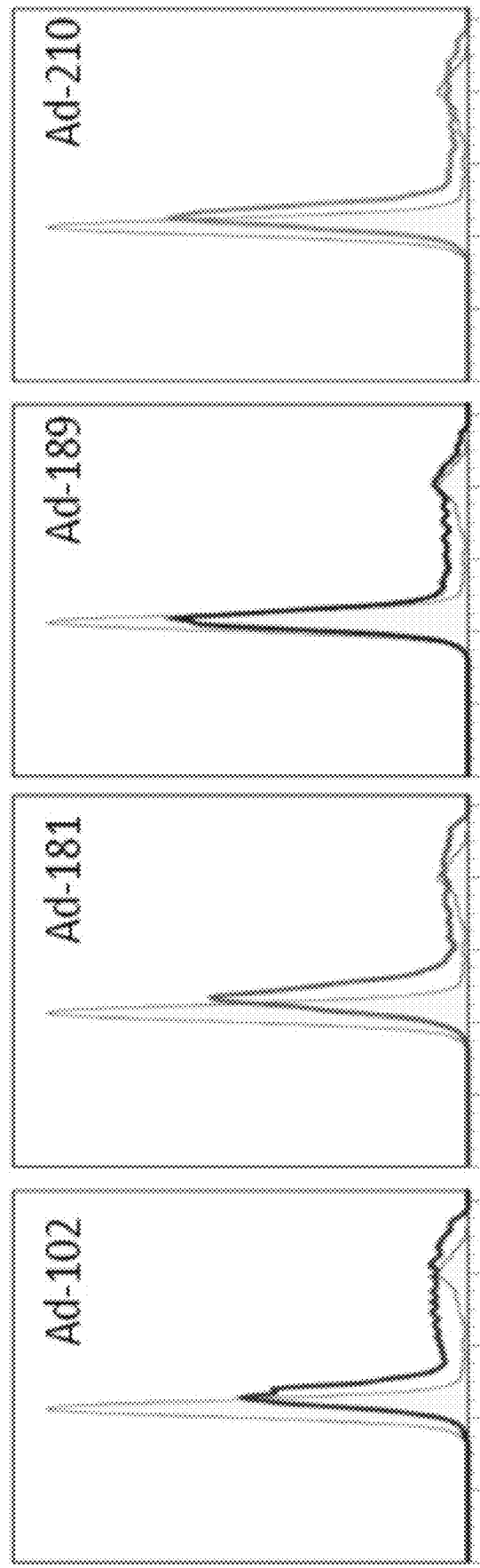
Figure 9A:
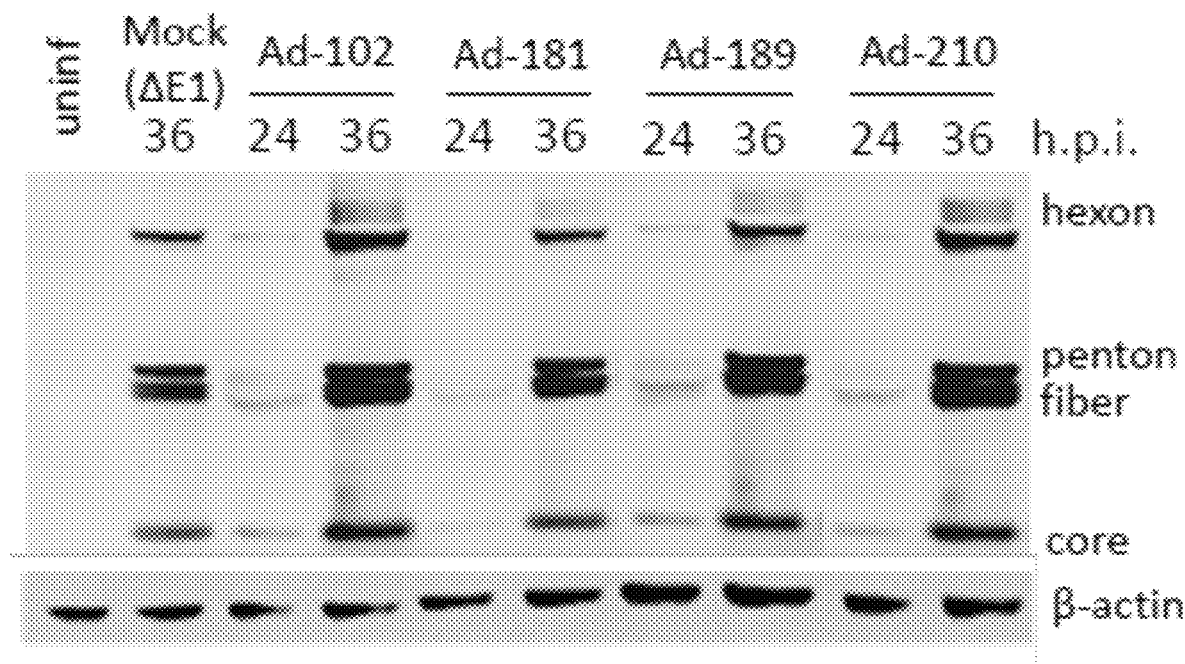
FIG. 9A is an immunoblot of cell lysates from infected human fibroblasts (IMR90 cells). MOI 10 infected fibroblasts were subjected to immunoblot to detect late structural protein expression. AdSyn-CO181 exhibited delayed and decreased late viral protein expression relative to AdSyn-CO102, which is indicative of replication deficiency.
Figure 9B:
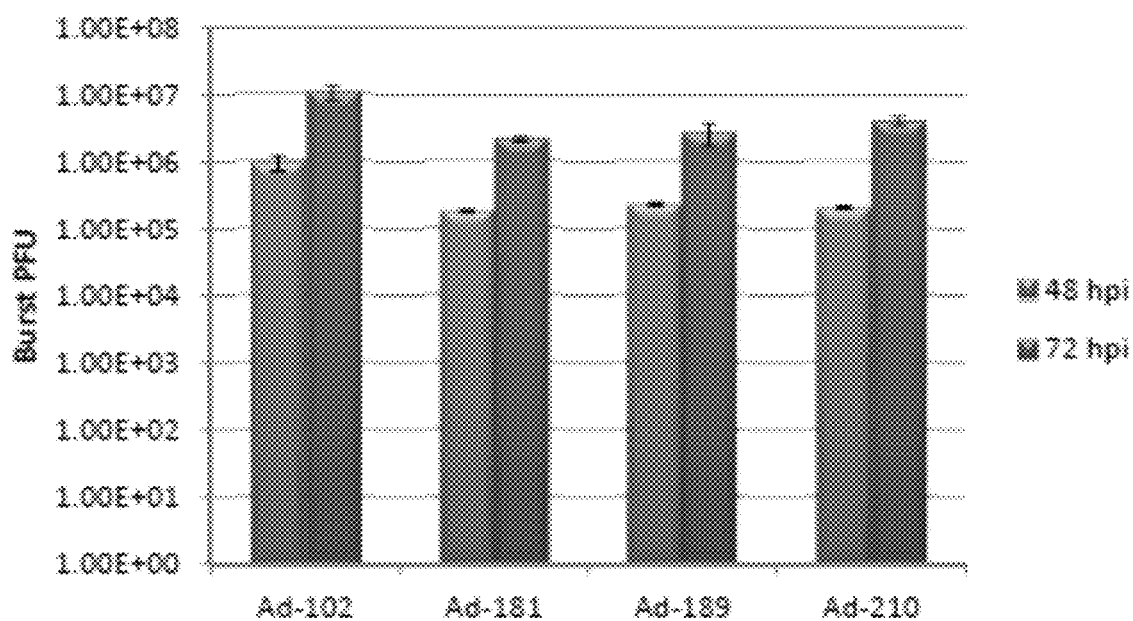
FIGS. 9B-9C are graphs showing AdSyn-CO181 has modest replication defects in IMR90 cells. For FIG. 9B, fibroblasts were infected by the panel of viruses, and the number of infectious particles in the media was quantified 48 and 72 hours post-infection. With this assay at these timepoints, there was not a clear difference in replication capacity of the modified adenoviruses. For FIG. 9C, DNA replication was quantified in MOI 20 infected fibroblasts 48 hours post-infection by PI FACS. DNA content of uninfected cells is shown in the background profile of the histograms. The Y-axis is the relative abundance of cells, and the X-axis is the fluorescence from PI in the cell, which is proportional to the amount of DNA. AdSyn-CO181 exhibited a diminished induction of DNA replication relative to AdSyn-CO102, which is linked to decreased virus replication.
Figure 9C:
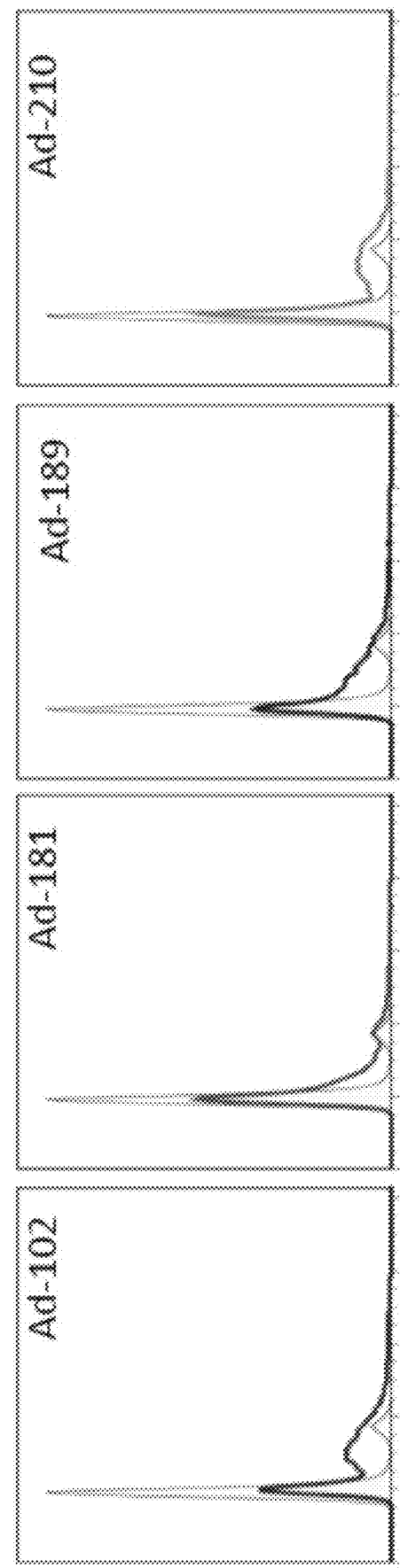

Recombinant viruses were also tested in normal human astrocytes (NHA) (FIGS. 6A-6C), glioblastoma U87 cells (FIGS. 7A-7C), glioblastoma U87 cells (FIGS. 8A-8C) and IMR90 cells (FIGS. 9A-9C). In NHA, AdSyn-CO181 did not induce cyclin A, and demonstrated delayed and decreased late viral protein expression relative to AdSyn-CO102, which are indicative of replication deficiency (FIG. 6A). In addition, as measured by the number of infectious particles (FIG. 6B) and DNA content (FIG. 6C), AdSyn-CO181 exhibited attenuated infection in NHA, compared to wild-type AdSyn-CO102. In contrast to NHA cells, the mutant adenoviruses did not demonstrate a replication defect in glioblastoma U87 cells (FIGS. 7A-7C) or in glioblastoma U118 cells (FIGS. 8A-8C). AdSyn-CO181 exhibited modest replication defects in IMR90 cells (FIGS. 9A-9C).

Thus, the data described above indicates that in contrast to wild-type and E1AΔCR2 viruses, E1AΔCR2/ΔE4orf6/7 and also ΔE4orf6/7 viruses replicate poorly in primary cells, as evidenced by lack of capsid protein expression, failure to induce E2F target genes (cyclin A and B), failure to elicit S phase entry and viral replication. In contrast, these viruses replicate to wild-type virus levels in A549 cells and a panel of tumor cell-lines. Therefore, the recombinant adenoviruses disclosed herein are selective cancer therapeutic agents.

Figure 10:
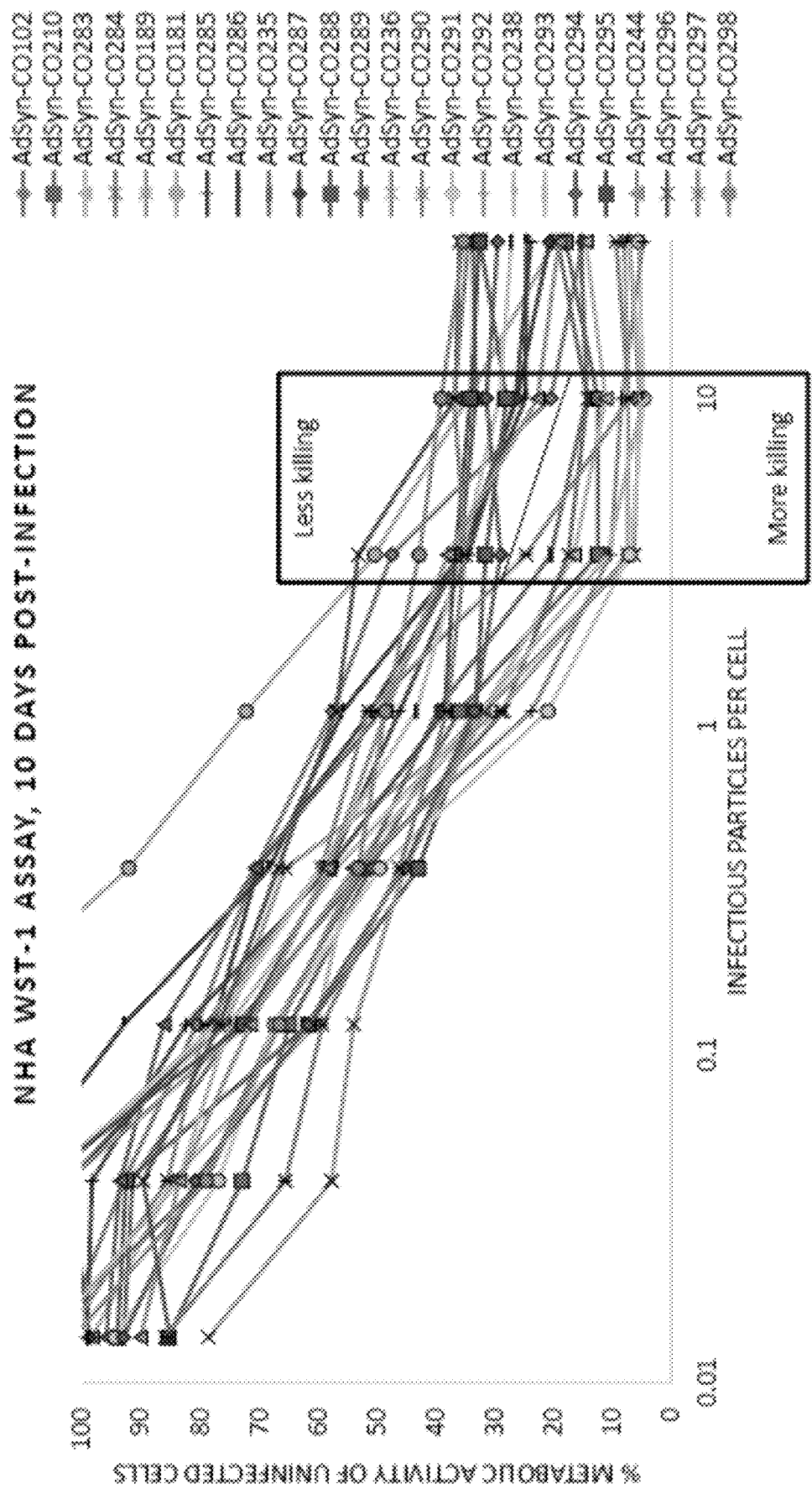
FIG. 10 is a graph showing the cell viability of infected primary NHA cells after 10 days of infection. Cells were infected with a serial dilution of wild-type or mutant virus. The metabolic activity was quantified by WST-1 assay. At three and ten infectious particles per cell, two groups of viruses were apparent, labeled in the graph as "less killing" and "more killing." The viruses that induced less cell killing bear both an E1A with an Rb-binding mutation and a deletion of E4orf6/7. The viruses that induced more killing either have a wild-type E1 or a wild-type E4.
Figure 11:
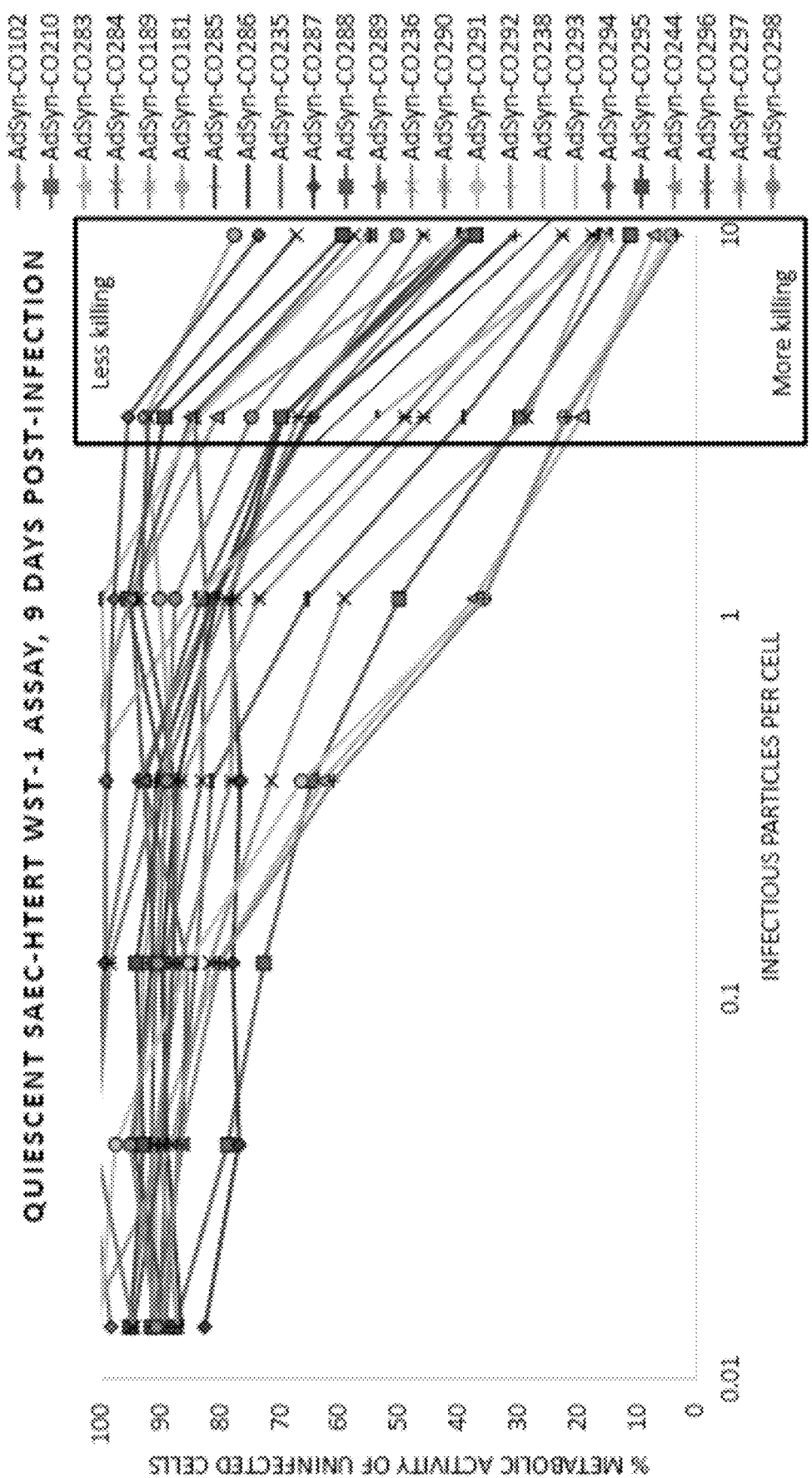
FIG. 11 is a graph showing the cell viability of infected quiescent SAEC-hTERT cells after 9 days of infection. Cells were infected with a serial dilution of wild-type or mutant virus. The metabolic activity was quantified by WST-1 assay. At three and ten infectious particles per cell, two groups of viruses were apparent, labeled in the graph as "less killing" and "more killing." The viruses that induced less cell killing bear both an E1A with an Rb-binding mutation and a deletion of E4orf6/7. The viruses that induced more cell killing either have a wild-type E1 or a wild-type E4.
Figure 12:
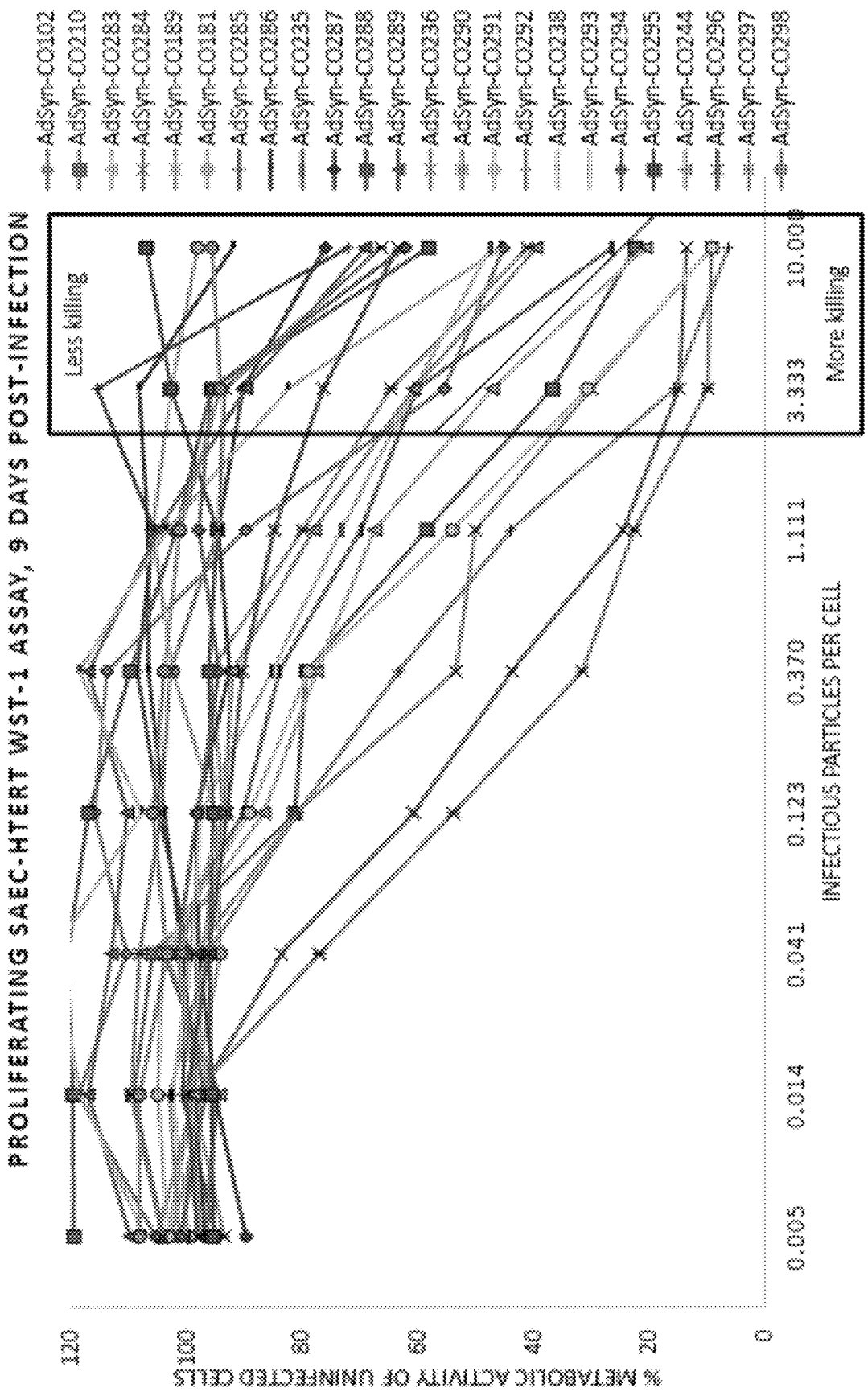
FIG. 12 is a graph showing the cell viability of infected proliferating SAEC-hTERT cells after 9 days of infection. Cells were infected with a serial dilution of wild-type or mutant virus. The metabolic activity was quantified by WST-1 assay. At three and ten infectious particles per cell, two groups of viruses were apparent, labeled in the graph as "less killing" and "more killing." The viruses that induced less cell killing bear both an E1A with an Rb-binding mutation and a deletion of E4orf6/7. The viruses that induced more cell killing either have a wild-type E1 or a wild-type E4.
Figure 13:
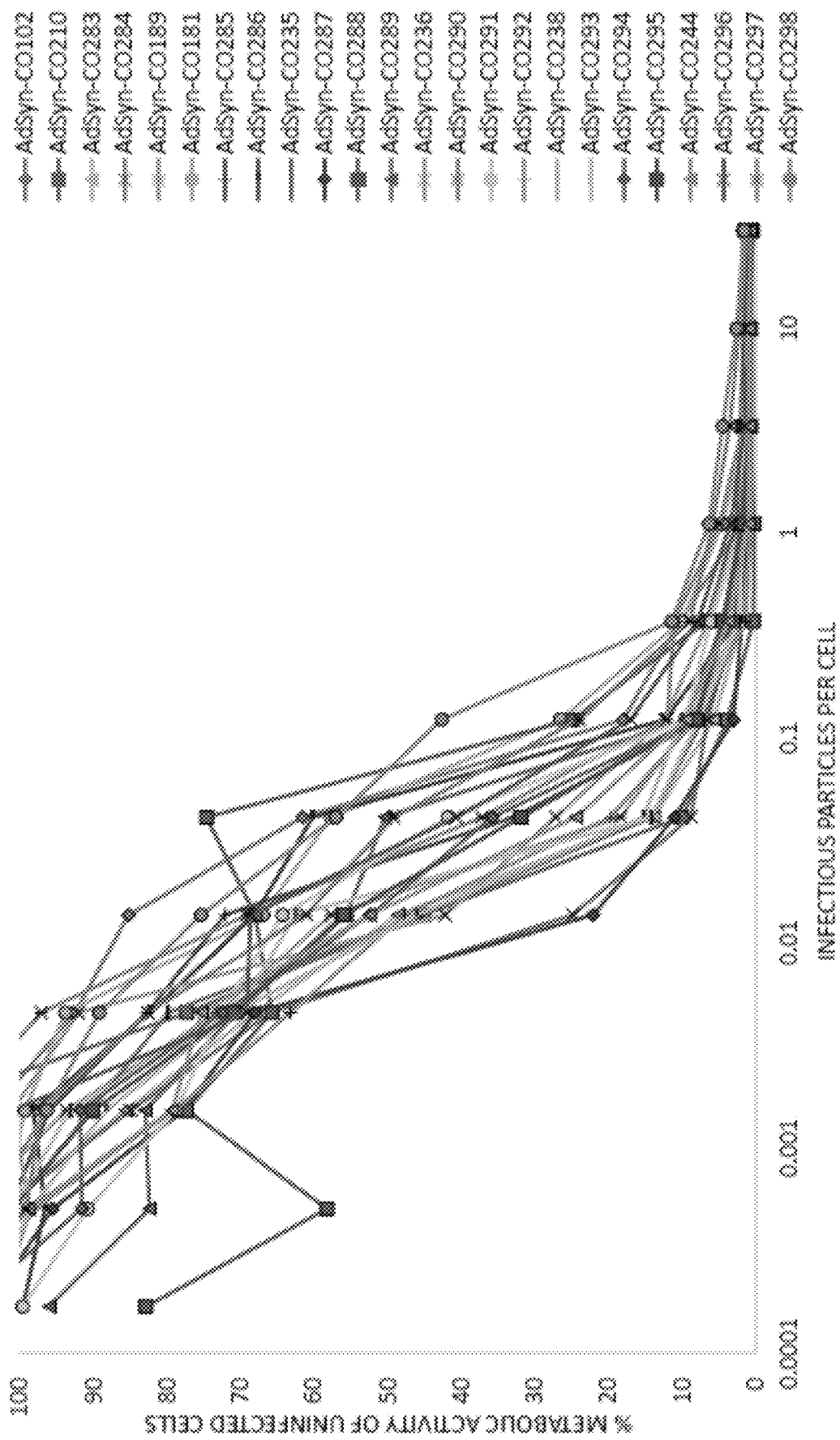
FIG. 13 is a graph showing the cell viability of infected A549 cells after 7 days of infection. Cells were infected with a serial dilution of wild-type or modified virus. The metabolic activity was quantified by WST-1 assay.
Figure 14:
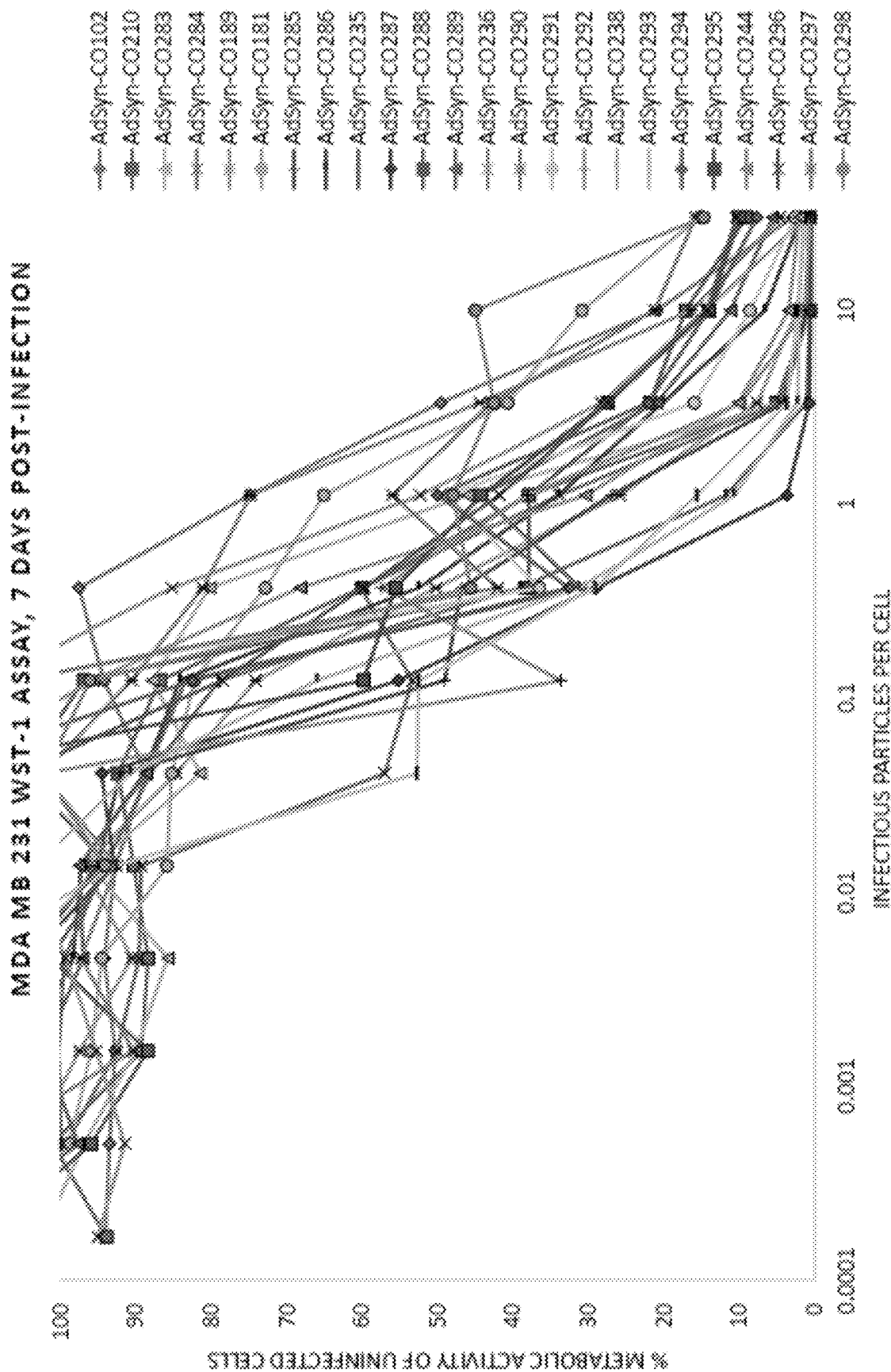
FIG. 14 is a graph showing the cell viability of infected human breast cancer cells (MDA MB 231) after 7 days of infection. Cells were infected with a serial dilution of wild-type or modified virus. The metabolic activity was quantified by WST-1 assay.
Figure 15:
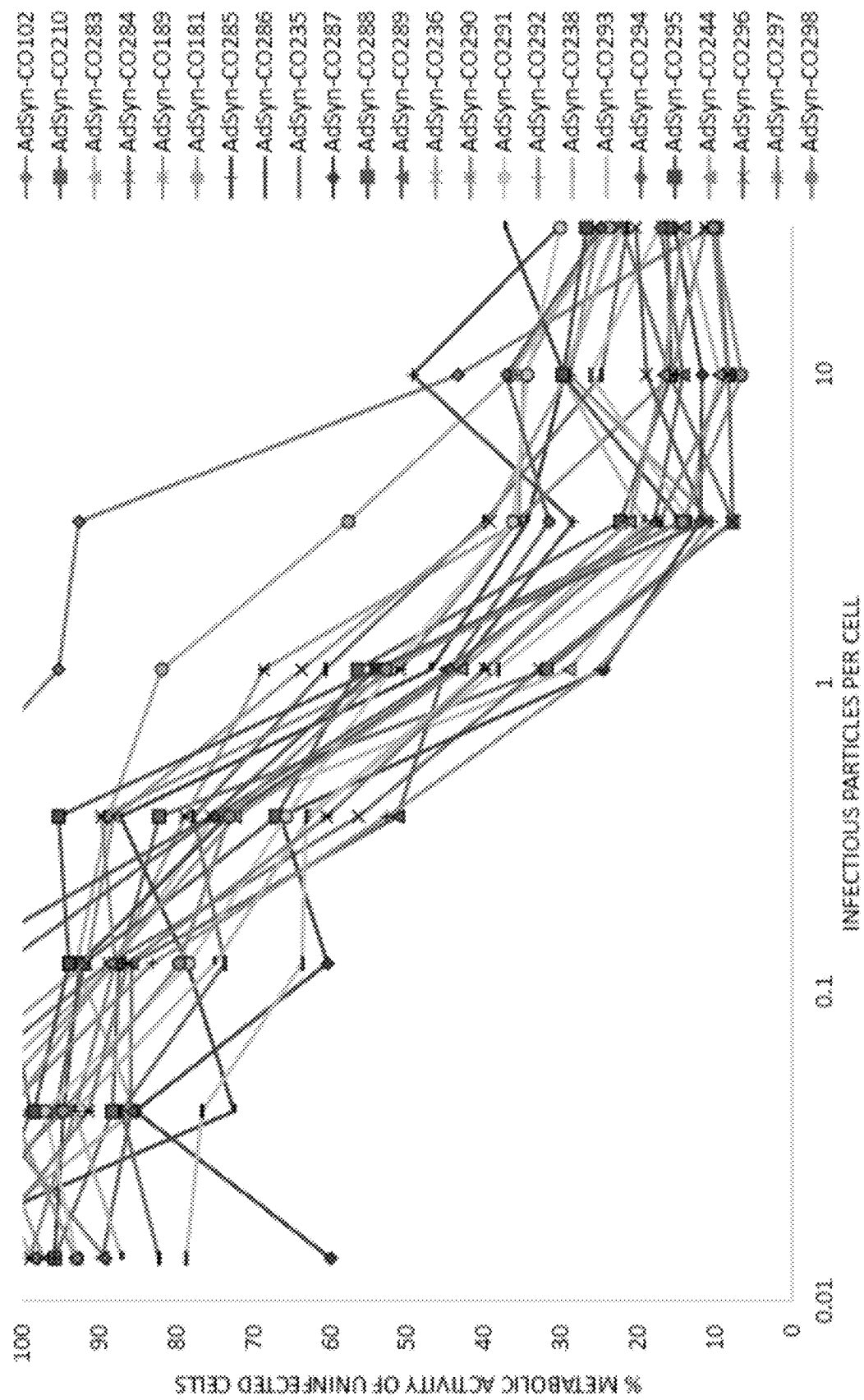
FIG. 15 is a graph showing the cell viability of infected glioblastoma cells (U87) after 7 days of infection. Cells were infected with a serial dilution of wild-type or modified virus. The metabolic activity was quantified by WST-1 assay.

Results of the replication specificity of a larger set of mutant adenoviruses, including mutations in E4orf1 (see Table 1) are shown in FIGS. 10-15 and summarized in FIG. 16. FIG. 10 is a graph showing the cell viability of infected primary normal human astrocytes (NHA) after 10 days of infection. FIG. 11 is a graph showing the cell viability of infected quiescent normal small airway epithelial cells (SAEC-hTERT) after 9 days of infection. FIG. 12 is a graph showing the cell viability of infected proliferating SAEC-hTERT cells after 10 days of infection. FIG. 13 is a graph showing the cell viability of infected human lung adenocarcinoma cells (A549) after 7 days of infection. FIG. 14 is a graph showing the cell viability of infected human breast cancer cells (MDA MB 231) after 7 days of infection. FIG. 15 is a graph showing the cell viability of infected glioblastoma cells (U87) after 7 days of infection. FIG. 16 is a heatmap table showing the quantitation of cell viability assays for infected primary NHA, SAEC-hTERT (quiescent), SAEC-hTERT (proliferating), A549, MDA MB 231, and U87 cells after 7 days of infection. In addition, FIG. 17 provides a table showing quantitation of cell viability assays for infected U2OS and SaOS2 cells. Both U2OS and SaOS2 cells are osteocarcinoma cells; however, p53 and Rb are functional in U2OS cells and mutated in SaOS2 cells. The results demonstrate that the mutant viruses selectively replicate in the Rb-defective tumor cells.

These data show that the combination of various modifications of E1A, E4orf1 and/or E4orf6/7 results in selective oncolytic adenovirus that specifically replicate in cancer cells with a defective Rb tumor suppressor pathway.

Example 2: Oncolytic Adenoviruses with Modifications in E1, L3, E3 and/or E4

This example describes additional recombinant adenoviruses with tumor selectivity. Exemplary recombinant viruses are listed in Table 2 and the genome sequences of these viruses are set forth as SEQ ID NOs: 25-31.

CO442 can be used as an experimental control virus as it expresses FRB*-fiber, but not an FKBP fusion protein, which would be required for rapamycin/rapalog-dependent retargeting. AdSyn-CO335 and AdSyn-CO442 also include an E451Q mutation in the hexon protein. This mutation detargets the recombinant virus from the liver.

Figure 18A:
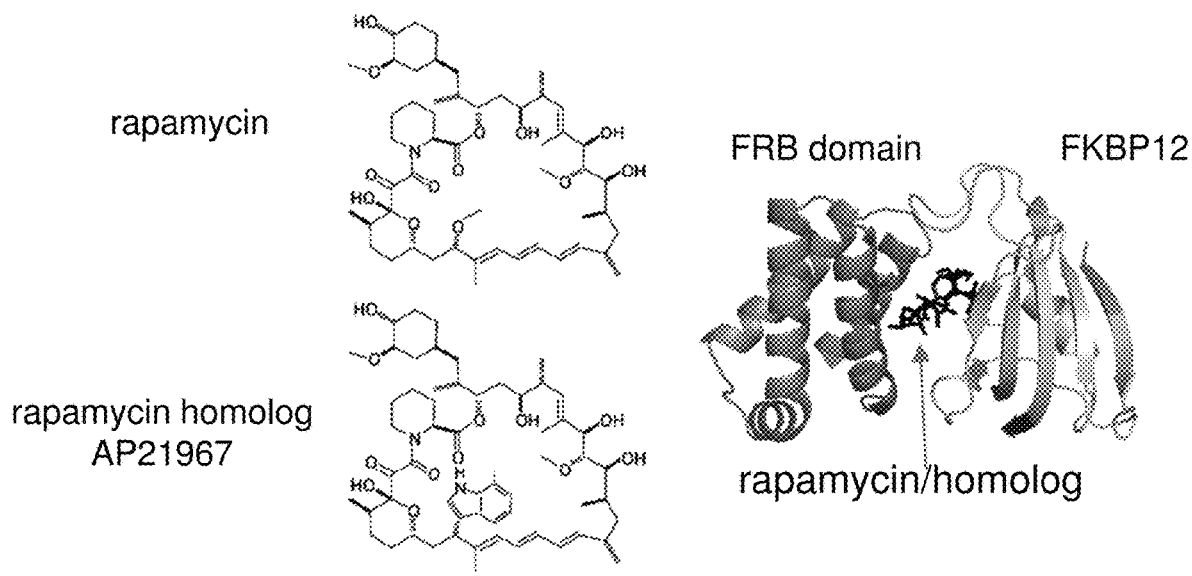
FIG. 18A is a graphic showing the binding interface of the FRB domain with rapamycin and FKBP12. A mutated FRB domain (FRB*; mTOR residue T2098L) is induced to form a FRB/FKBP12 heterodimer with either rapamycin or rapamycin homolog AP21967.
Figure 18B:
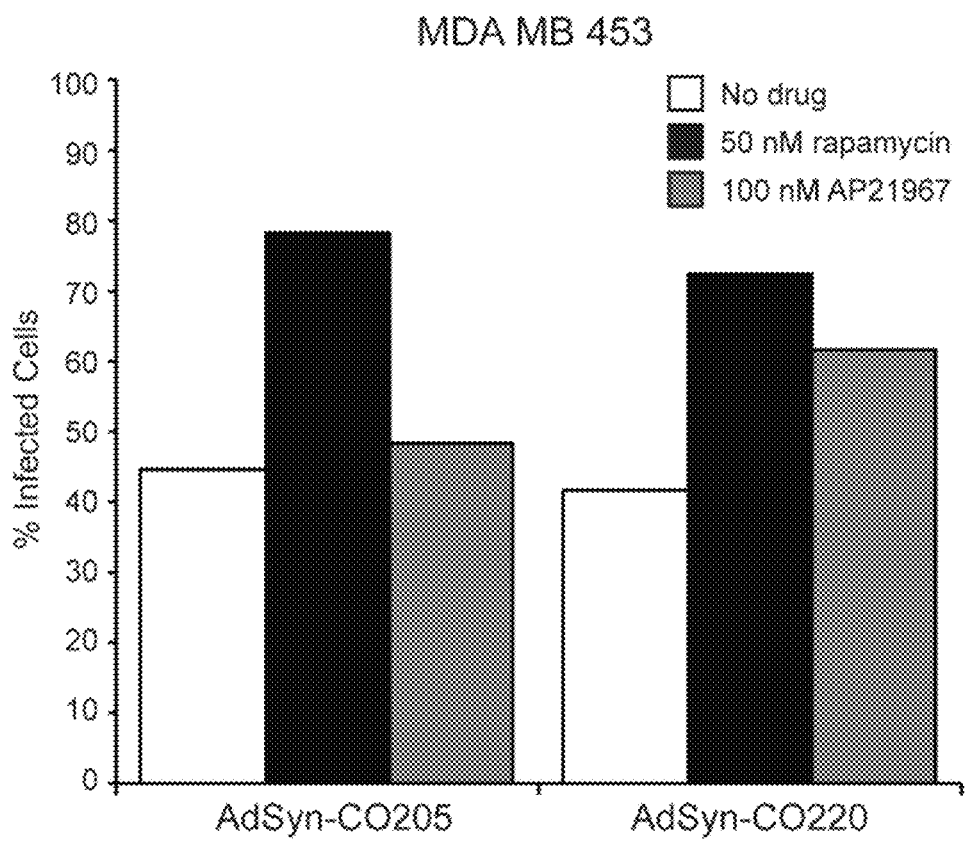
FIG. 18B is a graph showing that EGFR-targeted virus with FRB-fiber (AdSyn-CO205; SEQ ID NO: 88) has improved transduction of MDA MB 453 breast cancer cells in the presence of rapamycin, but not AP21967. The EGFR-targeted virus with the FRB*-fiber (AdSyn-CO220; SEQ ID NO: 98) has improved transduction of MDA MB 453 cells in the presence of either rapamycin or AP21967.
Figure 18C:
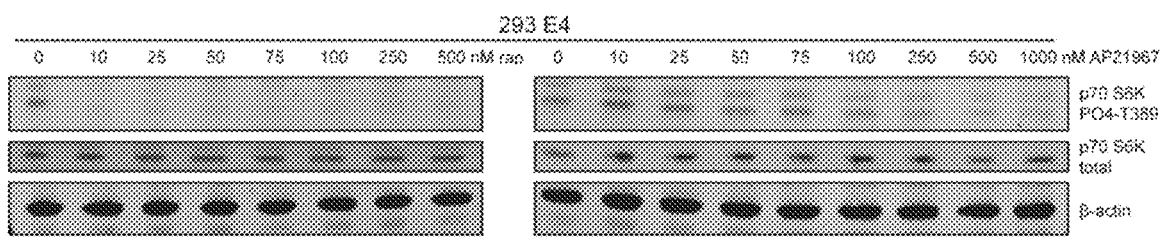
FIG. 18C is an immunoblot showing the activity of the mTOR inhibitor rapamycin blocking the phosphorylation of its target p70 S6K. The rapamycin homolog AP21967 does not inhibit mTOR at targeting concentrations.

FIG. 18A shows the binding interface of the FRB domain with rapamycin and FKBP12. FIG. 18B is a graph showing that EGFR-targeted virus with FRB-fiber (AdSyn-CO205; SEQ ID NO: 88) has improved transduction of MDA MB 453 breast cancer cells in the presence of rapamycin, but not AP21967, while the EGFR-targeted virus with the FRB*-fiber (AdSyn-CO220; SEQ ID NO: 98) has improved transduction of MDA MB 453 cells in the presence of either rapamycin or AP21967. FIG. 18C is an immunoblot showing the activity of the mTOR inhibitor rapamycin blocking the phosphorylation of its target p70 S6K. The rapamycin homolog AP21967 does not inhibit mTOR at targeting concentrations.

Figure 18D:
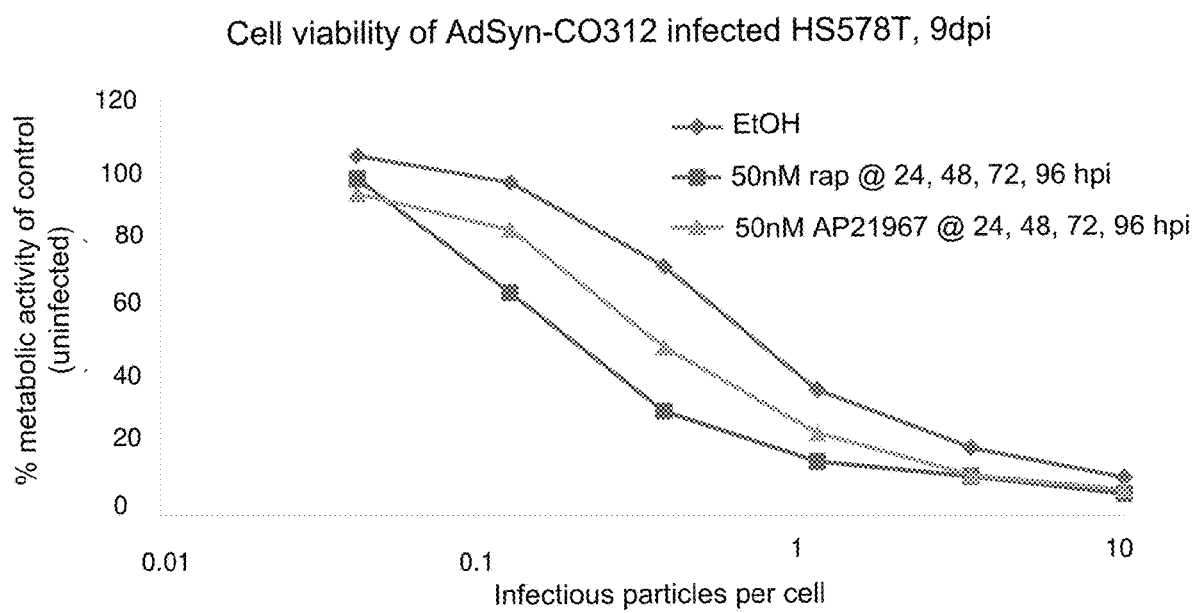
FIG. 18D is a graph showing the cell viability of infected HS578T metastatic breast cancer cells after 9 days of infection. Cells were infected with a serial dilution of AdSyn-CO312. At 24, 48, 72 and 96 hours after infection, fresh rapamycin or AP21967 was added to 50 nM. The metabolic activity was quantified by WST-1 assay, and was normalized to uninfected cells with a matching drug treatment. AdSyn-CO312 bears the oncolytic mutations of E1A ΔLXCXE, ΔE4orf6/7, ΔE3-RIDα/β, ΔE3-14.7k, and expresses the rapamycin- or AP21967-dependent EGFR-targeting genes EGFRVHH-FKBP and FRB*-fiber. There is enhanced killing of cells infected with the EGFR-targeted oncolytic virus that receive either rapamycin or AP21967 versus without targeting.
Figure 18E:
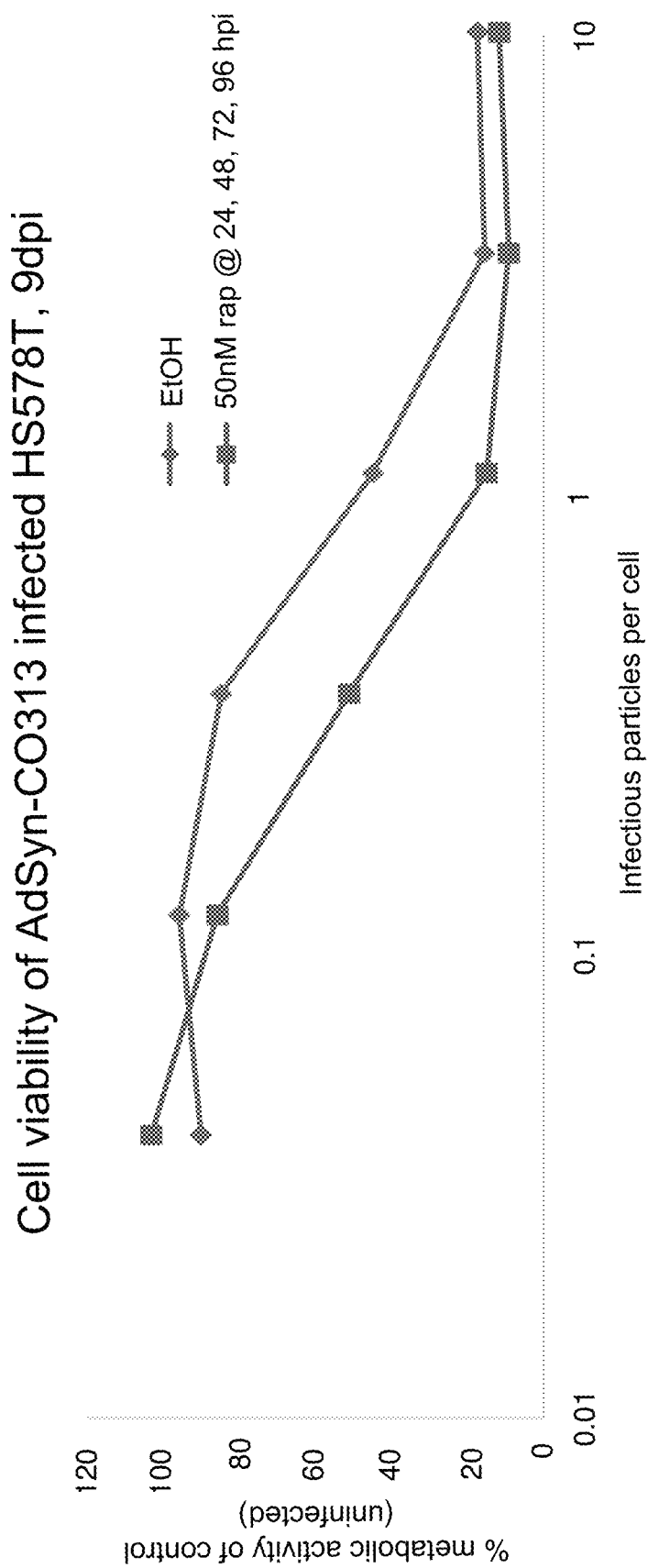
FIG. 18E is a graph showing the cell viability of infected HS578T metastatic breast cancer cells after 9 days of infection. Cells were infected with a serial dilution of AdSyn-CO313. At 24, 48, 72 and 96 hours after infection, fresh rapamycin was added to 50 nM. The metabolic activity was quantified by WST-1 assay, and was normalized to uninfected cells with a matching drug treatment. AdSyn-CO313 bears the oncolytic mutations of E1A ΔLXCXE, ΔE4orf6/7, ΔE3-RIDα/β, ΔE3-14.7k, and expresses the rapamycin-dependent EGFR-targeting gene EGFRVHH-FKBP and FRB-fiber. There is enhanced killing of cells infected with the EGFR-targeted oncolytic virus that receive rapamycin without targeting.

AdSyn-CO312 was tested in HS578T metastatic breast cancer cells. At 24, 48, 72 and 96 hours after infection, fresh rapamycin or AP21967 was added to 50 nM. The metabolic activity was quantified by WST-1 assay, and was normalized to uninfected cells with a matching drug treatment. As shown in FIG. 18D, infection with AdSyn-CO312 resulted in enhanced cell killing of cells infected with the EGFR-targeted oncolytic virus that receive either rapamycin or AP21967 compared to the absence of targeting. Cell viability of AdSyn-CO313-infected HS578T metastatic breast cancer cells after 9 days of infection is shown in FIG. 18E.

TABLE 2

Adenoviruses with Modifications in E1, L3, E3 and/or E4

| Virus Name (SEQ ID NO) | E1 | L3 | E3 | E4 |
|---|---|---|---|---|
| AdSyn-CO312 (25) | E1A ΔLXCXE | wt | ΔE3-RIDα/β, ΔE3-14.7k + EGFRVHH-FKBP FRB*-fiber | ΔE4orf6/7 |
| AdSyn-CO313 (26) | E1A ΔLXCXE | wt | ΔE3-RIDα/β, ΔE3-14.7k + EGFRVHH-FKBP FRB-fiber | ΔE4orf6/7 |
| AdSyn-CO199 (27) | ΔE1 + EF1α-luciferase | wt | wt | wt |
| AdSyn-CO200 (28) | ΔE1 + EF1α-luciferase-miR122 | wt | wt | wt |
| AdSyn-CO171 (29) | ΔE1 + EF1α-luciferase-miR122 | hexon E451Q | wt | wt |
| AdSyn-CO335 (30) | E1A ΔLXCXE | hexon E451Q | ΔE3-RIDα/β, ΔE3-14.7k + EGFRVHH-FKBP FRB*-fiber | ΔE4orf6/7 |
| AdSyn-CO442 (31) | E1A ΔLXCXE | hexon E451Q | FRB*-fiber | ΔE4orf6/7 |
| AdSyn-CO440 (68) | E1B-55k-P2A-Ypet | wt | ΔE3-RIDα/β, ΔE3-14.7k + EGFRVHH-GS-FKBP-P2A-ADP FRB-fiber | wt |

AdSyn-CO312, AdSyn-CO313 and AdSyn-CO335 are rapamycin- and/or rapalog (AP21967)-dependent EFGR-targeted viruses (see PCT Publication No. WO 2013/138505, which is herein incorporated by reference in its entirety, for a description of this targeting method). Each of these recombinant viruses include a deletion of the E3-RIDα/β and E3-14.7k coding sequences, and an insertion of an EGFRVHH-FKBP fusion protein and either FRB*-fiber (Ad5 fiber fused to mutant FRB, which can bind rapamycin or rapalog) or FRB-fiber (Ad5 fiber fused to wild-type FRB, which can bind only rapamycin). AdSyn- Cells were infected with a serial dilution of AdSyn-CO313. At 24, 48, 72 and 96 hours after infection, fresh rapamycin was added to 50 nM. The metabolic activity was quantified by WST-1 assay, and was normalized to uninfected cells with a matching drug treatment. AdSyn-CO313 bears the oncolytic mutations of E1A ΔLXCXE, ΔE4orf6/7, ΔE3-RIDα/β, ΔE3-14.7k, and expresses the rapamycin-dependent EGFR-targeting gene EGFRVHH-FKBP and FRB-fiber. There is enhanced killing of cells infected with the EGFR-targeted oncolytic virus that receive rapamycin without targeting.

AdSyn-CO313 was evaluated in mice with HS578T subcutaneous xenografts. Mice with established tumors received intratumoral injection of AdSyn-CO313, then subsequently received periodic intraperitoneal 8 mg/kg rapamycin injection (n=5) or vehicle control (n=4), or they received intratumoral vehicle control, then subsequently received periodic intraperitoneal 8 mg/kg rapamycin injection (n=5) or vehicle control (n=4). Infection was repeated in the same groups three more times every 4 days starting 19 days following the initial infection. As shown in FIG. 19, the tumors in mice receiving the EGFR-targeted oncolytic virus with rapamycin exhibited the best response.

AdSyn-CO335 is an oncolytic virus that features a capsid that avoids liver uptake by the hexon E451Q mutation, and can be targeted to infect cells via EGFR in the presence of rapamycin or rapalog AP21967. Oncolytic activity of AdSyn-CO335 was tested in vitro and in vivo. HS578T cells were infected with a serial dilution of AdSyn-CO335. At 24, 48, 72 and 96 hours after infection, fresh rapamycin or AP21967 was added to 50 nM. The metabolic activity was quantified by WST-1 assay, and was normalized to uninfected cells with a matching drug treatment. As shown in FIG. 20, there is enhanced killing of cells infected with the EGFR-targeted oncolytic virus that receive either rapamycin or AP21967, compared to infected cells without targeting. To evaluate AdSyn-CO335 in vivo, HS578T subcutaneous xenografts were established in mice. Mice with established tumors received three intratumoral injections every 4 days of AdSyn-CO335, then subsequently received intraperitoneal 2 or 8 mg/kg rapamycin injection (n=8 and n=8, respectively) every other following day or vehicle control (n=6) every other following day; or they received three intratumoral injections every 4 days of AdSyn-CO442, then subsequently received intraperitoneal 2 or 8 mg/kg rapamycin injection (n=6 and n=6, respectively) every other following day; or they received three intratumoral injections every 4 days of vehicle control, then subsequently received intraperitoneal 2 or 8 mg/kg rapamycin injection (n=6 and n=6, respectively) every other following day. As indicated in FIGS. 21A-21D, the tumors in mice receiving the EGFR-targeted oncolytic virus with 8 mg/kg rapamycin show the most significant response.

AdSyn-CO199, AdSyn-CO200 and AdSyn-CO171 are recombinant reporter viruses having a deletion of E1A and encoding luciferase drive by the EF1α promoter (EF1α-luciferase). AdSyn-CO200 and AdSyn-CO171 also include two binding sites for miR-122 (a liver specific microRNA) in the 3'-UTR of E1A, to inhibit viral gene expression in the liver. AdSyn-CO171 further encodes the liver detargeting E451Q mutation in the hexon protein.

FIGS. 22A-22C show the elimination of adenovirus mediated gene expression in the liver, and detargeting of adenovirus infection to the liver. AdSyn-CO199 expressed luciferase at high levels exclusively in the liver following systemic infection (FIG. 22A). As shown in FIG. 22B, the luciferase signal is lost when mice are systemically infected with AdSyn-CO200, a virus matching AdSyn-CO199, except that the liver-specific microRNA miR122 eliminates luciferase expression. As shown in FIG. 22C, expression of luciferase can be detected in the spleen when mice are systemically infected with AdSyn-CO171, a virus matching AdSyn-CO200, except that the adenovirus hexon protein bears the mutation E451Q, which detargets it from the liver. These data validate the use of this genomic module modification to prevent liver expression of Ad E1 genes and by definition replication in liver cells.

Example 3: Recombinant Adenoviruses Expressing Chimeric Fiber Proteins

This example describes recombinant adenoviruses expressing chimeric fiber proteins to direct infection to specific cell types.

Figure 23D:
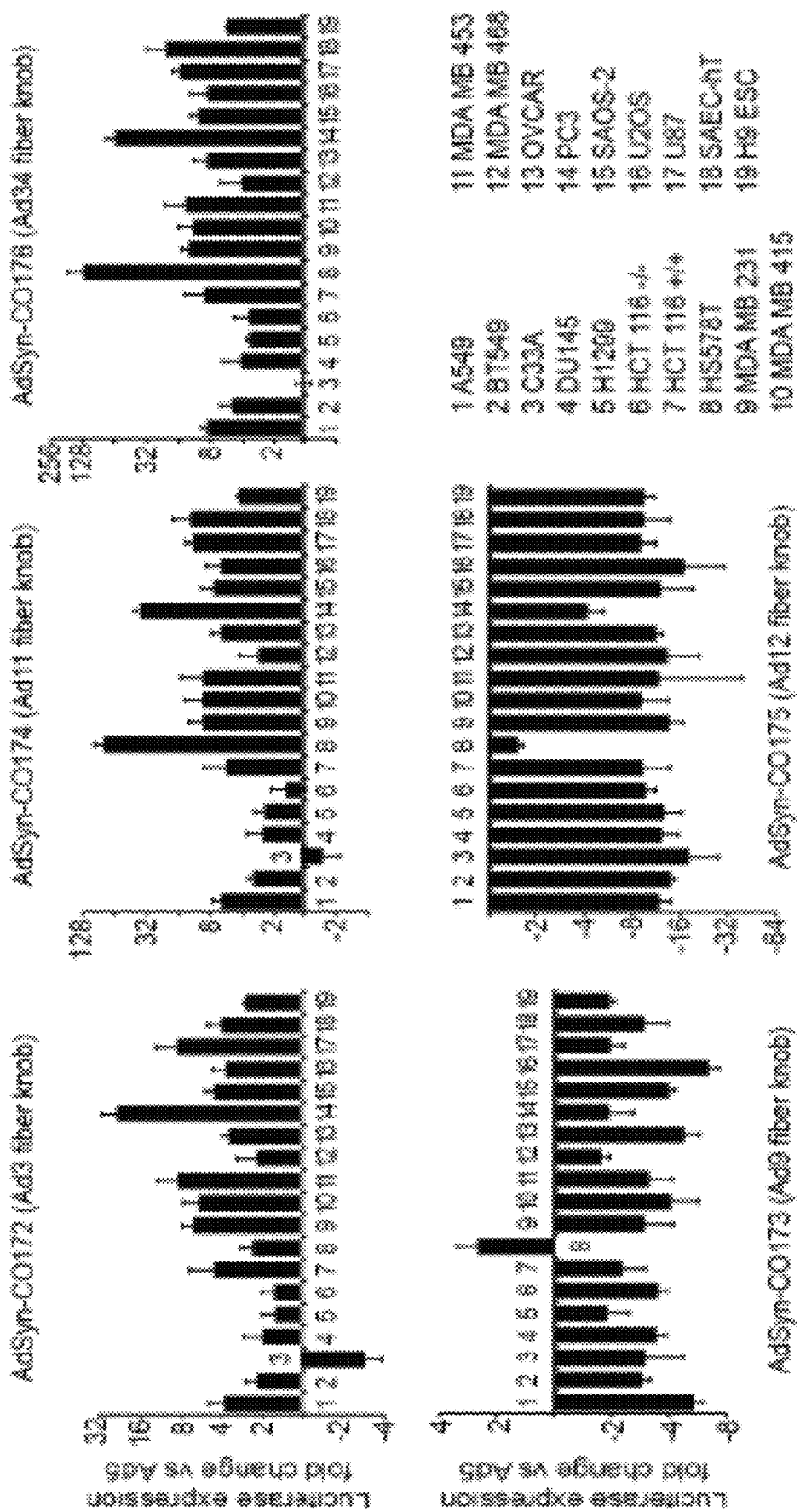
Figure 23E:
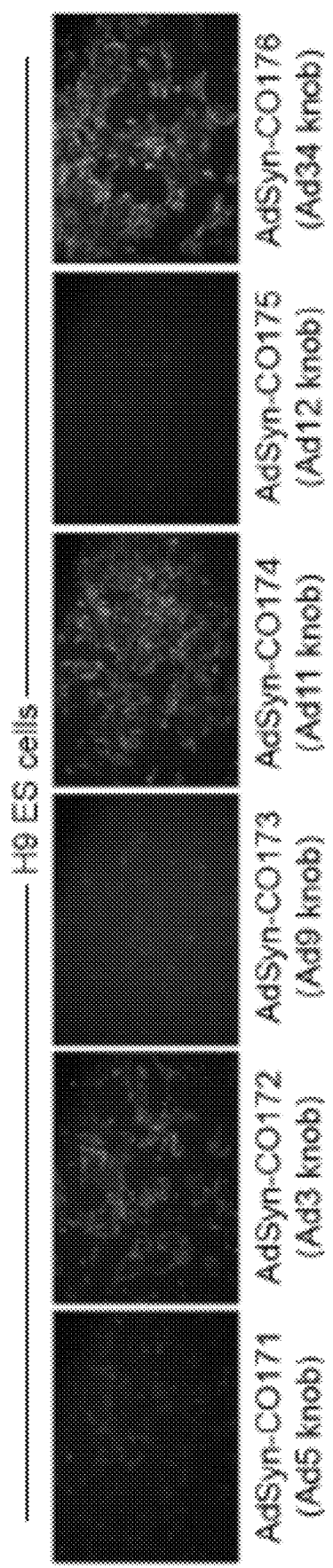

While the fiber proteins of Ad5 and many other serotypes have been shown to bind to the coxsackie adenovirus receptor (CAR) for cellular attachment, other serotypes have been shown to use CD46, desmoglein 2, sialic acid, or others. Since Adsembly/AdSLIC (see PCT Publication No. WO 2012/024351, incorporated herein by reference) allows for the rapid creation of chimeric viruses, an initial panel of six fiber chimeric viruses was generated in order to examine the alternate cellular targeting capabilities of various serotypes. Since the globular knob at the C-terminus of the fiber protein is typically responsible for receptor binding, chimeras were created by replacing the Ad5 fiber knob with fiber knob from Ad3, Ad9, Ad11, Ad12, or Ad34 (FIGS. 23A23C; Table 3). Each virus was created with the same E1 module containing an E1A/E1B deletion and a luciferase-GFP fusion driven by an EF1α promoter. The panel was used to transduce 17 different tumor cell lines, primary airway cells and the H9 stem cell line, and luciferase expression measured in each cell type (FIG. 23D). Compared to Ad5 fibers, significantly higher luciferase-GFP expression was observed in almost all cells when using chimeras with Ad3, Ad11 or Ad34 (FIGS. 23D and 23E). Conversely, luciferase-GFP expression was almost universally lower in cells transduced with the Ad9 or Ad12 fiber chimeras. These data demonstrate a powerful use of being able to combine modified parts from other serotypes in order to improve Ad5-based vectors and optimize recombinant viruses for entry into specific cell types.

TABLE 3

Recombinant Adenoviruses with Chimeric Fiber Proteins

| Virus Name (SEQ ID NO) | E1 | L3 | E3 | E4 |
|---|---|---|---|---|
| AdSyn-CO172 (69) | ΔE1 + EF1α-luciferase-miR122 | hexon E451Q | Ad3 knob fiber chimera | wt |
| AdSyn-CO173 (70) | ΔE1 + EF1α-luciferase-miR122 | hexon E451Q | Ad9 knob fiber chimera | wt |
| AdSyn-CO174 (71) | ΔE1 + EF1α-luciferase-miR122 | hexon E451Q | Ad11 knob fiber chimera | wt |
| AdSyn-CO175 (72) | ΔE1 + EF1α-luciferase-miR122 | hexon E451Q | Ad12 knob fiber chimera | wt |
| AdSyn-CO176 (73) | ΔE1 + EF1α-luciferase-miR122 | hexon E451Q | Ad34 knob fiber chimera | wt |

Example 4: Capsid-Swapped Recombinant Adenoviruses

This example describes module modifications to create capsid-swapped chimeric adenoviruses. The recombinant adenoviruses described in this example are designed to evade existing neutralizing antibodies.

Figure 24A:
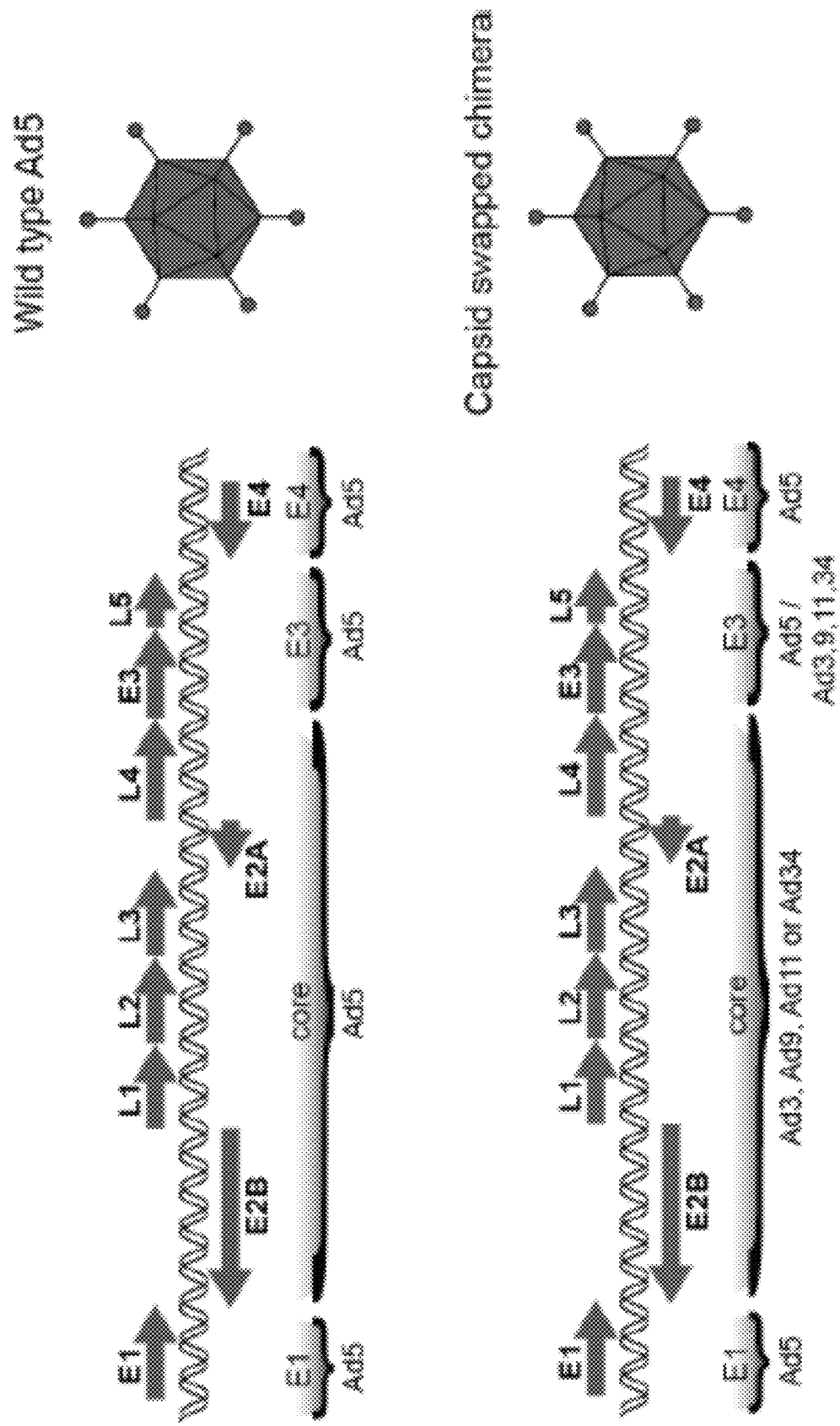
FIG. 24A is an illustration depicting module modifications to create capsid swapped chimeric viruses.
Figure 25A:
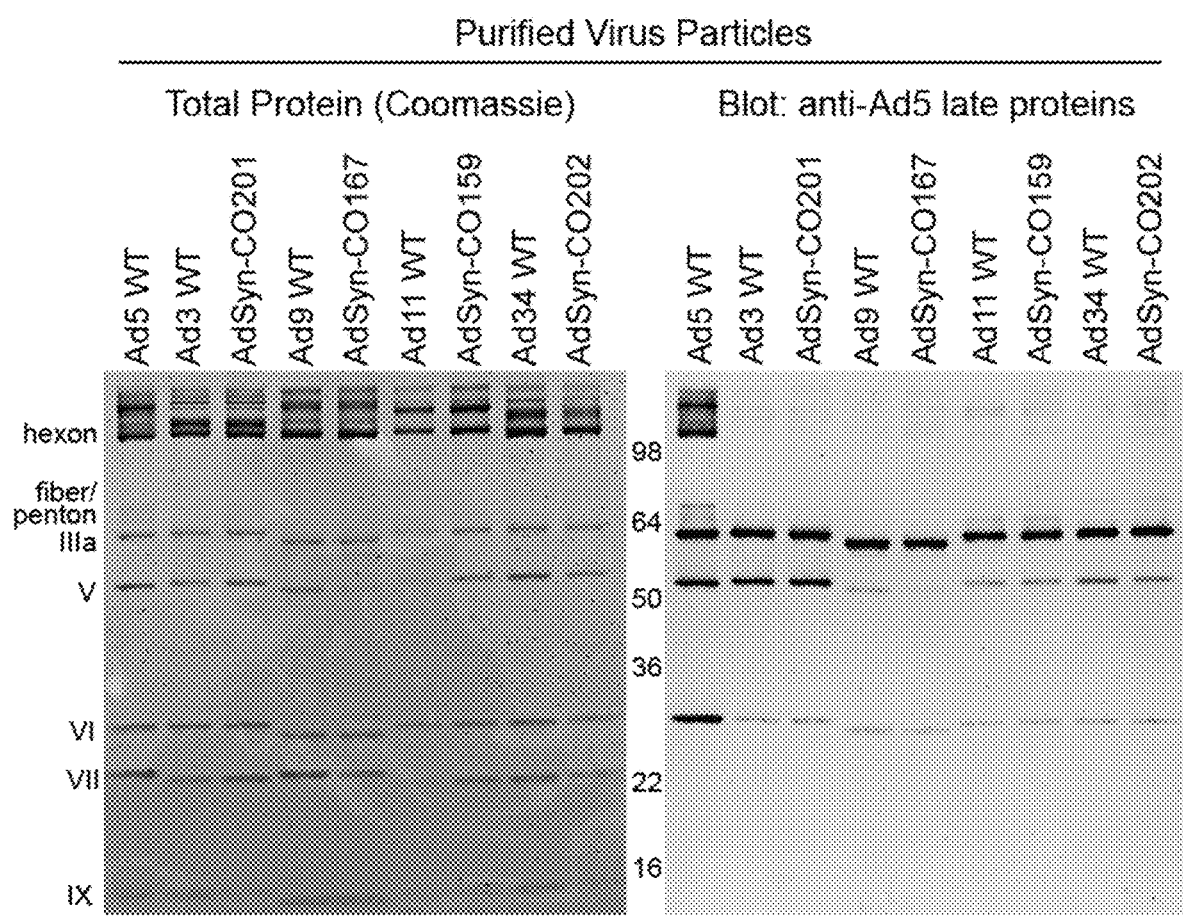
FIGS. 25A-25E are a series of immunoblots showing protein content and expression from capsid-swapped viruses.
Figure 25C:
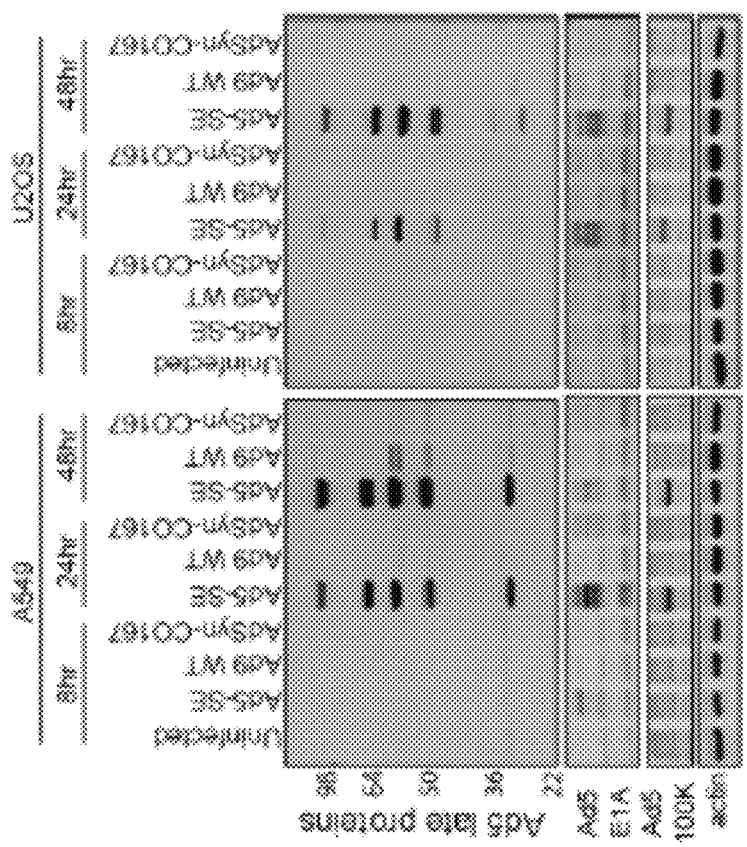
Figure 25B:
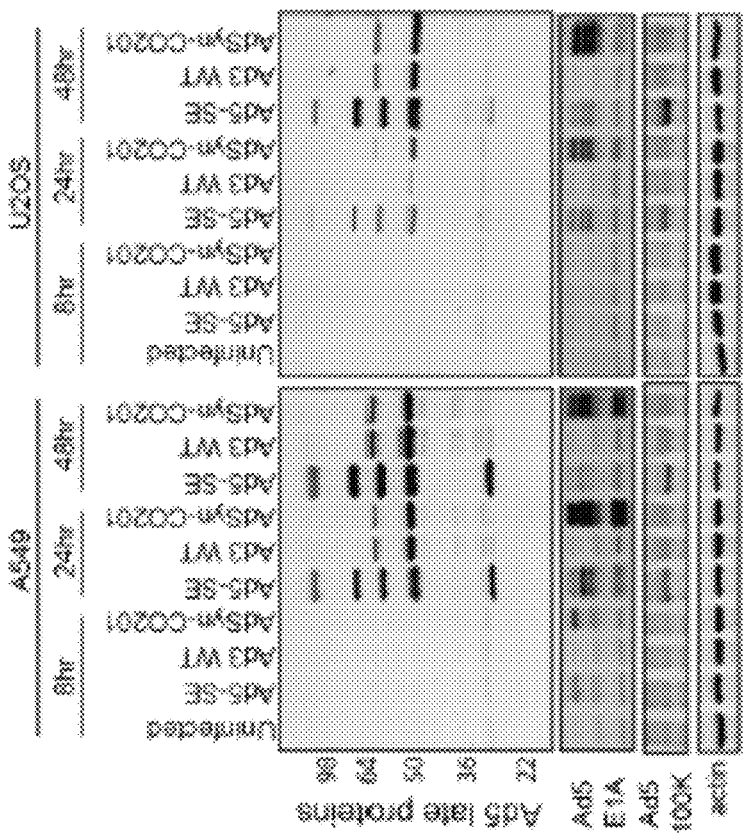
Figure 25E:
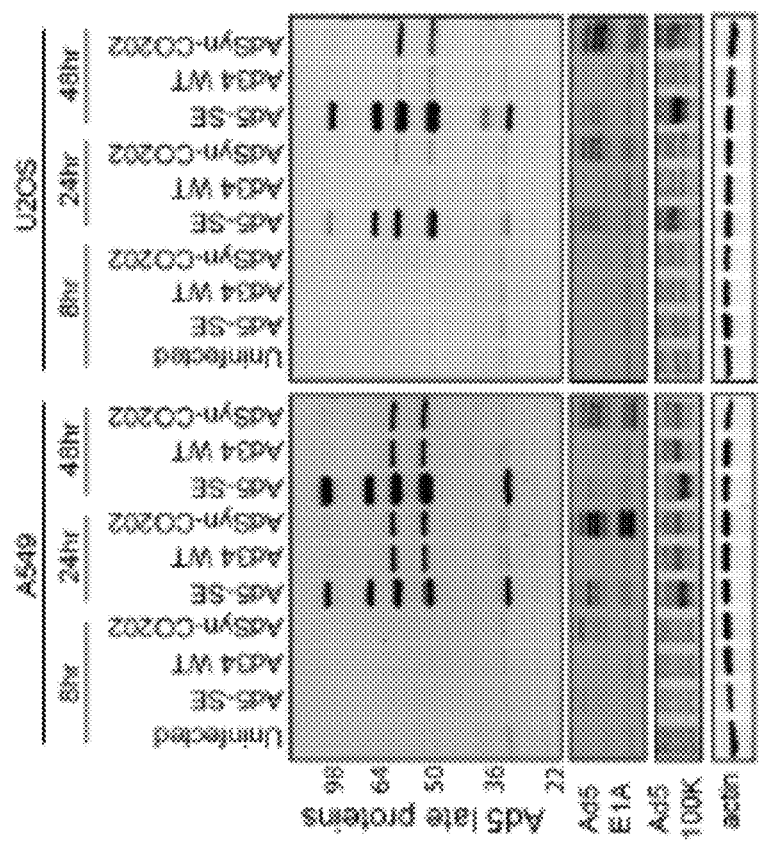
Figure 25D:
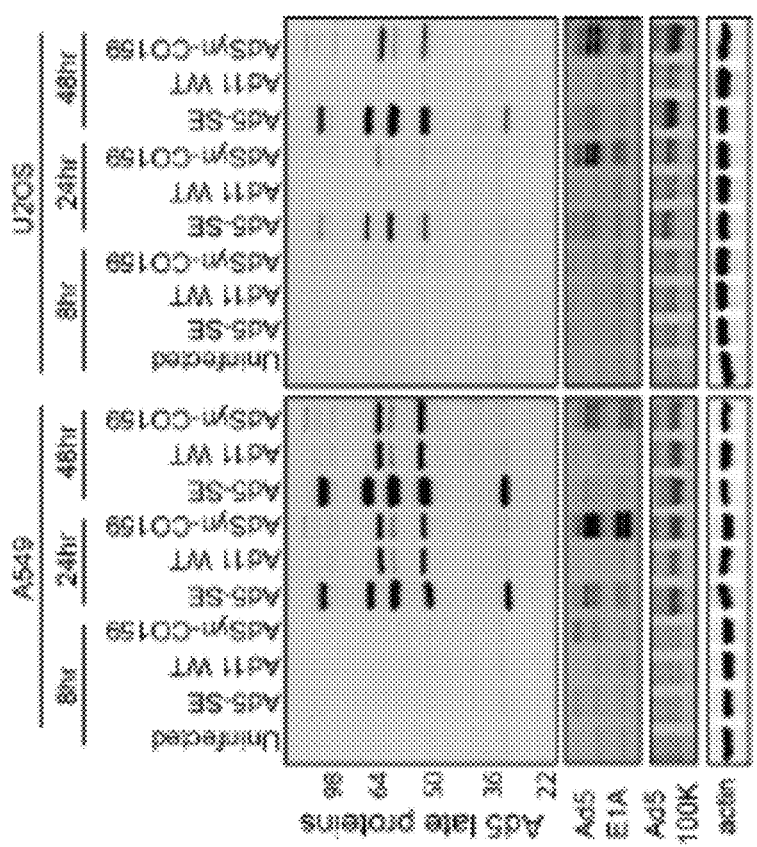

Ad5-based viruses that have complete 'capsid' module swaps (almost 60% of genome), which render them 'invisible' to pre-existing antibodies in human populations and enables repeated inoculations Adsembly/AdSLIC, were designed to take advantage of the modularity that exists in adenovirus genomes. The most robust test of this modularity would be in combining whole modules of one serotype with whole modules of another serotype. This possibility was examined by combining the E1, E3, and E4 modules of Ad5 with the core modules (i.e. E2B, L1, L2, L3, E2A and L4; see FIG. 24A) of other serotypes. This produces viruses that can evade neutralizing Ad5 antibodies, yet maintain the well characterized non-structural genes of Ad5 that are frequently mutated in creating oncolytic viruses. AdSLIC was used to generate viruses that contained a core module of either Ad3, Ad9, Ad11, Ad12, Ad34 or mouse adenovirus 1 (MAV-1) with the E1, E3, and E4 modules of Ad5 (FIG. 24B and Table 4). In addition, the Ad5 E1 module was altered to replace the pIX coding region of Ad5 with that from the matching core serotype; and the Ad5 E3 module was altered to replace the Uexon and fiber coding region with that from the matching core serotype. Thus, all of the capsid components were from one serotype while the E1, E3, and E4 regions of the genome were from Ad5. Four of the six chimeras that were created were able to produce viable virus in 293-E4 cells. Chimeras between Ad5 and Ad3, Ad9, Ad11, or Ad34 all replicated, while Ad5/Ad12 or Ad5/MAV-1 chimeras did not replicate even after being further modified to include the ITRs and packaging sequence (Ψ) of the core serotype (FIG. 24B). Thus, the ability to generate these "capsid-swapped" adenovirus chimeras varies depending on the serotype.

while slightly higher in U2OS cells (FIGS. 25B, 25D and 25E). Expression of E1A, which is derived from Ad5 in all viruses, was significantly higher than wild-type Ad5 in these three chimeras, possibly due to improved cell entry over Ad5 (FIGS. 25B, 25D and 25E and FIG. 23D). Conversely, the Ad5/Ad9 capsid swapped chimera showed poor gene expression at this MOI, slightly worse than wild-type Ad9 (for late proteins) and worse than wild-type Ad5 (for E1A) (FIG. 25C).

Figure 26A:
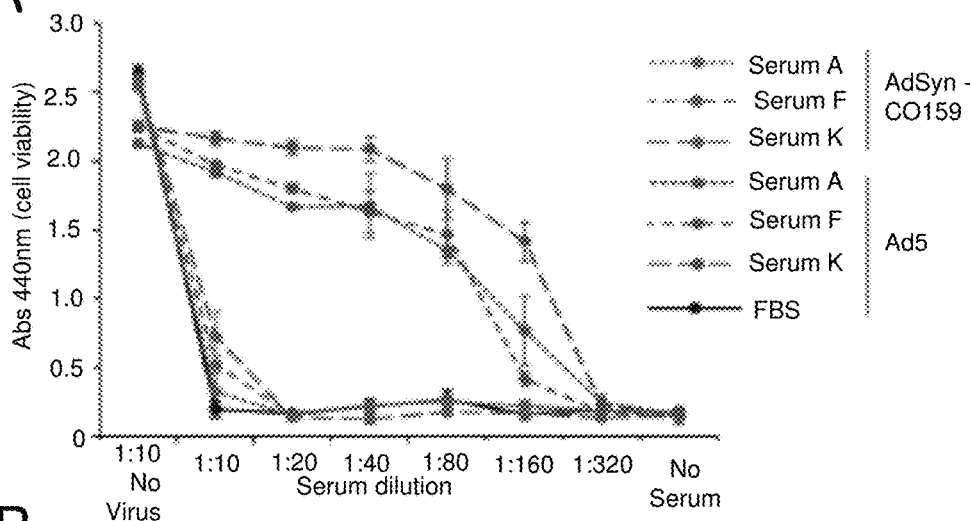
FIGS. 26A-26C are a series of graphs showing capsid-swapped viruses are not neutralized by human serum containing anti-Ad5 antibodies.
Figure 26B:
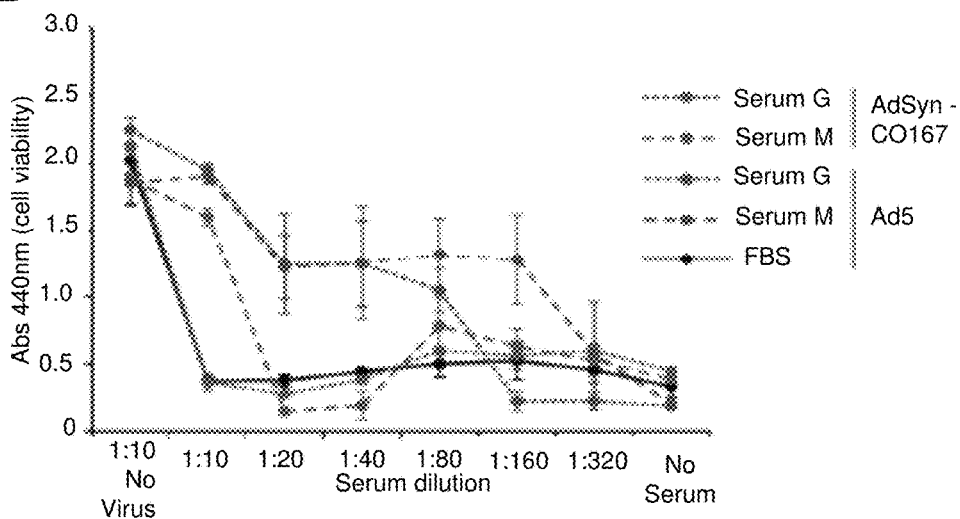
Figure 26C:
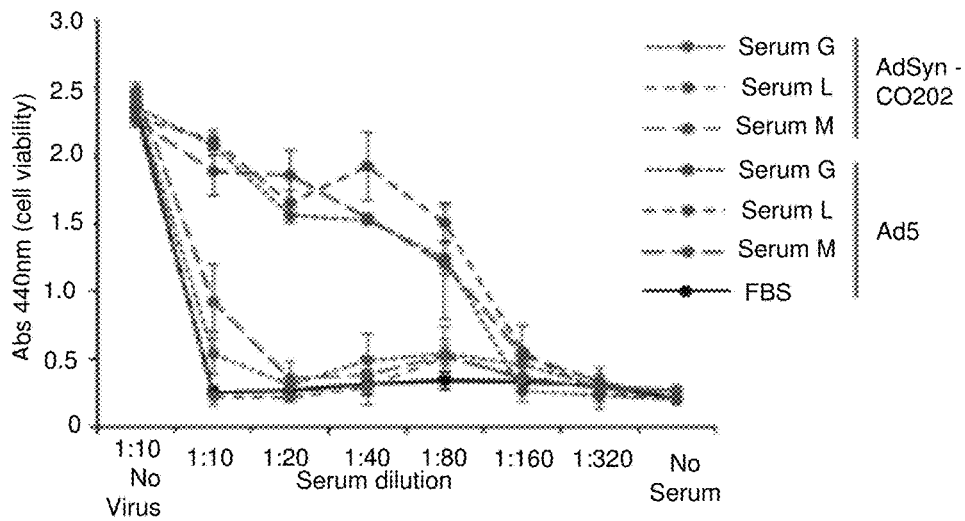

It was next tested whether capsid swapped chimeric viruses could avoid antibody neutralization in human serum samples that contain Ad5 neutralizing antibodies. Human serum samples were identified that were capable of neutralizing Ad5 killing of A549 cells, as measured using WST-1 cell viability assays. Upon incubation of these serum samples with either Ad5 or a capsid swapped chimera, cell killing by Ad5 was inhibited, while killing by capsid swapped viruses was not affected (FIGS. 26A-26C). These data demonstrate that capsid swapped chimeric viruses are capable of evading commonly found pre-existing Ad5 antibodies in human samples, and are able to replicate with expression of Ad5 non-structural components and non-Ad5 structural components. Thus, the natural modularity

TABLE 4

Recombinant Adenoviruses with Capsid Swaps

| Virus Name (SEQ ID NO) | E1 | Core | E3 | E4 |
|---|---|---|---|---|
| AdSyn-CO159 (74) | Ad11 pIX | All Ad11 | Ad11 Uexon and fiber | wt |
| AdSyn-CO159X (93) | Ad11 pIX E1A ΔLXCXE | All Ad11 | Ad11 Uexon and fiber | ΔE4orf6/7 |
| AdSyn-CO167 (75) | Ad9 pIX | All Ad9 | Ad9 Uexon and fiber | wt |
| AdSyn-CO167X (94) | Ad9 pIX E1A ΔLXCXE | All Ad9 | Ad9 Uexon and fiber | ΔE4orf6/7 |
| AdSyn-CO168 (76) | Ad12 pIX | All Ad12 | Ad12 Uexon and fiber | wt |
| AdSyn-CO201 (77) | Ad3 pIX | All Ad3 | Ad3 Uexon and fiber | wt |
| AdSyn-CO201X (95) | Ad3 pIX E1A ΔLXCXE | All Ad3 | Ad3 Uexon and fiber | ΔE4orf6/7 |
| AdSyn-CO202 (78) | Ad34 pIX | All Ad34 | Ad34 Uexon and fiber | wt |
| AdSyn-CO202X (96) | Ad34 pIX E1A ΔLXCXE | All Ad34 | Ad34 Uexon and fiber | ΔE4orf6/7 |
| AdSyn-CO185 (79) | MAV-1 pIX ΔE1 + CMV-GFP | All MAV-1 | MAV-1 Uexon and fiber | wt |
| AdSyn-CO254 (80) | Ad12 ITR/Ψ, Ad12 pIX | All Ad12 | Ad12 Uexon and fiber | Ad12 ITR |
| AdSyn-CO255 (81) | MAV-1 ITR/Ψ, MAV-1 pIX ΔE1 + CMV-GFP | All MAV-1 | MAV-1 Uexon and fiber | MAV-1 ITR |

The replication and gene expression of viable capsid swapped chimeric viruses was subsequently analyzed. Purified capsid swapped particles showed the same total protein content as the wild-type adenovirus serotype with matching core module (FIG. 25A). The hexon protein, the target of the majority of neutralizing antibodies, was not recognized in other serotypes or in the capsid swapped viruses by a polyclonal rabbit antisera generated against Ad5 particles (FIG. 25A). Other structural proteins found on the interior of the capsid such as V and VI did show some cross reactivity (FIG. 25A). Western blot analysis of infected cells showed that for the Ad5/Ad3, Ad5/Ad11, and Ad5/Ad34 chimeras, the expression of cross-reacting late proteins and 100K was equivalent to wild-type Ad3, Ad11, and Ad34 in A549 cells, observed within adenovirus genomes can be exploited using Adsembly/AdSLIC to create novel viruses with useful properties.

As discussed above, a significant percentage of the human population has pre-existing antibodies against Ad5 and some other common adenovirus serotypes. An analysis of 16 human serum samples demonstrated that 9 of 16 samples contained neutralizing antibodies against Ad5. Therefore, oncolytic viruses with capsid swaps to enable evasion of pre-existing neutralization antibodies were developed. Four recombinant, capsid-swapped adenoviruses were generated that include oncolytic mutations in E1A (ΔLXCXE) and E4 (ΔE4orf6/7). These mutations are the same oncolytic mutations present in AdSyn-CO181. AdSyn-CO 159X (SEQ ID NO: 93), AdSyn-CO-167X (SEQ ID NO: 94), AdSyn-CO201X (SEQ ID NO: 95) and AdSyn-CO202X (SEQ ID NO: 96) contain the structural proteins from Ad11, Ad9, Ad3 and Ad34, respectively.

Example 5: Recombinant Oncolytic Adenoviruses Combining Modified or Chimeric Fiber Proteins, or Capsid Mutations or Serotype Swaps This example describes additional recombinant adenoviruses with tumor selectivity, and/or expressing mutant or chimeric fiber proteins to direct infection to specific cell types, and/or capsid-modified or swapped chimeric adenoviruses designed to evade existing neutralizing antibodies. Exemplary recombinant viruses are listed in Table 5 and the genome sequences of these viruses are set forth as SEQ ID NOs: 82-87.

TABLE 5

Recombinant oncolytic adenoviruses combining modified or chimeric fiber proteins, or capsid mutations or serotype swaps

| Virus Name (SEQ ID NO) | E1 | Core | E3 | E4 |
|---|---|---|---|---|
| AdSyn-CO507 (82) | E1A ΔLXCXE | hexon E451Q | Ad34 knob fiber chimera | ΔE4orf6/7 |
| AdSyn-CO508 (83) | E1A ΔLXCXE | hexon E451Q | Ad11 knob fiber chimera | ΔE4orf6/7 |
| AdSyn-CO509 (84) | E1A ΔLXCXE | hexon E451Q | Ad37 knob fiber chimera | ΔE4orf6/7 |
| AdSyn-CO510 (85) | E1A ΔLXCXE/Ad34 pIX | all Ad34 | Ad34 Uexon and fiber | ΔE4orf6/7 |
| AdSyn-CO511 (86) | E1A ΔLXCXE | hexon E451Q/Penton RGE | ΔE3-RIDα/β, ΔE3-14.7k + EGFRVHH-FKBP FRB*-fiber | ΔE4orf6/7 |
| AdSyn-CO512 (87) | E1A ΔLXCXE | hexon E451Q/Penton RGE | RGD-4C in fiber HI loop | ΔE4orf6/7 |

The recombinant adenoviruses disclosed herein (see Tables 1-4) each bear modifications that can be advantageous for directing infection to specific cell types and to evade existing neutralizing antibodies. The E1 and E4 mutations described in Example 1 can be combined with other modules to enhance the efficacy of the oncolytic virus therapy.

Examples of recombinant oncolytic adenoviruses with E1, core, and E4 mutations together with chimeric fibers are AdSyn-CO507, AdSyn-CO508, and AdSyn-CO509, which use the knob domain of Ad34, Ad11, and Ad37 fiber proteins, respectively.

One example of a recombinant oncolytic adenovirus with E1 and E4 mutations together with an Ad34 capsid swap is AdSyn-CO510.

One example of a rapamycin/rapalog induced EGFR-targeted oncolytic adenovirus with E1, E3, and E4 mutations together with the capsid protein penton bearing a mutation in the integrin-binding RGD motif to RGE is AdSyn-CO511. This penton mutation has been shown to reduce uptake of the virus in the spleen and attenuates the antiviral inflammatory response.

One example of a recombinant oncolytic adenovirus with E1 and E4 mutations together with an insertion of an RGD peptide in the fiber protein is AdSyn-CO512. The RGD insertion in the fiber protein has been shown to dramatically increase infection to a wider variety of cell types, including vascular endothelial cells.

Example 6: Oncolytic Adenoviruses Derived from Ad5 and Other Adenovirus Serotypes The oncolytic adenoviruses disclosed herein (see Tables 1-5) were developed using Ad5 vectors. However, a number of genomic regions (and the protein encoded by these regions) that are important for adenoviral replication are highly conserved among adenovirus serotypes. Thus, the recombinant adenoviruses disclosed herein can be generated using genomic sequence from any desired adenovirus serotype. In particular, the E1A and E4orf6/7 proteins are conserved amongst all human species of adenovirus. FIG. 27 shows an alignment of E1A proteins from species A (Ad12, species B (Ad7), species C (Ad2 and Ad5), species D (Ad9), species E (Ad4), species F (Ad40) and species G (Ad52) adenovirus. Similarly, FIG. 28 shows an alignment of E4orf6/7 proteins from species A (Ad12, species B (Ad7), species C (Ad2 and Ad5), species D (Ad9), species E (Ad4) and species G (Ad52) adenovirus. Using the sequences shown in FIGS. 27 and 28, or any other adenovirus sequences available in public databases, one could readily use E1A and/or E4orf6/7 sequences from any adenovirus serotype in the generation of an oncolytic adenovirus.

Example 7: Characterization of Recombinant Adenovirus Bearing EGFR-Targeting Components This example describes a synthetic adenovirus targeted to cells expressing EGFR and confirms that the recombinant virus is not replication impaired in 293-E4 cells as a result of the modifications. The following synthetic adenoviruses were generated and used in this study:

AdSyn-CO170 (SEQ ID NO: 91)

A wildtype adenovirus constructed using "Adsembly," a multisite Gateway® LR recombination reaction from adenovirus genome modules. Three recombination sites remain in the genome between the adenovirus modules—an attB4 recombination site between the E1B-55K and pIX genes; an attB5 site between the L4-33K and pVIII genes; and an attB3 site between the Fiber and E4 gene. This recombinant adenovirus served as a control virus.

AdSyn-CO205 (SEQ ID NO: 88)

A recombinant adenovirus created by Adsembly that corresponds to AdSyn-CO170, but with additional features that enable rapamycin-dependent targeting to infect cells that express EGFR. A sequence encoding the FRB domain from mTOR is inserted into the HI loop in the knob domain of adenovirus fiber. The E3-RIDα, E3-RIDβ, and E3-14.7K genes were deleted, and replaced with a gene encoding an EGFR-binding single-domain antibody (EGFRVHH) fused to FKBP12. In the presence of rapamycin, the soluble EGFRVHH-FKBP fusion protein forms a heterodimer with the FRB domain in the fiber, and allows mature adenovirus particles to bind to EGFR on new cells and infect via this new receptor.

AdSyn-CO206 (SEQ ID NO: 89)

This recombinant adenovirus is identical to AdSyn-CO205, except it has a wildtype fiber, and therefore lacks the FRB domain. This virus features the deletion of the E3-RIDα, E3-RIDβ, and E3-14.7K genes, and replacement with a gene encoding an EGFR-binding single-domain antibody (EGFRVHH) fused to FKBP12, as described for AdSyn-CO205.

AdSyn-CO207 (SEQ ID NO: 90)

This recombinant adenovirus is identical to AdSyn-CO205, except it has a wildtype E3 region, and therefore lacks the EGFRVHH-FKBP fusion. It features the FRB insertion in the fiber, as described for AdSyn-CO205.

AdSyn-CO220 (SEQ ID NO: 98)

This recombinant adenovirus is identical to AdSyn-CO205, except it bears the T2098L mutation in the FRB domain (FRB*), which enables EGFR-targeting with rapamycin or AP21967.

The rapamycin-controlled EGFR-targeted virus AdSyn-CO205, contains a GFP reporter fused to E1A as a marker for infection. The E3B transcript was modified by deleting RIDα, RIDβ, and 14.7k, and used to express EGFRVHH-FKBP. AdSyn-CO206 has all the modifications of AdSyn-CO205, but retains a wildtype fiber, and therefore does not have an FRB domain. AdSyn-CO207 has all the modifications of AdSyn-CO206, but retains a wildtype E3 region, and therefore does not have the FKBP-fusion gene.

Figure 29:
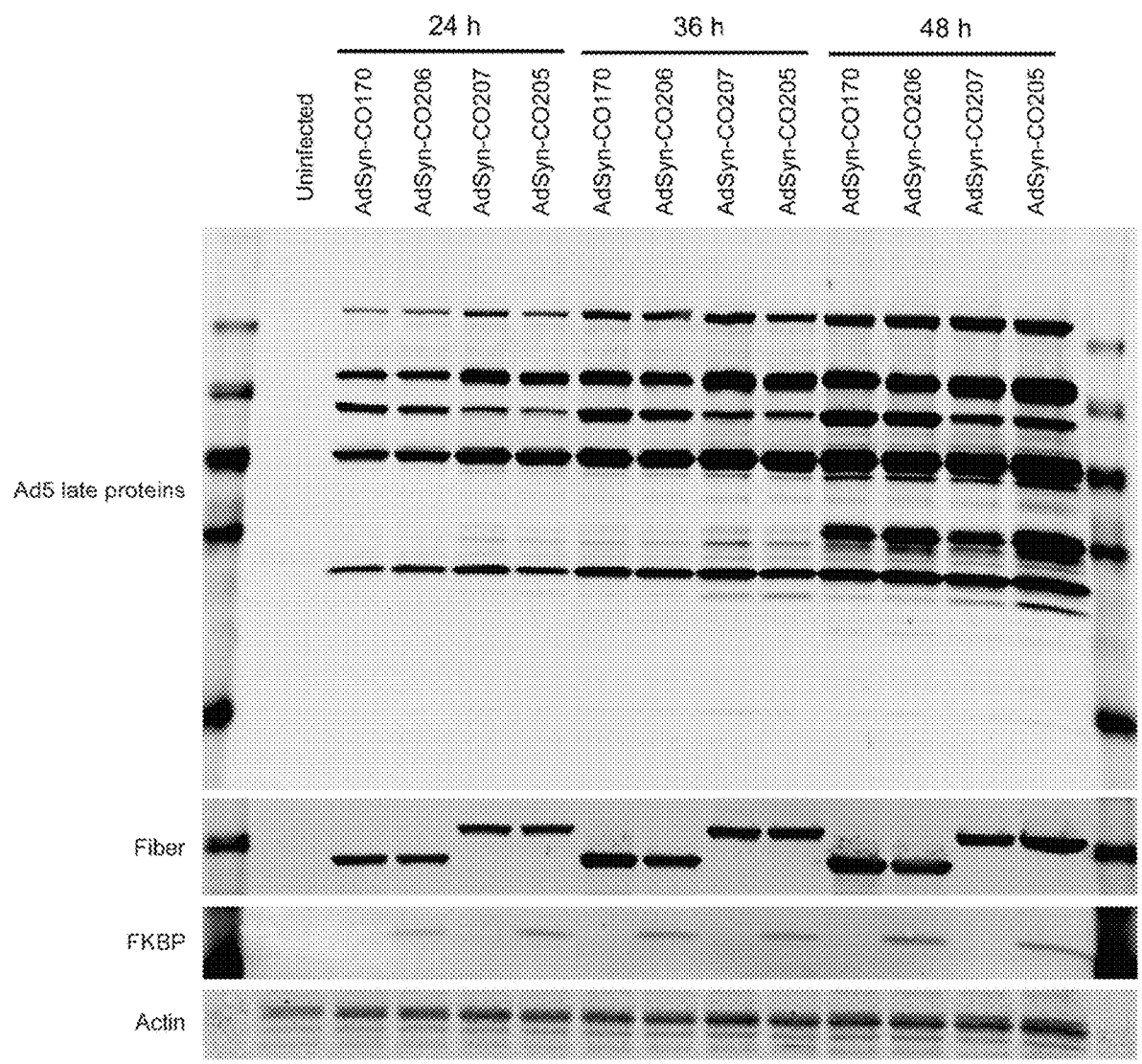
FIG. 29 shows an immunoblot of protein expression from 293-E4 cells infected with synthetic adenoviruses bearing rapamycin-dependent EGFR-targeting components. 293-E4 cells were infected with a multiplicity of infection (MOI) of 10 by either Assembly wildtype Ad (AdSyn-CO170), the targeting-modified AdSyn-CO205, or control viruses AdSyn-CO206 or AdSyn-CO207. For the rapamycin-controlled EGFR-targeted virus AdSyn-CO205, a GFP reporter was fused to E1A as a marker for infection. The E3B transcript was modified by deleting RIDα, RIDβ, and 14.7k, and used to express EGFRVHH-FKBP. AdSyn-CO206 contains all the modifications of AdSyn-CO205, but retains a wildtype fiber, and therefore does not have an FRB domain. AdSyn-CO207 has all the modifications of AdSyn-CO206, but retains a wildtype E3 region, and therefore does not have the FKBP-fusion gene. The change in migration for fiber shows the 90 amino acid FRB domain insertion in AdSyn-CO207 and AdSyn-CO205. The expression of the EGFRVHH-FKBP fusion protein was detected by probing for FKBP12. The timecourse of late protein expression shows that there is no pronounced defect in replication of the capsid-mutant, or EGFRVHH-FKBP expressing viruses with GFP-E1A reporters compared to Assembly wildtype Ad.

To evaluate Ad5 late protein expression by the recombinant viruses, 293-E4 cells were infected with "wildtype" control virus AdSyn-CO170, the rapamycin-dependent EGFR-targeting modified virus AdSyn-CO205, or control viruses AdSyn-CO206 or AdSyn-CO207 at an MOI of 10. FIG. 29 shows an immunoblot of protein expression from lysates of the infected 293-E4 cells. The change in migration for fiber shows the 90 amino acid FRB domain insertion in AdSyn-CO207 and AdSyn-CO205. The expression of the EGFRVHH-FKBP fusion protein was detected by probing for FKBP12. The timecourse of late protein expression shows that there is no pronounced defect in replication of the capsid-mutant, or EGFRVHH-FKBP expressing viruses with GFP-E1A reporters compared to Adsembly wildtype AdSyn-CO170.

Example 8: Rapamycin-Induced EGFR-Targeting of AdSyn-CO335 Increases Efficacy of Oncolytic Therapy of HS578T Xenografts in Mice This example describes the finding that rapamycin-dependent EGFR retargeting of recombinant adenovirus significantly reduces tumor volume of EGFR-expressing tumor xenografts.

Mice and Tumors

HS578T (ATCC-HTB-126; American Type Culture Collection, Manassas, CA) breast cancer cells were cultured as recommended by the supplier. Female 5-week-old athymic mice (J:NU #007850; The Jackson Laboratory, Bar Harbor, ME) were housed under approved protocols. Xenografts were initiated by subcutaneously injecting HS578T cells (5E6 cells suspended in 0.2 ml of BD Matrigel Matrix; BD Biosciences, Bedford, MA) into the left and right flank under anesthesia (Isoflurane).

Two perpendicular tumor diameters (l and w) were measured weekly to follow tumor progression. Tumor volumes were calculated by use of the modified ellipsoid formula where vol=½ (l*w$^2$) (Euhus et al., *J Surg Oncol* 31(4):229-2341986; Tomayko et al., *Cancer Chemother Pharmacol* 24(3):148-154, 1989).

Two months after implantation, 48 mice with 86 tumors with a volume of 270±17 mm$^3$ (mean±SEM) were included in the study and randomized into treatment groups with similar mean-sized tumors (n=6 to 8). Not all injections of HS578T successfully established tumors. On days 0, 3, and 6, mice were injected intratumorally with 2×10$^8$ PFU of adenovirus diluted in 50 µl PBS. AdSyn-CO335 is an oncolytic adenovirus that expresses a fiber protein with an inserted FRB sequence and expresses FKBP fused to a nanobody which recognizes EGFR (EGFRVHH). AdSyn-CO442 has all the features of AdSyn-CO335, but does not express EGFRVHH. Rapamycin (Lot ASC-127; LC Laboratories, Woburn, MA) diluted in 100 µL 5% Tween 80/5% PEG400 was administered by intraperitoneal injection on days 1, 4, 7, and every other day thereafter at either 2 or 8 mg/kg dosages. Body weight was monitored for toxicity, and tumor sizes were measured while blinded to treatment groups. Mice were sacrificed if tumors were greater than 20 mm in any dimension or showing other signs of significant tumor burden.

Statistical Analysis

Statistical analyses were performed using R Statistical Software 3.2.0 (The R Foundation, Vienna, Austria) with guidance from the NIST/SEMATECH e-Handbook of Statistical Methods. Outliers were identified using the extreme studentized deviate procedure with 95% confidence interval, assuming normal distribution verified visually by a Q-Q plot. Analysis of variance (ANOVA) was used to test for significant differences between mean tumor volumes of treatment groups at each time point data was collected.

Results

Figure 30:
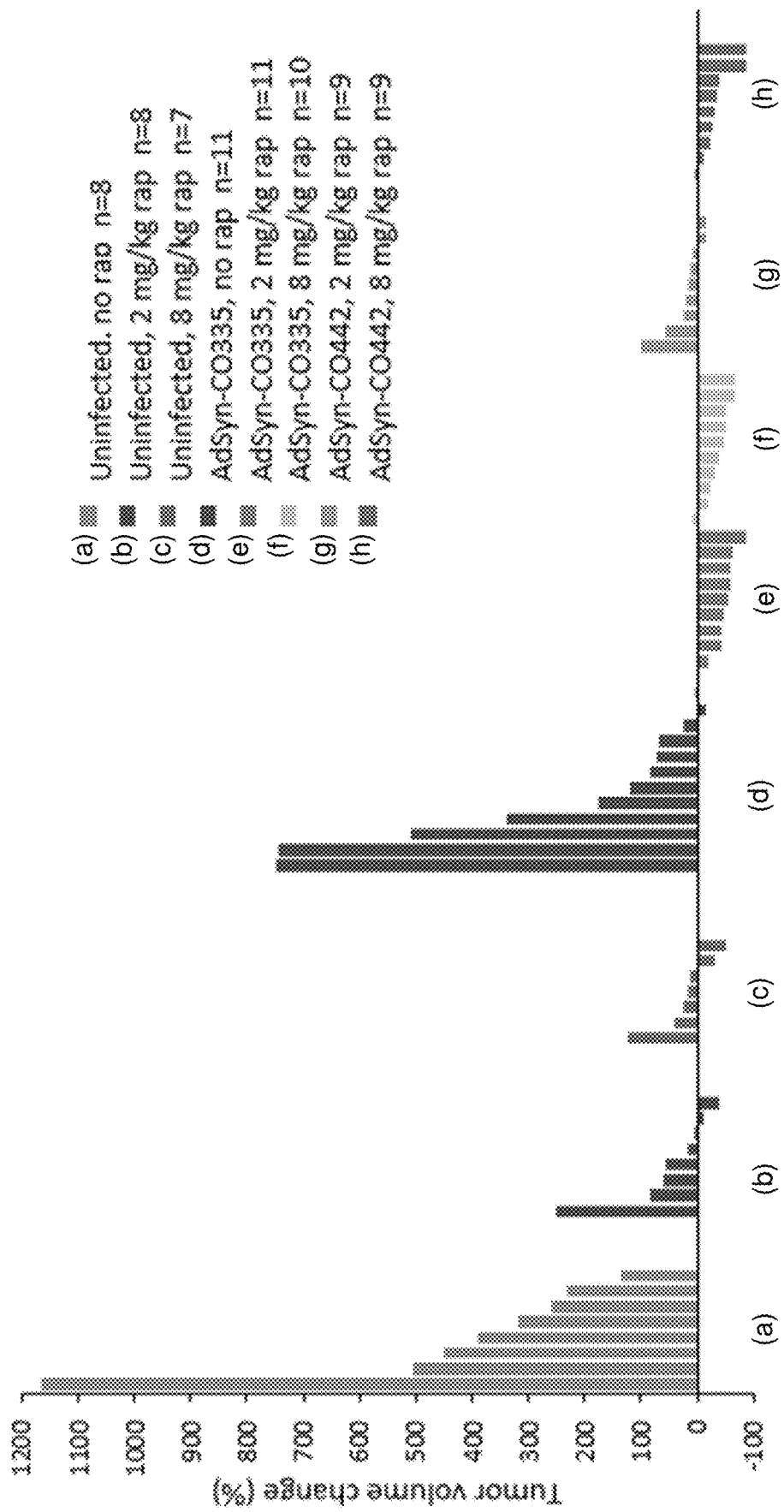
FIG. 30 is a waterfall plot showing HS578T xenograft tumor response 28 days after three intratumoral injections of vehicle (uninfected), control virus (AdSyn-CO442), or oncolytic adenovirus (AdSyn-CO335), and 3 weeks of intraperitoneal co-administration of rapamycin (0, 2 or 8 mg/kg) every other day. Shown from left to right are (a) uninfected, no rapamycin; (b) uninfected, 2 mg/kg rapamycin; (c) uninfected, 8 mg/kg rapamycin; (d) AdSyn-CO335, no rapamycin; (e) AdSyn-CO335, 2 mg/kg rapamycin; (f) AdSyn-CO335, 8 mg/kg rapamycin; (g) AdSyn-CO442, 2 mg/kg rapamycin; and (h) AdSyn-CO442, 8 mg/kg rapamycin. N=number of tumors in each group. Each column represents one individual tumor, with data expressed relative to its pre-treatment tumor volume.

To test the efficacy of the targeted delivery of adenovirus progeny via EGFR to treat tumors in vivo, subcutaneous HS578T xenografts were established on both flanks of nu/nu mice. When tumors reached 264±16 mm$^3$ (mean±SEM), mice were randomized into treatment groups with similar mean-sized tumors. Mice received intratumoral injections of mock (vehicle only), AdSyn-CO335, or AdSyn-CO442. AdSyn-CO442 is a control virus which bears the features of AdSyn-CO335, but does not express EGFRVHH-FKBP. Rapamycin (rap) was co-administered every other day during the course of therapy to enable EGFR-targeting of virus progeny. The results are shown in FIG. 30.

With mock treatment (n=8 tumors) and no rapamycin, tumors grew unchecked, with a mean tumor volume of 1300±448 mm$^3$ at 28 days after the start of mock treatment, after which mice were sacrificed due to large tumor dimensions. For comparison, data described below are from this time point in the therapy.

A dose of 8 mg/kg rapamycin every other day in combination with adenovirus administration was tested first, but the high rapamycin concentration masked the effect of the virus infection. The 8 mg/kg rapamycin administration alone (no virus infection) was sufficient to slow the tumor growth compared to no treatment (P=4.50×10$^{-2}$), resulting in a mean tumor volume of 229±49 mm$^3$. Administration of 2 mg/kg rapamycin alone (n=8) was not sufficient to block the growth of the tumors (P=0.144).

Oncolytic AdSyn-CO335 alone (n=11) did not significantly affect the rate of tumor growth compared to no treatment, resulting in a mean tumor volume of 948±207 mm³. This is likely due to the limitation of HS578T infection by untargeted AdSyn-CO335 progeny. When both AdSyn-CO335 and 2 mg/kg rapamycin were co-administered (n=11), there was a dramatic and significant reduction in tumor volume when compared to virus alone (P=$8.54 \times 10^{-4}$) or 2 mg/kg rapamycin (P=$1.49 \times 10^{-2}$) treatment alone, resulting in a reduced mean tumor volume of 133±22 mm³. These data suggest this reduction in tumor volume is dependent on the rapamycin-induced EGFR-targeting of virus progeny, since treatment with 2 mg/kg rapamycin and the control virus AdSyn-CO442 (n=9) resulted in a mean tumor volume of 401±89 mm³, which did not bear significant (P=0.449) difference in mean tumor volume compared to 2 mg/kg rapamycin treatment alone, and resulted in significantly (P=$4.92 \times 10^{-3}$) larger tumors than the co-administration of 2 mg/kg rapamycin and AdSyn-CO335.

Significant differences between the 2 mg/kg rapamycin treatment and co-administration of 2 mg/kg rapamycin and AdSyn-CO335 were measured as early as 14 days after the start of treatment (P=$2.25 \times 10^{-2}$). At this time point, the rapamycin-treated tumors infected with AdSyn-CO442 were measurably outgrowing the AdSyn-CO335-infected tumors (P=$1.54 \times 10^{-2}$).

Figure 31:
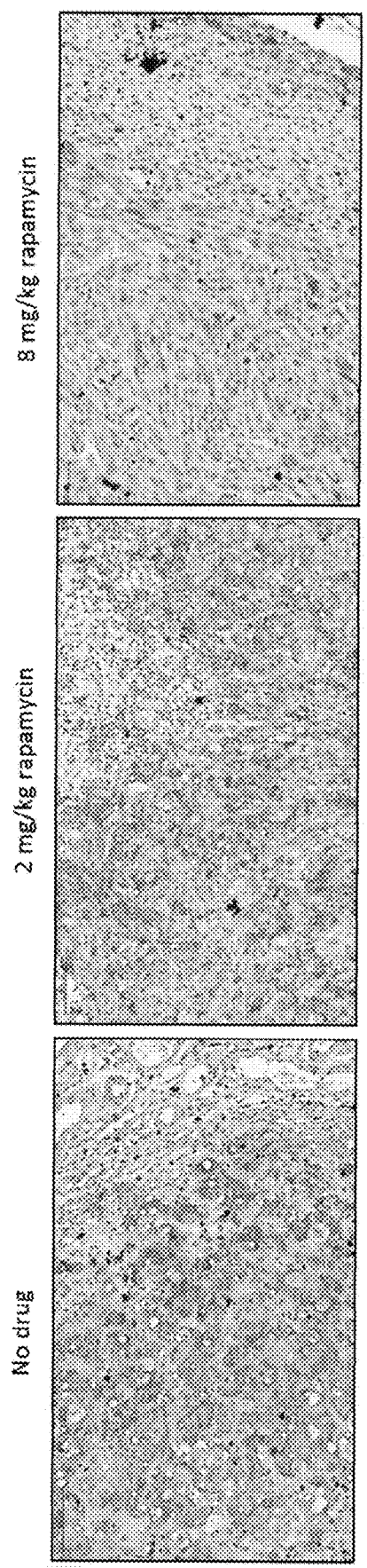
FIG. 31 shows immunohistochemistry (IHC) staining of HS578T xenograft tissue. Mice with subcutaneous HS578T xenograft tumors were treated by intraperitoneal injection of 100 μL vehicle, 2 mg/kg rapamycin or 8 mg/kg rapamycin. One hour following injection, xenograft tissues were collected, fixed in 10% formalin, and sectioned for IHC staining with an antibody that recognizes the phospho-T378 form of P70S6K. Shown are micropictographs of HS578T xenograft tissue sections stained for P70S6K phosphorylated at threonine 389 (P70S6K p-T389). The phosphorylation of P70S6K at T389 is a hallmark of mTOR activity. In the tissues with no treatment or with the low, adenovirus EGFR-targeting effective dose (2 mg/kg), mTOR activity is not inhibited, as evidenced by the staining of P70S6K p-T389. At the higher adenovirus EGFR-targeting effective dose (8 mg/kg) mTOR activity is inhibited, marked by a loss of P70S6K p-T389 staining.

A study was conducted to evaluate whether the doses of rapamycin that are sufficient for adenovirus retargeting are also immunosuppressive. Mice with subcutaneous HS578T xenograft tumors were treated by intraperitoneal injection of 100 μL vehicle, 2 mg/kg rapamycin or 8 mg/kg rapamycin. One hour following injection, xenograft tissues were collected, fixed in 10% formalin, and sectioned for IHC staining with an antibody that recognizes the phospho-T378 form of P70S6K. Shown in FIG. 31 are micropictographs of HS578T xenograft tissue sections stained for P70S6K phosphorylated at threonine 389 (P70S6K p-T389). The phosphorylation of P70S6K at T389 is a hallmark of mTOR activity. In the tissues with no treatment or with the low, adenovirus EGFR-targeting effective dose (2 mg/kg), mTOR activity is not inhibited, as evidenced by the staining of P70S6K p-T389. At the higher adenovirus EGFR-targeting effective dose (8 mg/kg) mTOR activity is inhibited, marked by a loss of P70S6K p-T389 staining. These results demonstrate that the dose of rapamycin that is sufficient for EGFR-targeting of recombinant adenovirus in vivo does not inhibit mTOR (and therefore is not substantially immunosuppressive).

Example 9: Recombinant Oncolytic Adenoviruses with an Ad34 Capsid

AdSyn-CO335B-K (SEQ ID NO: 92), an adenovirus constructed by AdSLIC, is identical to AdSyn-CO335 (SEQ ID NO: 30), except all structural proteins of Ad5 are replaced with Ad34 structural proteins. This virus has the same capsid swap as AdSyn-CO202. This allows the virus to retain oncolytic selectivity of AdSyn-CO335, but avoid Ad5 neutralizing antibodies. The Ad34 fiber knob domain has been replaced with the Ad5 fiber knob, and bears a sequence encoding the FRB domain from mTOR inserted into the HI loop in the knob domain. The E3-RIDα, E3-RIDβ, and E3-14.7K genes were deleted, and replaced with a gene encoding an EGFR-binding single-domain antibody (EGFRVHH) fused to FKBP12. In the presence of rapamycin, the soluble EGFRVHH-FKBP fusion protein forms a heterodimer with the FRB domain in the fiber, and allows mature adenovirus particles to bind to EGFR on new cells and infect via this new receptor. AdSyn-CO335B-TK (SEQ ID NO: 97) is a recombinant adenovirus identical to AdSyn-CO335B-K, except that the shaft domains of the Ad34 fiber is replaced by the Ad5 shaft.

In view of the many possible embodiments to which the principles of the disclosure may be applied, it should be recognized that the illustrated embodiments are only examples of the disclosure and should not be taken as limiting the scope of the disclosure. Rather, the scope of the disclosure is defined by the following claims. We therefore claim all that comes within the scope and spirit of these claims.

SEQUENCE LISTING

The patent contains a lengthy sequence listing. A copy of the sequence listing is available in electronic form from the USPTO web site (https://seqdata.uspto.gov/docdetail?docId=US12514887B2). An electronic copy of the sequence listing will also be available from the USPTO upon request and payment of the fee set forth in 37 CFR 1.19(b)(3).

The invention claimed is:

1. A recombinant adenovirus, comprising:
an adenovirus E1A promoter;
an adenovirus E4 promoter; and
a genome:
encoding a modified E1A protein comprising a deletion of the LXCXE motif or a C124G substitution; and
encoding a modified E4orf6/7 protein, wherein the function of the modified E4orf6/7 is impaired or abolished, or comprising a complete or partial deletion that results in the absence of E4orf6/7 protein expression;
wherein the genome comprises a deletion of the entirety of each of the E3-RIDα/RIDβ and E3-14.7k coding sequences,
wherein the recombinant adenovirus exhibits replication defects in normal cells compared to tumor cells and replicates to wild-type adenovirus levels in tumor cells.

2. The recombinant adenovirus of claim 1, wherein the genome encodes an adenovirus fiber protein fused to the wild-type FKBP-rapamycin binding (FRB) protein or a mutant FRB protein comprising a T2098L substitution.

3. The recombinant adenovirus of claim 2, wherein the genome further encodes a targeting ligand fused to FK506 binding protein (FKBP).

4. The recombinant adenovirus of claim 3, wherein the targeting ligand is a single domain antibody.

5. The recombinant adenovirus of claim 1, wherein the genome comprises a deletion of the entirety of each of the E3-RIDα/RIDβ and E3-14.7k coding sequences and the coding sequences are not replaced with a sequence coding an adenovirus fiber protein fused to the wild-type FKBP-rapamycin binding (FRB) protein or a mutant FRB protein comprising a T2098L substitution.

6. The recombinant adenovirus of claim 1, wherein the genome further encodes a modified hexon protein.

7. The recombinant adenovirus virus of claim 6, wherein the modified hexon protein comprises an E451Q substitution.

8. The recombinant adenovirus of claim 2, wherein the adenovirus fiber protein is fused to the mutant FRB protein comprising the T2098L substitution.

9. The recombinant adenovirus of claim 1, wherein the genome further comprises one or more binding sites for a liver-specific microRNA.

10. The recombinant adenovirus of claim 9, wherein the liver-specific microRNA is miR-122.

11. The recombinant adenovirus of claim 1, wherein the genome further encodes a modified penton protein.

12. The recombinant adenovirus of claim 11, wherein the modified penton protein comprises a mutation in the integrin-binding RGD motif.

13. A composition comprising the recombinant adenovirus of claim 1, and a pharmaceutically acceptable carrier.

14. The recombinant adenovirus of claim 2, wherein the genome of the recombinant adenovirus virus:
    encodes a modified E1A protein comprising a deletion of the LXCXE motif;
    comprises a complete or partial deletion that results in the absence of E4orf6/7 protein expression; and
    encodes an adenovirus fiber protein fused to the mutant FRB protein comprising the T2098L substitution.

15. The recombinant adenovirus of claim 2, wherein the genome of the recombinant adenovirus virus:
    encodes a modified E1A protein comprising a deletion of the LXCXE motif;
    comprises a complete or partial deletion that results in the absence of E4orf6/7 protein expression; and
    encodes an adenovirus fiber protein fused to the wild-type FRB protein.

16. The recombinant adenovirus of claim 1, wherein the adenovirus is a capsid-swapped chimeric adenovirus, wherein the E1, E3 and E4 modules are derived from a first adenovirus serotype and the E2B, L1, L2, L3, E2A and L4 modules are derived from a second adenovirus serotype.

17. The recombinant adenovirus of claim 16, wherein the first adenovirus serotype is Ad5 and the second adenovirus serotype is selected from Ad3, Ad9, Ad11, Ad12, and Ad34.

18. The recombinant adenovirus of claim 1, wherein the genome of the recombinant adenovirus further:
    encodes a modified hexon protein comprising the E451Q substitution;
    encodes a chimeric fiber protein comprising the fiber shaft from a first adenovirus serotype and the fiber knob from a second adenovirus serotype; and
    does not encode an adenovirus fiber protein fused to the wild-type FKBP-rapamycin binding (FRB) protein or a mutant FRB protein comprising the T2098L substitution.

19. The recombinant adenovirus of claim 18, wherein the first adenovirus serotype is Ad5 and the second adenovirus serotype is Ad3, Ad9, Ad11, Ad12, Ad34 or Ad37.

20. The recombinant adenovirus of claim 18, wherein the first adenovirus serotype is Ad5 and the second adenovirus serotype is Ad34.

21. The recombinant adenovirus of claim 1, wherein the adenovirus is a capsid-swapped chimeric adenovirus.

22. The recombinant adenovirus of claim 21, wherein the adenovirus is a capsid-swapped chimeric adenovirus, wherein the E1, E3 and E4 modules are derived from a first adenovirus serotype and the E2B, L1, L2, L3, E2A and L4 modules are derived from a second adenovirus serotype.

23. The recombinant adenovirus of claim 22, herein the first adenovirus serotype is Ad5 and the second adenovirus serotype is Ad3, Ad9, Ad11, Ad12, Ad34 or Ad37.

24. The recombinant adenovirus of claim 22, wherein:
    the E1 region of the first adenovirus serotype is modified to encode the pIX protein from the second adenovirus serotype; and/or
    the E3 region of the first adenovirus serotype is modified to encode the Uexon and fiber proteins from the second adenovirus serotype.

25. The recombinant adenovirus of claim 24, herein the first adenovirus serotype is Ad5 and the second adenovirus serotype is Ad3, Ad9, Ad11, Ad12, Ad34 or Ad37.

26. A composition comprising the recombinant adenovirus of claim 18, and a pharmaceutically acceptable carrier.

* * * * *